(12) United States Patent
Subramanian et al.

(10) Patent No.: US 10,846,390 B2
(45) Date of Patent: Nov. 24, 2020

(54) SINGLE SIGN-ON FUNCTIONALITY FOR A MULTI-TENANT IDENTITY AND DATA SECURITY MANAGEMENT CLOUD SERVICE

(71) Applicant: Oracle International Corporation, Redwood Shores, CA (US)

(72) Inventors: Elangovan Subramanian, Belmont, CA (US); Mrudul Pradeep Uchil, Bangalore (IN); Bhavik Sankesara, Bangalore (IN); Siva Sundeep Kuppala, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 37 days.

(21) Appl. No.: 15/704,169

(22) Filed: Sep. 14, 2017

(65) Prior Publication Data

US 2018/0075231 A1    Mar. 15, 2018

Related U.S. Application Data

(60) Provisional application No. 62/394,273, filed on Sep. 14, 2016.

(51) Int. Cl.
*G06F 7/04* (2006.01)
*G06F 15/16* (2006.01)
(Continued)

(52) U.S. Cl.
CPC .............. *G06F 21/41* (2013.01); *G06F 16/86* (2019.01); *H04L 63/0807* (2013.01);
(Continued)

(58) Field of Classification Search
CPC .................................. G06F 21/41; G06F 16/86
(Continued)

(56) References Cited

U.S. PATENT DOCUMENTS

| 5,550,971 A | 8/1996 | Brunner et al. |
| 6,097,382 A | 8/2000 | Rosen et al. |

(Continued)

FOREIGN PATENT DOCUMENTS

| CN | 101399813 A | 4/2009 |
| CN | 103780635 A | 5/2014 |

(Continued)

OTHER PUBLICATIONS

Unknown, "SAML Authorization Assertion", Oct. 31, 2014, Oracle, pp. 1-2, Retrieved from docs.oracle.com.

(Continued)

*Primary Examiner* — Wasika Nipa
*Assistant Examiner* — Samuel Ambaye
(74) *Attorney, Agent, or Firm* — Potomac Law Group, PLLC

(57) ABSTRACT

A cloud-based identity and access management system that implements single sign-on ("SSO") receives a first request for an identity management service configured to allow for accessing an application. Embodiments send the first request to a first microservice which performs the identity management service by generating a token. The first microservice generates the token at least in part by sending a second request to a SSO microservice that is configured to provide SSO functionality across different microservices that are based on different protocols. Embodiments then receive the token from the first microservice and provide the token to the application, where the token allows for accessing the application.

20 Claims, 17 Drawing Sheets

(51) Int. Cl.
*H04L 29/06* (2006.01)
*G06F 21/41* (2013.01)
*G06F 16/84* (2019.01)
*G06F 21/62* (2013.01)

(52) U.S. Cl.
CPC ...... *H04L 63/0815* (2013.01); *H04L 63/0823* (2013.01); *G06F 21/6218* (2013.01); *H04L 63/205* (2013.01)

(58) Field of Classification Search
USPC .......................................................... 726/8
See application file for complete search history.

(56) References Cited

U.S. PATENT DOCUMENTS

| | | |
|---|---|---|
| 6,266,058 B1 | 7/2001 | Meyer |
| 6,353,834 B1 | 3/2002 | Wong et al. |
| 6,578,068 B1 | 6/2003 | Bowman-Amuah |
| 6,606,663 B1 | 8/2003 | Liao et al. |
| 6,631,497 B1 | 10/2003 | Jamshidi et al. |
| 6,631,519 B1 | 10/2003 | Nicholson et al. |
| 6,978,305 B1 | 12/2005 | Nainani et al. |
| 6,990,653 B1 | 1/2006 | Burd et al. |
| 7,062,502 B1 | 6/2006 | Kesler |
| 7,111,307 B1 | 9/2006 | Wang |
| 7,116,310 B1 | 10/2006 | Evans et al. |
| 7,203,678 B1 | 4/2007 | Petropoulos et al. |
| 7,337,434 B2 | 2/2008 | Nichols et al. |
| 7,395,355 B2 | 7/2008 | Afergan et al. |
| 7,428,725 B2 | 9/2008 | Niyogi et al. |
| 7,430,732 B2 | 9/2008 | Cwalina et al. |
| 7,464,297 B2 | 12/2008 | Potter et al. |
| 7,487,248 B2 | 2/2009 | Moran et al. |
| 7,529,825 B1 | 5/2009 | Freskos et al. |
| 7,546,576 B2 | 6/2009 | Egli |
| 7,546,602 B2 | 6/2009 | Hejlsberg et al. |
| 7,577,909 B2 | 8/2009 | Harriger et al. |
| 7,577,934 B2 | 8/2009 | Anonsen et al. |
| 7,610,575 B2 | 10/2009 | Sproule |
| 7,650,594 B2 | 1/2010 | Nattinger |
| 7,685,430 B1 | 3/2010 | Masurkar |
| 7,703,128 B2 | 4/2010 | Cross et al. |
| 7,707,553 B2 | 4/2010 | Rogues et al. |
| 7,720,864 B1 | 5/2010 | Muth et al. |
| 7,730,427 B2 | 6/2010 | Peters |
| 7,735,068 B2 | 6/2010 | Siddaramappa et al. |
| 7,757,177 B1 | 7/2010 | Bohm et al. |
| 7,757,207 B2 | 7/2010 | Yan et al. |
| 7,779,383 B2 | 8/2010 | Bomhoevd et al. |
| 7,827,256 B2 | 11/2010 | Phillips et al. |
| 7,849,447 B1 | 12/2010 | Karis et al. |
| 7,861,121 B2 | 12/2010 | Wang |
| 7,913,246 B2 | 3/2011 | Hammond et al. |
| 7,917,888 B2 | 3/2011 | Chong et al. |
| 7,926,027 B2 | 4/2011 | Chen et al. |
| 8,032,634 B1 | 10/2011 | Eppstein et al. |
| 8,099,766 B1 | 1/2012 | Corbett |
| 8,166,387 B2 | 4/2012 | Morrison et al. |
| 8,209,491 B2 | 6/2012 | Mobarak et al. |
| 8,219,970 B2 | 7/2012 | Neil et al. |
| 8,245,037 B1 | 8/2012 | Durgin et al. |
| 8,364,968 B2 | 1/2013 | Corcoran et al. |
| 8,417,728 B1 | 4/2013 | Anders et al. |
| 8,452,567 B1 | 5/2013 | Sullivan et al. |
| 8,464,063 B2 | 6/2013 | Agarwal et al. |
| 8,473,951 B2 | 6/2013 | Sharon et al. |
| 8,554,846 B2 | 10/2013 | Brail |
| 8,578,282 B2 | 11/2013 | Boillot |
| 8,607,322 B2 | 12/2013 | Hinton et al. |
| 8,612,599 B2 | 12/2013 | Tung et al. |
| 8,676,723 B2 | 3/2014 | Jung |
| 8,732,182 B2 | 5/2014 | Bethlehem et al. |
| 8,732,665 B2 | 5/2014 | Vedula et al. |
| 8,745,641 B1 | 6/2014 | Coker |
| 8,782,632 B1 | 7/2014 | Chigurapati et al. |
| 8,799,641 B1 | 8/2014 | Seidenberg et al. |
| 8,812,627 B2 | 8/2014 | Donahue et al. |
| 8,813,028 B2 | 8/2014 | Farooqi |
| 8,824,274 B1 | 9/2014 | Medved et al. |
| 8,856,869 B1 | 10/2014 | Brinskelle |
| 8,863,111 B2 | 10/2014 | Selitser et al. |
| 8,873,401 B2 | 10/2014 | Ashwood-Smith et al. |
| 8,938,540 B2 | 1/2015 | Van Biljon et al. |
| 8,943,309 B1 | 1/2015 | Schilder et al. |
| 8,949,776 B2 | 2/2015 | Feber |
| 8,954,732 B1 | 2/2015 | Watsen et al. |
| 8,955,081 B2 | 2/2015 | Metke et al. |
| 8,959,063 B2 | 2/2015 | Haeberle et al. |
| 8,972,929 B2 | 3/2015 | Fahmy |
| 8,977,693 B2 | 3/2015 | Gidugu |
| 8,978,114 B1 | 3/2015 | Kaushik et al. |
| 8,984,581 B2 | 3/2015 | Luna et al. |
| 8,990,765 B2 | 3/2015 | Kulkarni et al. |
| 9,009,858 B2 | 4/2015 | Sapp, II et al. |
| 9,037,723 B2 | 5/2015 | Morgan |
| 9,047,166 B2 | 6/2015 | Nishio et al. |
| 9,047,404 B1 | 6/2015 | Jibaly et al. |
| 9,047,414 B1 | 6/2015 | Matyjek |
| 9,069,599 B2 | 6/2015 | Martinez et al. |
| 9,069,979 B2 | 6/2015 | Srinivasan et al. |
| 9,077,770 B2 | 7/2015 | Redpath |
| 9,105,046 B1 | 8/2015 | Dias et al. |
| 9,118,657 B1 | 8/2015 | Shetty |
| 9,158,518 B2 | 10/2015 | Brown et al. |
| 9,183,321 B2 | 11/2015 | Murthy |
| 9,223,684 B2 | 12/2015 | Gittelman et al. |
| 9,246,840 B2 | 1/2016 | Anderson et al. |
| 9,258,668 B2 | 2/2016 | Mall et al. |
| 9,258,669 B2 | 2/2016 | Nyisztor et al. |
| 9,292,502 B2 | 3/2016 | Karlsen |
| 9,311,413 B1 | 4/2016 | Ranklin et al. |
| 9,369,457 B2 | 6/2016 | Grajek et al. |
| 9,413,750 B2 | 8/2016 | Akula et al. |
| 9,432,457 B2 | 8/2016 | Marano et al. |
| 9,448,790 B2 | 9/2016 | Collison et al. |
| 9,483,491 B2 | 11/2016 | Wijayaratne et al. |
| 9,544,293 B2 | 1/2017 | Mathew et al. |
| 9,648,007 B1 | 5/2017 | Sterling et al. |
| 9,715,534 B2 | 7/2017 | Beausoleil et al. |
| 9,729,539 B1 | 8/2017 | Agrawal et al. |
| 9,772,822 B2 | 9/2017 | Narayanan et al. |
| 9,826,045 B2 | 11/2017 | Straub et al. |
| 9,886,524 B1 | 2/2018 | Richardson et al. |
| 10,013,364 B1 | 7/2018 | O'Brien et al. |
| 10,148,493 B1 | 12/2018 | Ennis, Jr. et al. |
| 10,263,947 B2 | 4/2019 | Vats et al. |
| 10,505,941 B2 | 12/2019 | Vats et al. |
| 2001/0007128 A1 | 7/2001 | Lambert et al. |
| 2001/0020274 A1 | 9/2001 | Shambroom |
| 2002/0116441 A1 | 8/2002 | Ding et al. |
| 2002/0129264 A1 | 9/2002 | Rowland et al. |
| 2002/0174010 A1 | 11/2002 | Rice |
| 2003/0028583 A1 | 2/2003 | Flores et al. |
| 2003/0115341 A1 | 6/2003 | Sinha et al. |
| 2003/0149717 A1 | 8/2003 | Heinzman |
| 2004/0010621 A1 | 1/2004 | Afergan et al. |
| 2004/0028212 A1 | 2/2004 | Lok et al. |
| 2004/0031030 A1 | 2/2004 | Kidder et al. |
| 2004/0046789 A1 | 3/2004 | Inanoria |
| 2004/0128546 A1 | 7/2004 | Blakley, III et al. |
| 2004/0250257 A1 | 12/2004 | Koutyrine et al. |
| 2005/0055631 A1 | 3/2005 | Scardina et al. |
| 2005/0091539 A1 | 4/2005 | Wang et al. |
| 2005/0171872 A1 | 8/2005 | Burch et al. |
| 2005/0172261 A1 | 8/2005 | Yuknewicz et al. |
| 2005/0183059 A1 | 8/2005 | Loksh et al. |
| 2006/0064582 A1 | 3/2006 | Teal et al. |
| 2006/0075398 A1 | 4/2006 | Bennett et al. |
| 2006/0143359 A1 | 6/2006 | Dostert et al. |
| 2006/0173873 A1 | 8/2006 | Prompt et al. |
| 2006/0176901 A1 | 8/2006 | Terai et al. |
| 2006/0185004 A1 | 8/2006 | Song et al. |
| 2006/0230363 A1 | 10/2006 | Rapp |

(56) References Cited

U.S. PATENT DOCUMENTS

| | | | |
|---|---|---|---|
| 2006/0291398 A1 | 12/2006 | Potter et al. | |
| 2007/0016804 A1 | 1/2007 | Kemshall | |
| 2007/0078887 A1 | 4/2007 | Harvey et al. | |
| 2007/0112574 A1* | 5/2007 | Greene | H04W 12/00407 340/572.1 |
| 2007/0124443 A1 | 5/2007 | Nanda et al. | |
| 2007/0174290 A1 | 7/2007 | Narang et al. | |
| 2007/0219956 A1 | 9/2007 | Milton | |
| 2007/0240127 A1 | 10/2007 | Roques et al. | |
| 2007/0255764 A1 | 11/2007 | Sonnier et al. | |
| 2008/0049779 A1 | 2/2008 | Hopmann et al. | |
| 2008/0077809 A1 | 3/2008 | Hayter et al. | |
| 2008/0112620 A1 | 5/2008 | Jiang | |
| 2008/0222238 A1 | 9/2008 | Ivanov et al. | |
| 2008/0256026 A1 | 10/2008 | Hays | |
| 2008/0256280 A1 | 10/2008 | Ma | |
| 2008/0256554 A1 | 10/2008 | Yassin | |
| 2008/0276224 A1 | 11/2008 | Gyure et al. | |
| 2008/0288644 A1* | 11/2008 | Gilfix | H04L 67/2814 709/227 |
| 2009/0006538 A1 | 1/2009 | Risney et al. | |
| 2009/0019533 A1 | 1/2009 | Hazlewood et al. | |
| 2009/0064001 A1 | 3/2009 | Robbins | |
| 2009/0086726 A1 | 4/2009 | Savage et al. | |
| 2009/0106234 A1 | 4/2009 | Siedlecki et al. | |
| 2009/0119763 A1 | 5/2009 | Park et al. | |
| 2009/0125595 A1 | 5/2009 | Maes | |
| 2009/0157811 A1 | 6/2009 | Bailor et al. | |
| 2009/0164571 A1 | 6/2009 | Potter et al. | |
| 2009/0178129 A1 | 7/2009 | Cross et al. | |
| 2009/0183072 A1 | 7/2009 | Stephenson et al. | |
| 2010/0017812 A1 | 1/2010 | Nigam | |
| 2010/0042869 A1 | 2/2010 | Szabo et al. | |
| 2010/0070230 A1 | 3/2010 | Kumar et al. | |
| 2010/0083386 A1 | 4/2010 | Kline et al. | |
| 2010/0088519 A1 | 4/2010 | Tsuruoka et al. | |
| 2010/0107241 A1 | 4/2010 | Jaber et al. | |
| 2010/0169640 A1 | 7/2010 | Smith et al. | |
| 2010/0251352 A1 | 9/2010 | Zarchy et al. | |
| 2010/0257513 A1 | 10/2010 | Thirumalai et al. | |
| 2010/0281475 A1 | 11/2010 | Jain et al. | |
| 2010/0286992 A1 | 11/2010 | Tkatch et al. | |
| 2010/0293080 A1 | 11/2010 | Shah | |
| 2011/0010394 A1 | 1/2011 | Carew et al. | |
| 2011/0022812 A1 | 1/2011 | Linden et al. | |
| 2011/0078675 A1 | 3/2011 | Camp et al. | |
| 2011/0107196 A1 | 5/2011 | Foster | |
| 2011/0123973 A1 | 5/2011 | Singh | |
| 2011/0125448 A1 | 5/2011 | Jung | |
| 2011/0138034 A1 | 6/2011 | Brookbanks et al. | |
| 2011/0153667 A1 | 6/2011 | Parmenter et al. | |
| 2011/0209140 A1 | 8/2011 | Scheldel et al. | |
| 2011/0213756 A1 | 9/2011 | Chen et al. | |
| 2011/0213870 A1 | 9/2011 | Cai et al. | |
| 2011/0246964 A1 | 10/2011 | Cox et al. | |
| 2011/0265077 A1 | 10/2011 | Collison et al. | |
| 2011/0295838 A1 | 12/2011 | Collins et al. | |
| 2011/0302398 A1 | 12/2011 | Ureche et al. | |
| 2011/0302516 A1 | 12/2011 | White et al. | |
| 2011/0314159 A1 | 12/2011 | Murphy et al. | |
| 2011/0321033 A1 | 12/2011 | Kelkar et al. | |
| 2011/0321150 A1 | 12/2011 | Gluck | |
| 2012/0011578 A1 | 1/2012 | Hinton et al. | |
| 2012/0036125 A1 | 2/2012 | Al-Kofahi et al. | |
| 2012/0090021 A1 | 4/2012 | Luh et al. | |
| 2012/0096521 A1 | 4/2012 | Peddada | |
| 2012/0102451 A1 | 4/2012 | Kulkarni et al. | |
| 2012/0110650 A1 | 5/2012 | Van Biljon et al. | |
| 2012/0144501 A1 | 6/2012 | Vangpat et al. | |
| 2012/0151063 A1 | 6/2012 | Yang et al. | |
| 2012/0151568 A1 | 6/2012 | Pieczul et al. | |
| 2012/0166488 A1 | 6/2012 | Kaushik et al. | |
| 2012/0170751 A1 | 7/2012 | Wurm | |
| 2012/0215582 A1 | 8/2012 | Petri et al. | |
| 2012/0252405 A1 | 10/2012 | Lortz et al. | |
| 2012/0297016 A1 | 11/2012 | Iyer et al. | |
| 2012/0317172 A1 | 12/2012 | Redpath | |
| 2012/0317233 A1 | 12/2012 | Redpath | |
| 2012/0323553 A1 | 12/2012 | Aslam et al. | |
| 2012/0328105 A1 | 12/2012 | Mukkara et al. | |
| 2013/0007845 A1 | 1/2013 | Chang et al. | |
| 2013/0019015 A1 | 1/2013 | Devarakonda et al. | |
| 2013/0019242 A1 | 1/2013 | Chen et al. | |
| 2013/0024695 A1 | 1/2013 | Kandrasheu et al. | |
| 2013/0031136 A1 | 1/2013 | Shah | |
| 2013/0071087 A1 | 3/2013 | Motiwala et al. | |
| 2013/0086645 A1 | 4/2013 | Srinivasan et al. | |
| 2013/0151848 A1 | 6/2013 | Baumann et al. | |
| 2013/0152047 A1 | 6/2013 | Moorthi et al. | |
| 2013/0173712 A1 | 7/2013 | Llorente et al. | |
| 2013/0179961 A1 | 7/2013 | Abe | |
| 2013/0191339 A1 | 7/2013 | Haden et al. | |
| 2013/0191481 A1 | 7/2013 | Prevost et al. | |
| 2013/0198236 A1 | 8/2013 | Lissack et al. | |
| 2013/0232179 A1 | 9/2013 | Chhaunker et al. | |
| 2013/0239192 A1 | 9/2013 | Linga et al. | |
| 2013/0254262 A1 | 9/2013 | Udall | |
| 2013/0262626 A1 | 10/2013 | Bozek et al. | |
| 2013/0312067 A1 | 11/2013 | Ogura et al. | |
| 2013/0312117 A1 | 11/2013 | Sapp, II et al. | |
| 2014/0006465 A1 | 1/2014 | Davis et al. | |
| 2014/0007205 A1 | 1/2014 | Oikonomou | |
| 2014/0013109 A1 | 1/2014 | Yin | |
| 2014/0013400 A1 | 1/2014 | Warshavsky et al. | |
| 2014/0032531 A1 | 1/2014 | Ravi et al. | |
| 2014/0040920 A1 | 2/2014 | Wu et al. | |
| 2014/0050317 A1 | 2/2014 | Sabin | |
| 2014/0053056 A1 | 2/2014 | Weber et al. | |
| 2014/0053126 A1 | 2/2014 | Watson et al. | |
| 2014/0075032 A1 | 3/2014 | Vasudevan et al. | |
| 2014/0075501 A1 | 3/2014 | Srinivasan et al. | |
| 2014/0075513 A1* | 3/2014 | Trammel | H04L 9/3213 726/4 |
| 2014/0089674 A1 | 3/2014 | Buehl | |
| 2014/0090037 A1 | 3/2014 | Singh | |
| 2014/0109072 A1 | 4/2014 | Lang et al. | |
| 2014/0109078 A1 | 4/2014 | Lang et al. | |
| 2014/0114707 A1 | 4/2014 | Rope et al. | |
| 2014/0164318 A1 | 6/2014 | Tsai et al. | |
| 2014/0172486 A1 | 6/2014 | Kwan et al. | |
| 2014/0173454 A1 | 6/2014 | Sanchez | |
| 2014/0245389 A1* | 8/2014 | Oberheide | H04L 63/0884 726/3 |
| 2014/0280771 A1 | 9/2014 | Bosworth et al. | |
| 2014/0280931 A1 | 9/2014 | Braun et al. | |
| 2014/0280943 A1 | 9/2014 | Bobrov et al. | |
| 2014/0280948 A1 | 9/2014 | Schmidt et al. | |
| 2014/0281943 A1 | 9/2014 | Prilepov et al. | |
| 2014/0282398 A1 | 9/2014 | Podolyak et al. | |
| 2014/0282399 A1 | 9/2014 | Gorelik et al. | |
| 2014/0282889 A1 | 9/2014 | Ishaya et al. | |
| 2014/0298293 A1 | 10/2014 | Nishio et al. | |
| 2014/0304507 A1 | 10/2014 | Coppola et al. | |
| 2014/0304700 A1 | 10/2014 | Kim et al. | |
| 2014/0310243 A1 | 10/2014 | McGee et al. | |
| 2014/0324911 A1 | 10/2014 | de Lavarene et al. | |
| 2014/0330869 A1 | 11/2014 | Factor et al. | |
| 2014/0337914 A1 | 11/2014 | Canning et al. | |
| 2015/0007274 A1* | 1/2015 | Chang | H04L 63/0815 726/4 |
| 2015/0039732 A1 | 2/2015 | Mall et al. | |
| 2015/0040104 A1 | 2/2015 | Mall et al. | |
| 2015/0040201 A1 | 2/2015 | Nyisztor et al. | |
| 2015/0067135 A1 | 3/2015 | Wang et al. | |
| 2015/0082035 A1 | 3/2015 | Medvinsky | |
| 2015/0088806 A1 | 3/2015 | Lotan et al. | |
| 2015/0089340 A1 | 3/2015 | Logan et al. | |
| 2015/0089341 A1 | 3/2015 | Davis et al. | |
| 2015/0089342 A1 | 3/2015 | Davis et al. | |
| 2015/0089351 A1 | 3/2015 | Logan et al. | |
| 2015/0089569 A1 | 3/2015 | Sondhi et al. | |
| 2015/0089604 A1 | 3/2015 | Mathew et al. | |
| 2015/0121462 A1 | 4/2015 | Courage et al. | |
| 2015/0128063 A1 | 5/2015 | Jones | |

(56) References Cited

U.S. PATENT DOCUMENTS

| | | |
|---|---|---|
| 2015/0128106 A1 | 5/2015 | Halley et al. |
| 2015/0154415 A1 | 6/2015 | Wu et al. |
| 2015/0195182 A1 | 7/2015 | Mathur et al. |
| 2015/0195313 A1 | 7/2015 | Lewis et al. |
| 2015/0213284 A1 | 7/2015 | Birkel et al. |
| 2015/0229638 A1 | 8/2015 | Loo |
| 2015/0256530 A1 | 9/2015 | Semba |
| 2015/0295844 A1 | 10/2015 | Perreira et al. |
| 2015/0304446 A1 | 10/2015 | Kato |
| 2015/0319185 A1 | 11/2015 | Kirti et al. |
| 2015/0319252 A1 | 11/2015 | Momchilov et al. |
| 2015/0332596 A1 | 11/2015 | Applehans |
| 2015/0350186 A1 | 12/2015 | Chan et al. |
| 2015/0350338 A1 | 12/2015 | Barnett et al. |
| 2016/0004668 A1 | 1/2016 | Rowles et al. |
| 2016/0048848 A1 | 2/2016 | Diggs et al. |
| 2016/0080360 A1 | 3/2016 | Child et al. |
| 2016/0085666 A1 | 3/2016 | Jordan |
| 2016/0085735 A1 | 3/2016 | Davis et al. |
| 2016/0092176 A1 | 3/2016 | Straub et al. |
| 2016/0092179 A1 | 3/2016 | Straub |
| 2016/0092186 A1 | 3/2016 | Straub |
| 2016/0092339 A1 | 3/2016 | Straub et al. |
| 2016/0092348 A1 | 3/2016 | Straub et al. |
| 2016/0092425 A1 | 3/2016 | Shah et al. |
| 2016/0092540 A1 | 3/2016 | Bihani et al. |
| 2016/0105393 A1 | 4/2016 | Thakkar et al. |
| 2016/0112475 A1* | 4/2016 | Lawson ............... H04L 65/403 709/204 |
| 2016/0124742 A1 | 5/2016 | Rangasamy et al. |
| 2016/0125490 A1 | 5/2016 | Angal et al. |
| 2016/0127199 A1 | 5/2016 | Ding et al. |
| 2016/0127254 A1 | 5/2016 | Kumar et al. |
| 2016/0127349 A1 | 5/2016 | Nakajima et al. |
| 2016/0127454 A1 | 5/2016 | Maheshwari et al. |
| 2016/0132214 A1 | 5/2016 | Koushik et al. |
| 2016/0149882 A1 | 5/2016 | Srivastava |
| 2016/0154629 A1 | 6/2016 | Noens et al. |
| 2016/0182314 A1 | 6/2016 | Will |
| 2016/0182328 A1 | 6/2016 | Bhasin et al. |
| 2016/0182588 A1 | 6/2016 | Luo et al. |
| 2016/0202007 A1 | 6/2016 | Hatch |
| 2016/0203087 A1 | 7/2016 | Nam et al. |
| 2016/0248860 A1 | 8/2016 | Dunbar et al. |
| 2016/0248866 A1 | 8/2016 | Garas |
| 2016/0267170 A1 | 9/2016 | Hastings et al. |
| 2016/0269343 A1 | 9/2016 | Li et al. |
| 2016/0285795 A1 | 9/2016 | Beausoleil et al. |
| 2016/0292694 A1 | 10/2016 | Goldschlag et al. |
| 2016/0294797 A1 | 10/2016 | Martin et al. |
| 2016/0294870 A1 | 10/2016 | Banerjee et al. |
| 2016/0314460 A1 | 10/2016 | Subramanian et al. |
| 2016/0337329 A1 | 11/2016 | Sood et al. |
| 2016/0344561 A1 | 11/2016 | Grajek |
| 2016/0352746 A1 | 12/2016 | Anderson et al. |
| 2016/0359861 A1 | 12/2016 | Manov et al. |
| 2016/0364231 A1 | 12/2016 | Tati et al. |
| 2016/0378436 A1 | 12/2016 | Jensen et al. |
| 2016/0378439 A1 | 12/2016 | Straub et al. |
| 2017/0010870 A1 | 1/2017 | Davis et al. |
| 2017/0046134 A1 | 2/2017 | Straub |
| 2017/0046235 A1 | 2/2017 | Straub et al. |
| 2017/0046254 A1 | 2/2017 | Buege |
| 2017/0048215 A1 | 2/2017 | Straub |
| 2017/0048252 A1 | 2/2017 | Straub et al. |
| 2017/0048319 A1 | 2/2017 | Straub |
| 2017/0048339 A1 | 2/2017 | Straub |
| 2017/0063833 A1 | 3/2017 | Colle et al. |
| 2017/0063989 A1 | 3/2017 | Langouev et al. |
| 2017/0083293 A1 | 3/2017 | Jao et al. |
| 2017/0083503 A1 | 3/2017 | Davis et al. |
| 2017/0118209 A1 | 4/2017 | Saravanan |
| 2017/0141916 A1 | 5/2017 | Zhang |
| 2017/0142094 A1 | 5/2017 | Doitch et al. |
| 2017/0155686 A1 | 6/2017 | Yanacek et al. |
| 2017/0168797 A1 | 6/2017 | Pogrebinsky |
| 2017/0187785 A1 | 6/2017 | Johnson et al. |
| 2017/0187818 A1 | 6/2017 | Haswell et al. |
| 2017/0214696 A1 | 7/2017 | Cleaver et al. |
| 2017/0244613 A1 | 8/2017 | Vasudevan et al. |
| 2017/0295184 A1 | 10/2017 | Kurian et al. |
| 2017/0346804 A1 | 11/2017 | Beecham |
| 2018/0032534 A1 | 2/2018 | Koerner et al. |
| 2018/0041467 A1 | 2/2018 | Vats et al. |
| 2018/0041516 A1 | 2/2018 | Vats et al. |
| 2018/0041598 A1 | 2/2018 | Vats et al. |
| 2018/0063258 A1 | 3/2018 | Wang et al. |
| 2018/0083915 A1 | 3/2018 | Medam et al. |
| 2018/0083944 A1 | 3/2018 | Vats et al. |
| 2018/0165346 A1 | 6/2018 | Fitzpatrick et al. |
| 2018/0191700 A1 | 7/2018 | Kong et al. |
| 2018/0329981 A1 | 11/2018 | Gupte et al. |
| 2019/0102156 A1 | 4/2019 | Kennedy |

FOREIGN PATENT DOCUMENTS

| | | |
|---|---|---|
| CN | 105515759 A | 4/2016 |
| EP | 3361700 A1 | 8/2018 |
| JP | 2008027043 A | 2/2008 |
| JP | 2013025405 A | 2/2013 |
| JP | 2013182310 A | 9/2013 |
| JP | 2015527681 A | 9/2015 |
| JP | 2015529366 A | 10/2015 |
| JP | 2016009299 A | 1/2016 |
| WO | 2005001620 A2 | 1/2005 |
| WO | WO2013071087 A1 | 5/2013 |
| WO | 2013186070 A1 | 12/2013 |
| WO | 2014046857 A1 | 3/2014 |
| WO | WO2014039918 A1 | 3/2014 |
| WO | 2014151839 A1 | 9/2014 |
| WO | 2014176363 A1 | 10/2014 |
| WO | 2016049626 A1 | 3/2016 |
| WO | 2016065080 A1 | 4/2016 |

OTHER PUBLICATIONS

R. Fielding; Rest API Tutorial; 2017.
Anonymous: "DaaS—Diagnostics as a Service for Azure Web Sites: Blog: Microsoft Azure", Jul. 8, 2014 (Jul. 8, 2014), XP055403199, Retrieved from the Internet: URL:https://azure.microsoft.com/en-gb/blog/daas/ [retrieved on Sep. 1, 2017].
"Explore Microsoft Azure monitoring and diagnostics", youtube, Sep. 28, 2016 (Sep. 28, 2016), p. 1 pp. • XP054977701, Retrieved from the Internet: URL:https://www.youtube.com/watch?v=wUf4sm_8aA_w [retrieved on Sep. 5, 2017].
Wikipedia: "Security Assertion Markup Language—Wikipedia", Aug. 28, 2016 (Aug. 28, 2016), XP055417859, Retrieved from the Internet: URL:https://en.wlkipedia.org/w/index.php?title=Security_Assertion_Markup_Language&oldid=736544308 [retrieved on Oct. 23, 2017].
Brockallen: "Single sign-out and IdentityServer3: brockallen", Feb. 8, 2016 (Feb. 8, 2016), XP055417951, Retrieved from the Internet: URL: https://brockallen.com/2016/02/08/single-sign-out-and-identityserver3/ [retrieved on Oct. 23, 2017].
Gregg Browinski: "SAML Single Logout—What You Need to Know", Jun. 20, 2016 (Jun. 20, 2016), XP055417923, Retrieved from the Internet: URL:https://www.portalguard.com/blog/2016/06/20/saml-single-logout-need-to-know/ [retrieved on Oct. 23, 2017].
Gluu:"Shibboleth Plugin released to enable simultaneous OpenID Connect and SAML sessions: Gluu", Mar. 25, 2013 (Mar. 25, 2013), XP055417498, Retrieved from the Internet: URL:https://www.glutt.org/press-releases/2013/gluu-releases-shibboleth-plugin-for-ox-to-enable-simultaneous-openid-connect-and-saml-sessions/ [retrieved on Oct. 19, 2017].
Gluu: "Use Case for Asimba as SAML Proxy: Gluu : Blog", Dec. 3, 2013 (Dec. 3, 2013), XP055417606, Retrieved from the Internet: URL:https://www.gluu.org/blog/use-case-for-asimba-as-saml-proxy/ [retrieved on Oct. 20, 2017].
Gluu: "Diagram Gluu Software Architecture", Dec. 3, 2013 (Dec. 3, 2013), XP055417597, Retrieved from the Internet: URL:https://www.gluu.org/blog/wp-content/uploads/2013/12/idea_asimba.png [retrieved on Oct. 20, 2017].

(56) References Cited

OTHER PUBLICATIONS

Anonymous: "Gluu Server Overview : The Gluu Server for SSO, WAM, & 2FA : Gluu", Aug. 29, 2016 (Aug. 29, 2016), XP055417541, Retrieved from the Internet: URL:https://web.archive.org/web/20160829102122/https://www.gluu.org/gluu-server/overview/ [retrieved on Oct. 20, 2017].
"SCIM Directory Services", Oracle Corporation, Sep. 2012 (https://tools.ieff.org/id/draft-hunt-scim-directory-00. html#rfc.section.2.2, visited Jun. 26, 2017).
"UnboundID Identity Proxy Product Description Version 4.5", UnboundID Corp., Austin TX, 2015 (https://cdn2.hubspot.net/hub/405650/file-2157336753-pdf/Resources/Data_Sheets/UnboundID_Identity_Proxy_v4.5PD.pdf?t=1458081481415, visited Jun. 26, 2017).
Jones et al., RFC 7519 JSON Web Tokens (JWT), May 2015, IETF, pp. 1-30.
Author Unknown, "Oracle Access Management—Complete, Integrated, Scalable Access Management Solution", Oracle White Paper, Retrieved From Http://www.oracle.com/technetwork/middleware/id-mgmt/overview/complete-and-scalable-access-mgmt-1697349.pdf, Published May 2015.
"Citrix XenServer Workload Balancing (WLB)"; Jan. 22, 2015; https://www.citrix.com/blogs/2015/01/22/citrix-xenserver-workload-balancing-wlb-why-xendesktop-and-xenapp-customers-really-should-take-note/.
Sairam Pappu et al., "Integrate Oracle E-Business Suite Using Oracle E-Business Suite AccessGate with Oracle 4ccess Manager Using Multiple Data Stores", Retrieved From http://www.oracle.com/technetwork/middleware/id-mgmt/overview/oamebsintegrationwhitepaper-2152856.pdf, published Feb. 2014.
"Cross-Device Single Sign-On Session Transfer", retrieved from https://www.egiz.gv.at/en/projekte/160-sso_session_transfer on Sep. 7, 2017.
Application Note—"Implementing Single Sign-On Using SAML 2.0 on Juniper Networks Mag Series Junos Pulse Gateways", Juniper Networks, Inc., 2013, 22 pages.
Coan et al., "Using Distributed Topology Update and Preplanned Configurations to Achieve Trunk Network Survivability", Oct. 1991, IEEE, vol. 40, No. 4 (Year: 1991).
Grossman et al., "ToolClips: An Investigation of Contextual Video Assistance for Functionality Understanding, CHI 2010: Looking with Video", Apr. 10-15, 2010, pp. 1515-1524.
Hudli et al., "An Evaluation Framework for Selection of Mobile App Development Platform", ACM, pp. 13-16, 2015.
Konstantinou et al., "An Architecture for Virtual Solution Composition and Deployment in Infrastructure Clouds", Jun. 2009, ACM (Year: 2009).
Oliveira et al., "Delivering software with agility and quality in a cloud environment", Mar. 2016, IBM, vol. 60 No. 2/3 Paper 10 (Year: 2016).
Rasti et al., "On the Long-Term Evolution of the Two-Tier Gnutella Overlay", Apr. 2007, IEEE (Year: 2007).
Rokonuzzaman et al., "A Cross-layer Approach for Qos Topology Control in Wireless Ad Hoc Networks", 2009. IEEE (Year: 2009).
Claycomb et al., "Detecting Insider Activity Using Enhanced Directory Virtualization", Oct. 2010, Proceedings of the 2010 ACM workshop on Insider threats, p. 29-36.
Larsson, "A Cast Study: Implementing Novell Identity Management at Drew University", Nov. 2005, Proceedings of the 33rd annual ACM SIGUCCS conference on user services, p. 165-170.
Peyrott, "What is an how does Single Sing on Authentication work?", blog series, Sep. 23, 2015.
Yang et al., "Design-Role Based Multi-Tenancy Access Control Scheme for Cloud Service", 2003, International Symposium on Biometrics and Security Technologies, Date of Conference: Jul. 2-5 (Year: 2013).
"AWS Identity and Access Management (IAM)", Amazon AWS website [full url in ref.] as captured by the Wayback Machine Internet Archive (archive.org) on Jul. 27, 2017.
"Create a Template for an Application", OutSystems.com website as captured by the Wayback Machine Internet Archive, Sep. 18, 2017.
"Custom App Development or Template Applications? Here's Flow You Know"; Applt Ventures website, Jun. 1, 2016, https://appitventures.com/blog/custom-app-development-or-template-applications/.
"TaskscheduleR: R Package to Schedule R Scripts with the Windows Task Manager", Bnosac, Feb. 8, 2017, https://web.archive.org/web/20170208221949/http://www.bnosac.be/index.php/blog/50-taskscheduler-r-package-to-schedule-r-scripts-with-the-windows-task-manager-2.
Peyrott, "What is and how does Single Sign on Authentication work", Blog Series, Sep. 23, 2015.
Ryan O'Leary; "Accelerate Code Development with Cloud Application Templates", Flexera website [full url in ref.] Aug. 25, 2016.
Alguliev et al., "identity management based security architecture of cloud computing on multi-agent systems", Nov. 2013, Third International Conference on Innovative Computing Technology (INTECH 2013), pp. 1-4.

* cited by examiner

SINGLE SIGN-ON FUNCTIONALITY FOR A MULTI-TENANT IDENTITY AND DATA SECURITY MANAGEMENT CLOUD SERVICE

CROSS REFERENCE TO RELATED APPLICATIONS

This application claims priority of U.S. Provisional Patent Application Ser. No. 62/394,273, filed on Sep. 14, 2016, the disclosure of which is hereby incorporated by reference.

FIELD

One embodiment is directed generally to identity management, and in particular, to identity management in a cloud system.

BACKGROUND INFORMATION

Generally, the use of cloud-based applications (e.g., enterprise public cloud applications, third-party cloud applications, etc.) is soaring, with access coming from a variety of devices (e.g., desktop and mobile devices) and a variety of users (e.g., employees, partners, customers, etc.). The abundant diversity and accessibility of cloud-based applications has led identity management and access security to become a central concern. Typical security concerns in a cloud environment are unauthorized access, account hijacking, malicious insiders, etc. Accordingly, there is a need for secure access to cloud-based applications, or applications located anywhere, regardless of from what device type or by what user type the applications are accessed.

SUMMARY

One embodiment is a cloud-based identity and access management system that implements single sign-on ("SSO"). Embodiments receive a first request for an identity management service configured to allow for accessing an application. Embodiments send the first request to a first microservice which performs the identity management service by generating a token. The first microservice generates the token at least in part by sending a second request to a SSO microservice that is configured to provide SSO functionality across different microservices that are based on different protocols. Embodiments then receive the token from the first microservice and provide the token to the application, where the token allows for accessing the application.

DETAILED DESCRIPTION

Figure 1:
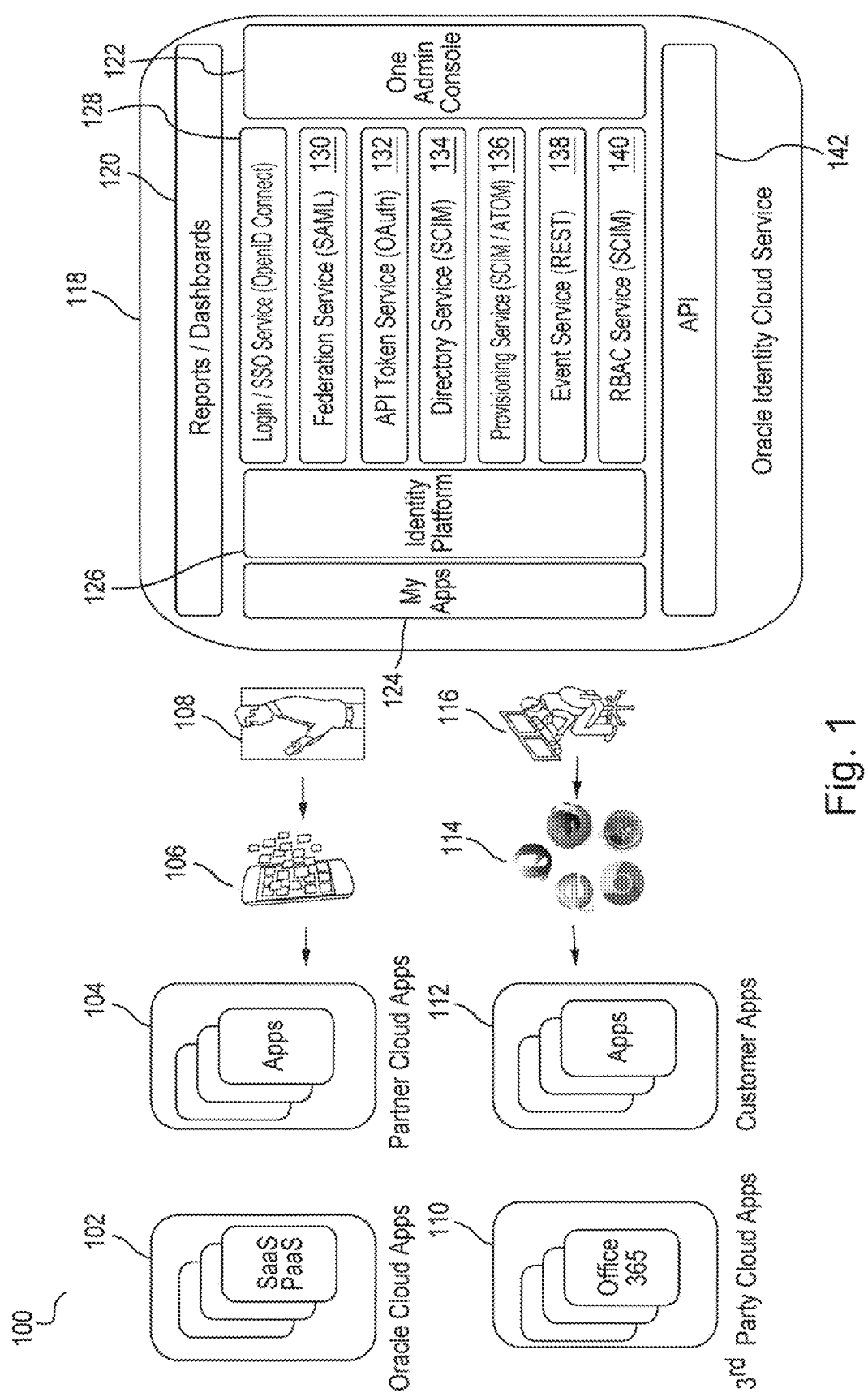
FIGS. 1-5 are block diagrams of example embodiments that provide cloud-based identity management.

Embodiments provide single sign-on ("SSO") functionality in an Identity Cloud Service ("IDCS") that provides a multi-tenant, cloud-scale, identity and access management ("IAM") platform. In one embodiment, the SSO functionality is implemented by providing a global session and then generating protocol-specific tokens based on the global session.

Embodiments provide an identity cloud service that implements a microservices based architecture and provides multi-tenant identity and data security management and secure access to cloud-based applications. Embodiments support secure access for hybrid cloud deployments (i.e., cloud deployments which include a combination of a public cloud and a private cloud). Embodiments protect applications and data both in the cloud and on-premise. Embodiments support multi-channel access via web, mobile, and application programming interfaces ("APIs"). Embodiments manage access for different users, such as customers, partners, and employees. Embodiments manage, control, and audit access across the cloud as well as on-premise. Embodiments integrate with new and existing applications and identities. Embodiments are horizontally scalable.

One embodiment is a system that implements a number of microservices in a stateless middle tier environment to provide cloud-based multi-tenant identity and access management services. In one embodiment, each requested identity management service is broken into real-time and near-real-time tasks. The real-time tasks are handled by a microservice in the middle tier, while the near-real-time tasks are offloaded to a message queue. Embodiments implement access tokens that are consumed by a routing tier and a middle tier to enforce a security model for accessing the microservices. Accordingly, embodiments provide a cloud-scale IAM platform based on a multi-tenant, microservices architecture.

One embodiment provides an identity cloud service that enables organizations to rapidly develop fast, reliable, and secure services for their new business initiatives. In one embodiment, the identity cloud service provides a number of core services, each of which solving a unique challenge faced by many enterprises. In one embodiment, the identity cloud service supports administrators in, for example, initial on-boarding/importing of users, importing groups with user members, creating/updating/disabling/enabling/deleting users, assigning/un-assigning users into/from groups, creating/updating/deleting groups, resetting passwords, managing policies, sending activation, etc. The identity cloud service also supports end users in, for example, modifying profiles, setting primary/recovery emails, verifying emails, unlocking their accounts, changing passwords, recovering passwords in case of forgotten password, etc.

Unified Security of Access

One embodiment protects applications and data in a cloud environment as well as in an on-premise environment. The embodiment secures access to any application from any device by anyone. The embodiment provides protection across both environments since inconsistencies in security between the two environments may result in higher risks. For example, such inconsistencies may cause a sales person to continue having access to their Customer Relationship Management ("CRM") account even after they have defected to the competition. Accordingly, embodiments extend the security controls provisioned in the on-premise environment into the cloud environment. For example, if a person leaves a company, embodiments ensure that their accounts are disabled both on-premise and in the cloud.

Generally, users may access applications and/or data through many different channels such as web browsers, desktops, mobile phones, tablets, smart watches, other wearables, etc. Accordingly, one embodiment provides secured access across all these channels. For example, a user may use their mobile phone to complete a transaction they started on their desktop.

One embodiment further manages access for various users such as customers, partners, employees, etc. Generally, applications and/or data may be accessed not just by employees but by customers or third parties. Although many known systems take security measures when onboarding employees, they generally do not take the same level of security measures when giving access to customers, third parties, partners, etc., resulting in the possibility of security breaches by parties that are not properly managed. However, embodiments ensure that sufficient security measures are provided for access of each type of user and not just employees.

Identity Cloud Service

Embodiments provide an IDCS that is a multi-tenant, cloud-scale, IAM platform. IDCS provides authentication, authorization, auditing, and federation. IDCS manages access to custom applications and services running on the public cloud, and on-premise systems. In an alternative or additional embodiment, IDCS may also manage access to public cloud services. For example, IDCS can be used to provide SSO functionality across such variety of services/applications/systems.

Embodiments are based on a multi-tenant, microservices architecture for designing, building, and delivering cloud-scale software services. Multi-tenancy refers to having one physical implementation of a service securely supporting multiple customers buying that service. A service is a software functionality or a set of software functionalities (such as the retrieval of specified information or the execution of a set of operations) that can be reused by different clients for different purposes, together with the policies that control its usage (e.g., based on the identity of the client requesting the service). In one embodiment, a service is a mechanism to enable access to one or more capabilities, where the access is provided using a prescribed interface and is exercised consistent with constraints and policies as specified by the service description.

In one embodiment, a microservice is an independently deployable service. In one embodiment, the term microservice contemplates a software architecture design pattern in which complex applications are composed of small, independent processes communicating with each other using language-agnostic APIs. In one embodiment, microservices are small, highly decoupled services and each may focus on doing a small task. In one embodiment, the microservice architectural style is an approach to developing a single application as a suite of small services, each running in its own process and communicating with lightweight mechanisms (e.g., an Hypertext Transfer Protocol ("HTTP") resource API). In one embodiment, microservices are easier to replace relative to a monolithic service that performs all or many of the same functions. Moreover, each of the microservices may be updated without adversely affecting the other microservices. In contrast, updates to one portion of a monolithic service may undesirably or unintentionally negatively affect the other portions of the monolithic service. In one embodiment, microservices may be beneficially organized around their capabilities. In one embodiment, the startup time for each of a collection of microservices is much less than the startup time for a single application that collectively performs all the services of those microservices. In some embodiments, the startup time for each of such microservices is about one second or less, while the startup time of such single application may be about a minute, several minutes, or longer.

In one embodiment, microservices architecture refers to a specialization (i.e., separation of tasks within a system) and implementation approach for service oriented architectures ("SOAs") to build flexible, independently deployable software systems. Services in a microservices architecture are processes that communicate with each other over a network in order to fulfill a goal. In one embodiment, these services use technology-agnostic protocols. In one embodiment, the services have a small granularity and use lightweight protocols. In one embodiment, the services are independently deployable. By distributing functionalities of a system into different small services, the cohesion of the system is enhanced and the coupling of the system is decreased. This makes it easier to change the system and add functions and qualities to the system at any time. It also allows the architecture of an individual service to emerge through continuous refactoring, and hence reduces the need for a big up-front design and allows for releasing software early and continuously.

In one embodiment, in the microservices architecture, an application is developed as a collection of services, and each service runs a respective process and uses a lightweight protocol to communicate (e.g., a unique API for each microservice). In the microservices architecture, decomposition of a software into individual services/capabilities can be performed at different levels of granularity depending on the service to be provided. A service is a runtime component/process. Each microservice is a self-contained module that can talk to other modules/microservices. Each microservice has an unnamed universal port that can be contacted by others. In one embodiment, the unnamed universal port of a microservice is a standard communication channel that the microservice exposes by convention (e.g., as a conventional Hypertext Transfer Protocol ("HTTP") port) and that allows any other module/microservice within the same service to talk to it. A microservice or any other self-contained functional module can be generically referred to as a "service".

Embodiments provide multi-tenant identity management services. Embodiments are based on open standards to ensure ease of integration with various applications, delivering IAM capabilities through standards-based services.

Embodiments manage the lifecycle of user identities which entails the determination and enforcement of what an identity can access, who can be given such access, who can manage such access, etc. Embodiments run the identity management workload in the cloud and support security functionality for applications that are not necessarily in the cloud. The identity management services provided by the embodiments may be purchased from the cloud. For example, an enterprise may purchase such services from the cloud to manage their employees' access to their applications.

Embodiments provide system security, massive scalability, end user usability, and application interoperability. Embodiments address the growth of the cloud and the use of identity services by customers. The microservices based foundation addresses horizontal scalability requirements, while careful orchestration of the services addresses the functional requirements. Achieving both goals requires decomposition (wherever possible) of the business logic to achieve statelessness with eventual consistency, while much of the operational logic not subject to real-time processing is shifted to near-real-time by offloading to a highly scalable asynchronous event management system with guaranteed delivery and processing. Embodiments are fully multi-tenant from the web tier to the data tier in order to realize cost efficiencies and ease of system administration.

Embodiments are based on industry standards (e.g., OpenID Connect, OAuth2, Security Assertion Markup Language 2 ("SAML2"), System for Cross-domain Identity Management ("SCIM"), Representational State Transfer ("REST"), etc.) for ease of integration with various applications. One embodiment provides a cloud-scale API platform and implements horizontally scalable microservices for elastic scalability. The embodiment leverages cloud principles and provides a multi-tenant architecture with per-tenant data separation. The embodiment further provides per-tenant customization via tenant self-service. The embodiment is available via APIs for on-demand integration with other identity services, and provides continuous feature release.

One embodiment provides interoperability and leverages investments in identity management ("IDM") functionality in the cloud and on-premise. The embodiment provides automated identity synchronization from on-premise Lightweight Directory Access Protocol ("LDAP") data to cloud data and vice versa. The embodiment provides a SCIM identity bus between the cloud and the enterprise, and allows for different options for hybrid cloud deployments (e.g., identity federation and/or synchronization, SSO agents, user provisioning connectors, etc.).

Accordingly, one embodiment is a system that implements a number of microservices in a stateless middle tier to provide cloud-based multi-tenant identity and access management services. In one embodiment, each requested identity management service is broken into real-time and near-real-time tasks. The real-time tasks are handled by a microservice in the middle tier, while the near-real-time tasks are offloaded to a message queue. Embodiments implement tokens that are consumed by a routing tier to enforce a security model for accessing the microservices. Accordingly, embodiments provide a cloud-scale IAM platform based on a multi-tenant, microservices architecture.

Generally, known systems provide siloed access to applications provided by different environments, e.g., enterprise cloud applications, partner cloud applications, third-party cloud applications, and customer applications. Such siloed access may require multiple passwords, different password policies, different account provisioning and de-provisioning schemes, disparate audit, etc. However, one embodiment implements IDCS to provide unified IAM functionality over such applications. FIG. 1 is a block diagram 100 of an example embodiment with IDCS 118, providing a unified identity platform 126 for onboarding users and applications.

The embodiment provides seamless user experience across various applications such as enterprise cloud applications 102, partner cloud applications 104, third-party cloud applications 110, and customer applications 112. Applications 102, 104, 110, 112 may be accessed through different channels, for example, by a mobile phone user 108 via a mobile phone 106, by a desktop computer user 116 via a browser 114, etc. A web browser (commonly referred to as a browser) is a software application for retrieving, presenting, and traversing information resources on the World Wide Web. Examples of web browsers are Mozilla Firefox®, Google Chrome®, Microsoft Internet Explorer®, and Apple Safari®.

IDCS 118 provides a unified view 124 of a user's applications, a unified secure credential across devices and applications (via identity platform 126), and a unified way of administration (via an admin console 122). IDCS services may be obtained by calling IDCS APIs 142. Such services may include, for example, login/SSO services 128 (e.g., OpenID Connect), federation services 130 (e.g., SAML), token services 132 (e.g., OAuth), directory services 134 (e.g., SCIM), provisioning services 136 (e.g., SCIM or Any Transport over Multiprotocol ("AToM")), event services 138 (e.g., REST), and role-based access control ("RBAC") services 140 (e.g., SCIM). IDCS 118 may further provide reports and dashboards 120 related to the offered services.

Integration Tools

Generally, it is common for large corporations to have an IAM system in place to secure access to their on-premise applications. Business practices are usually matured and standardized around an in-house IAM system such as "Oracle IAM Suite" from Oracle Corp. Even small to medium organizations usually have their business processes designed around managing user access through a simple directory solution such as Microsoft Active Directory ("AD"). To enable on-premise integration, embodiments provide tools that allow customers to integrate their applications with IDCS.

Figure 2:
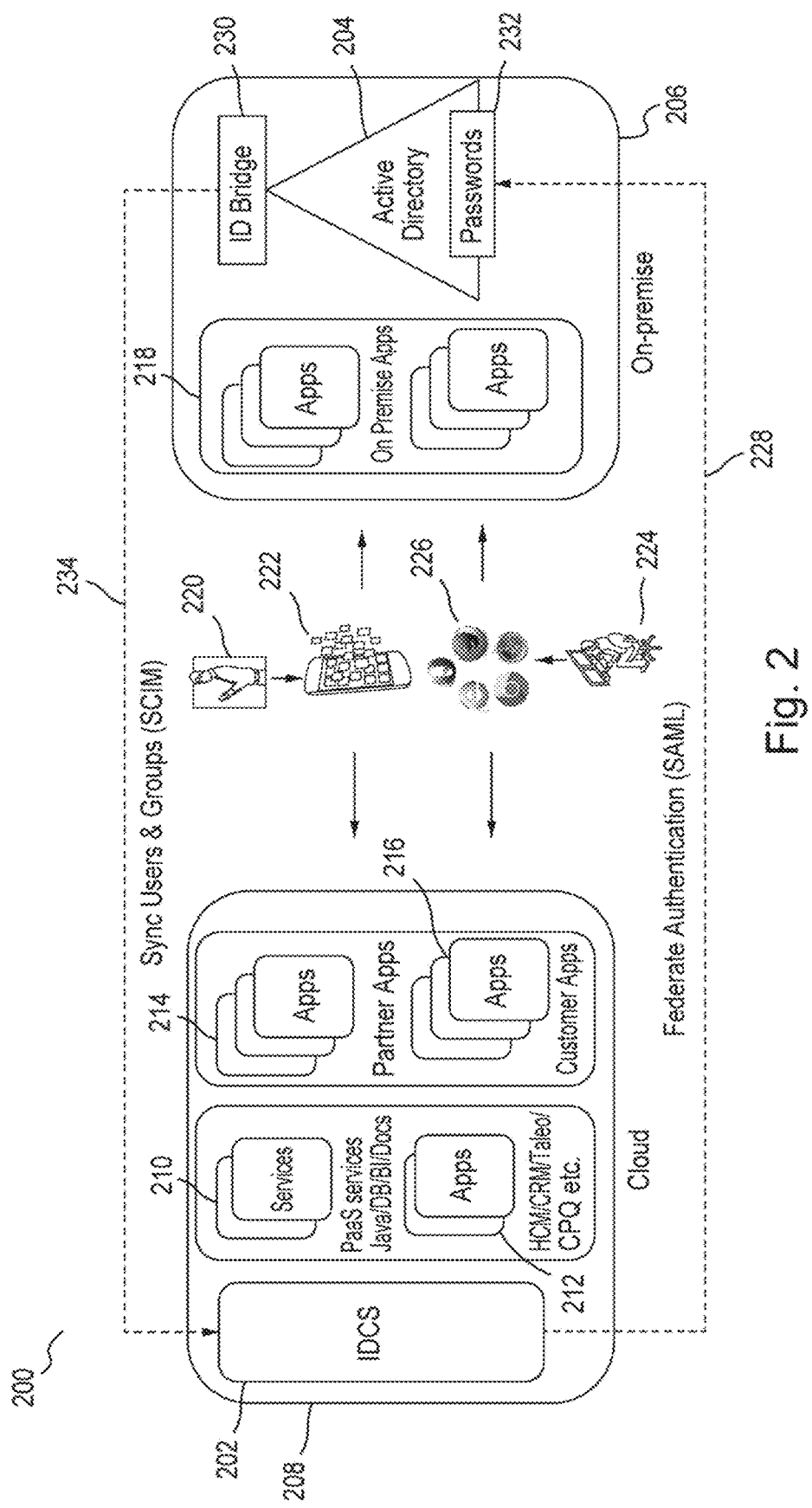

FIG. 2 is a block diagram 200 of an example embodiment with IDCS 202 in a cloud environment 208, providing integration with an AD 204 that is on-premise 206. The embodiment provides seamless user experience across all applications including on-premise and third-party applications, for example, on-premise applications 218 and various applications/services in cloud 208 such as cloud services 210, cloud applications 212, partner applications 214, and customer applications 216. Cloud applications 212 may include, for example, Human Capital Management ("HCM"), CRM, talent acquisition (e.g., Oracle Taleo cloud service from Oracle Corp.), Configure Price and Quote ("CPQ"), etc. Cloud services 210 may include, for example, Platform as a Service ("PaaS"), Java, database, business intelligence ("BI"), documents, etc.

Applications 210, 212, 214, 216, 218, may be accessed through different channels, for example, by a mobile phone user 220 via a mobile phone 222, by a desktop computer user 224 via a browser 226, etc. The embodiment provides automated identity synchronization from on-premise AD data to cloud data via a SCIM identity bus 234 between cloud 208 and the enterprise 206. The embodiment further provides a SAML bus 228 for federating authentication from cloud 208 to on-premise AD 204 (e.g., using passwords 232).

Generally, an identity bus is a service bus for identity related services. A service bus provides a platform for communicating messages from one system to another system. It is a controlled mechanism for exchanging information between trusted systems, for example, in a service oriented architecture ("SOA"). An identity bus is a logical bus built according to standard HTTP based mechanisms such as web service, web server proxies, etc. The communication in an identity bus may be performed according to a respective protocol (e.g., SCIM, SAML, OpenID Connect, etc.). For example, a SAML bus is an HTTP based connection between two systems for communicating messages for SAML services. Similarly, a SCIM bus is used to communicate SCIM messages according to the SCIM protocol.

The embodiment of FIG. 2 implements an identity ("ID") bridge 230 that is a small binary (e.g., 1 MB in size) that can be downloaded and installed on-premise 206 alongside a customer's AD 204. ID Bridge 230 listens to users and groups (e.g., groups of users) from the organizational units ("OUs") chosen by the customer and synchronizes those users to cloud 208. In one embodiment, users' passwords 232 are not synchronized to cloud 208. Customers can manage application access for users by mapping IDCS users' groups to cloud applications managed in IDCS 208. Whenever the users' group membership is changed on-premise 206, their corresponding cloud application access changes automatically.

For example, an employee moving from engineering to sales can get near instantaneous access to the sales cloud and lose access to the developer cloud. When this change is reflected in on-premise AD 204, cloud application access change is accomplished in near-real-time. Similarly, access to cloud applications managed in IDCS 208 is revoked for users leaving the company. For full automation, customers may set up SSO between on-premise AD 204 and IDCS 208 through, e.g., AD federation service ("AD/FS", or some other mechanism that implements SAML federation) so that end users can get access to cloud applications 210, 212, 214, 216, and on-premise applications 218 with a single corporate password 332.

Figure 3:
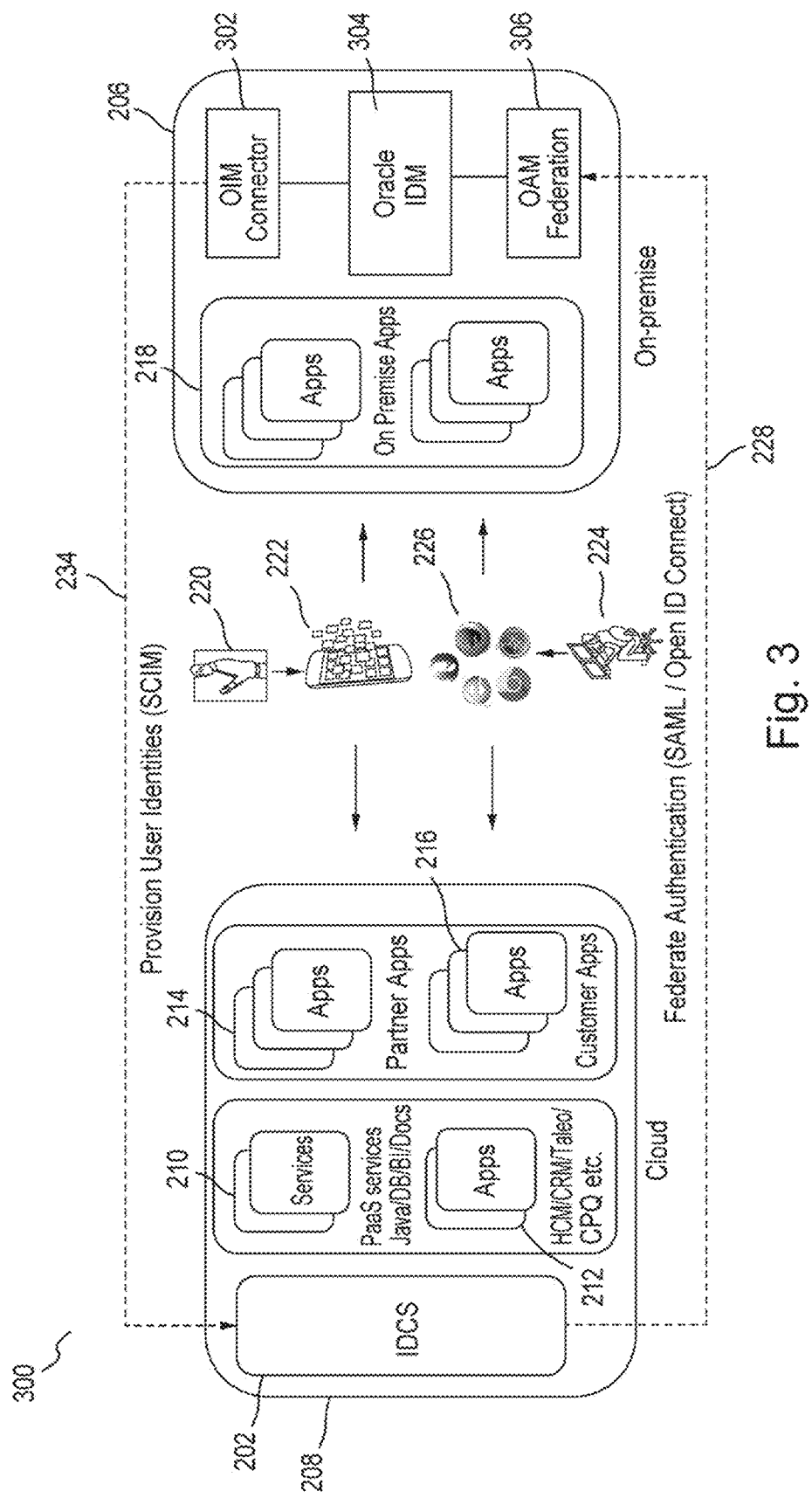

FIG. 3 is a block diagram 300 of an example embodiment that includes the same components 202, 206, 208, 210, 212, 214, 216, 218, 220, 222, 224, 226, 228, 234 as in FIG. 2. However, in the embodiment of FIG. 3, IDCS 202 provides integration with an on-premise IDM 304 such as Oracle IDM. Oracle IDM 304 is a software suite from Oracle Corp. for providing IAM functionality. The embodiment provides seamless user experience across all applications including on-premise and third-party applications. The embodiment provisions user identities from on-premise IDM 304 to IDCS 208 via SCIM identity bus 234 between cloud 202 and enterprise 206. The embodiment further provides SAML bus 228 (or an OpenID Connect bus) for federating authentication from cloud 208 to on-premise 206.

In the embodiment of FIG. 3, an Oracle Identity Manager ("OIM") Connector 302 from Oracle Corp., and an Oracle Access Manager ("OAM") federation module 306 from Oracle Corp., are implemented as extension modules of Oracle IDM 304. A connector is a module that has physical awareness about how to talk to a system. OIM is an application configured to manage user identities (e.g., manage user accounts in different systems based on what a user should and should not have access to). OAM is a security application that provides access management functionality such as web SSO; identity context, authentication and authorization; policy administration; testing; logging; auditing; etc. OAM has built-in support for SAML. If a user has an account in IDCS 202, OIM connector 302 and OAM federation 306 can be used with Oracle IDM 304 to create/delete that account and manage access from that account.

Figure 4:
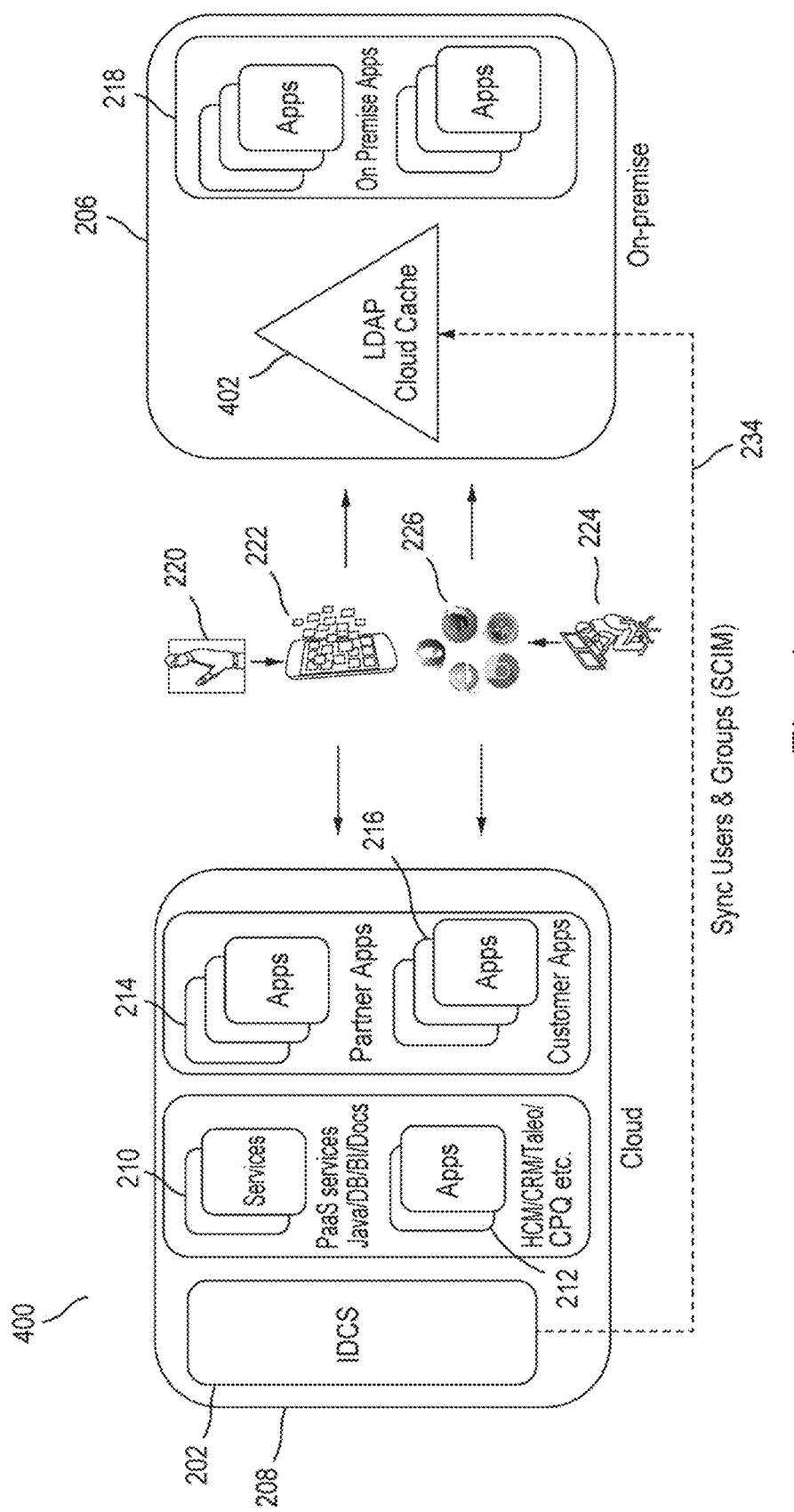

FIG. 4 is a block diagram 400 of an example embodiment that includes the same components 202, 206, 208, 210, 212, 214, 216, 218, 220, 222, 224, 226, 234 as in FIGS. 2 and 3. However, in the embodiment of FIG. 4, IDCS 202 provides functionality to extend cloud identities to on-premise applications 218. The embodiment provides seamless view of the identity across all applications including on-premise and third-party applications. In the embodiment of FIG. 4, SCIM identity bus 234 is used to synchronize data in IDCS 202 with on-premise LDAP data called "Cloud Cache" 402. Cloud Cache 402 is disclosed in more detail below.

Generally, an application that is configured to communicate based on LDAP needs an LDAP connection. An LDAP connection may not be established by such application through a URL (unlike, e.g., "www.google.com" that makes a connection to Google) since the LDAP needs to be on a local network. In the embodiment of FIG. 4, an LDAP-based application 218 makes a connection to Cloud Cache 402, and Cloud Cache 402 establishes a connection to IDCS 202 and then pulls data from IDCS 202 as it is being requested. The communication between IDCS 202 and Cloud Cache 402 may be implemented according to the SCIM protocol. For example, Cloud Cache 402 may use SCIM bus 234 to send a SCIM request to IDCS 202 and receive corresponding data in return.

Generally, fully implementing an application includes building a consumer portal, running marketing campaigns on the external user population, supporting web and mobile channels, and dealing with user authentication, sessions, user profiles, user groups, application roles, password policies, self-service/registration, social integration, identity federation, etc. Generally, application developers are not identity/security experts. Therefore, on-demand identity management services are desired.

Figure 5:
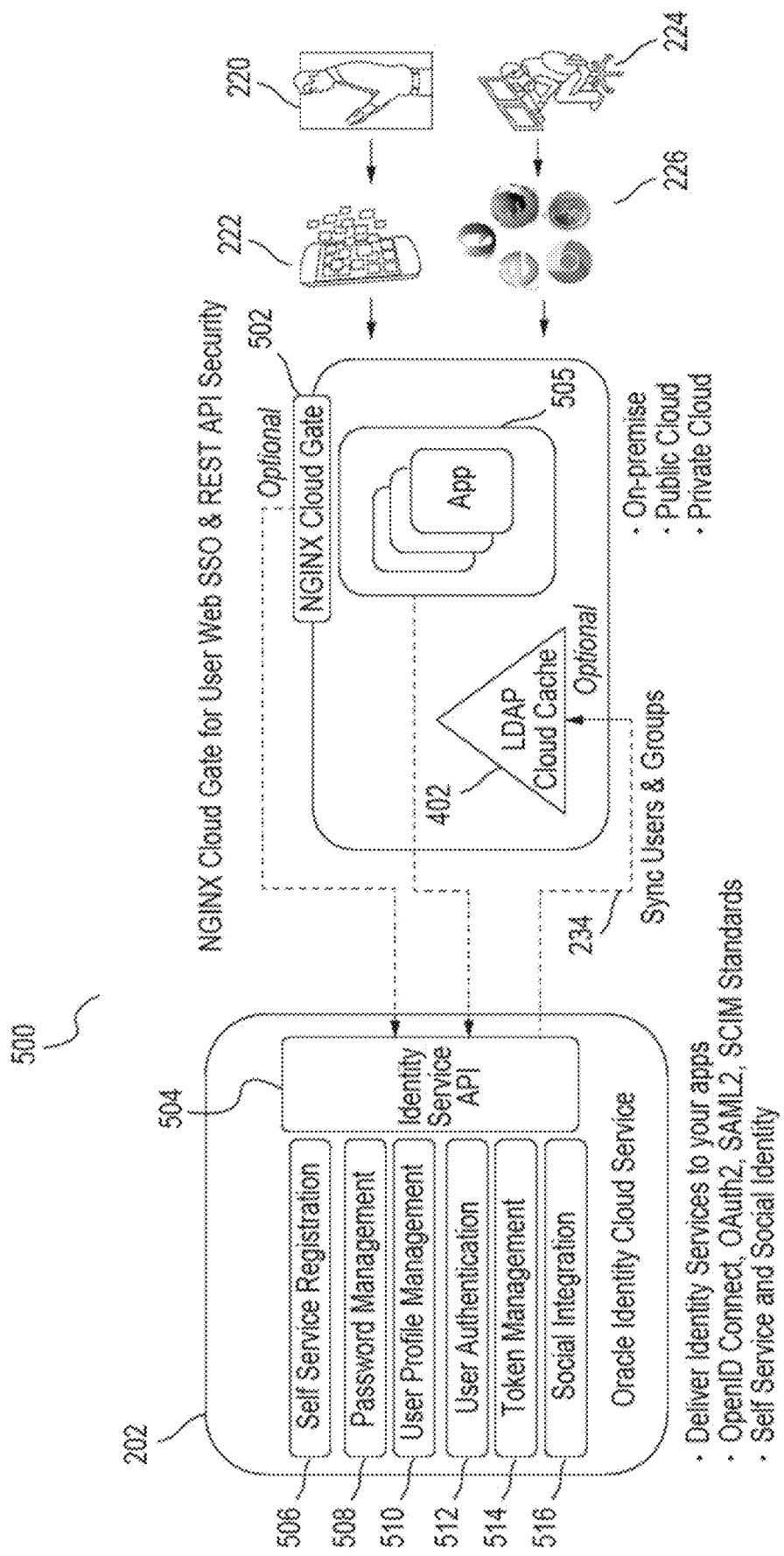

FIG. 5 is a block diagram 500 of an example embodiment that includes the same components 202, 220, 222, 224, 226, 234, 402, as in FIGS. 2-4. However, in the embodiment of FIG. 5, IDCS 202 provides secure identity management on demand. The embodiment provides on demand integration with identity services of IDCS 202 (e.g., based on standards such as OpenID Connect, OAuth2, SAML2, or SCIM). Applications 505 (which may be on-premise, in a public cloud, or in a private cloud) may call identity service APIs 504 in IDCS 202. The services provided by IDCS 202 may include, for example, self-service registration 506, password management 508, user profile management 510, user authentication 512, token management 514, social integration 516, etc.

In this embodiment, SCIM identity bus 234 is used to synchronize data in IDCS 202 with data in on-premise LDAP Cloud Cache 402. Further, a "Cloud Gate" 502 running on a web server/proxy (e.g., NGINX, Apache, etc.) may be used by applications 505 to obtain user web SSO and REST API security from IDCS 202. Cloud Gate 502 is a component that secures access to multi-tenant IDCS microservices by ensuring that client applications provide valid access tokens, and/or users successfully authenticate in order to establish SSO sessions. Cloud Gate 502 is further disclosed below. Cloud Gate 502 (enforcement point similar to webgate/webagent) enables applications running behind supported web servers to participate in SSO.

One embodiment provides SSO and cloud SSO functionality. A general point of entry for both on-premise IAM and IDCS in many organizations is SSO. Cloud SSO enables users to access multiple cloud resources with a single user sign-in. Often, organizations will want to federate their on-premise identities. Accordingly, embodiments utilize open standards to allow for integration with existing SSO to preserve and extend investment (e.g., until a complete, eventual transition to an identity cloud service approach is made).

One embodiment may provide the following functionalities:

maintain an identity store to track user accounts, ownership, access, and permissions that have been authorized, integrate with workflow to facilitate various approvals (e.g., management, IT, human resources, legal, and compliance) needed for applications access, provision SaaS user accounts for selective devices (e.g., mobile and personal computer ("PC")) with access to user portal containing many private and public cloud resources, and facilitate periodic management attestation review for compliance with regulations and current job responsibilities.

In addition to these functions, embodiments may further provide:

cloud account provisioning to manage account life cycle in cloud applications, more robust multifactor authentication ("MFA") integration, extensive mobile security capabilities, and dynamic authentication options.

One embodiment provides adaptive authentication and MFA. Generally, passwords and challenge questions have been seen as inadequate and susceptible to common attacks such as phishing. Most business entities today are looking at some form of MFA to reduce risk. To be successfully deployed, however, solutions need to be easily provisioned, maintained, and understood by the end user, as end users usually resist anything that interferes with their digital experience. Companies are looking for ways to securely incorporate bring your own device ("BYOD"), social identities, remote users, customers, and contractors, while making MFA an almost transparent component of a seamless user access experience. Within an MFA deployment, industry standards such as OAuth and OpenID Connect are essential to ensure integration of existing multifactor solutions and the incorporation of newer, adaptive authentication technology. Accordingly, embodiments define dynamic (or adaptive) authentication as the evaluation of available information (i.e., IP address, location, time of day, and biometrics) to prove an identity after a user session has been initiated. With the appropriate standards (e.g., open authentication ("OATH") and fast identity online ("FIDO")) integration and extensible identity management framework, embodiments provide MFA solutions that can be adopted, upgraded, and integrated easily within an IT organization as part of an end-to-end secure IAM deployment. When considering MFA and adaptive policies, organizations must implement consistent policies across on-premise and cloud resources, which in a hybrid IDCS and on-premise IAM environment requires integration between systems.

One embodiment provides user provisioning and certification. Generally, the fundamental function of an IAM solution is to enable and support the entire user provisioning life cycle. This includes providing users with the application access appropriate for their identity and role within the organization, certifying that they have the correct ongoing access permissions (e.g., as their role or the tasks or applications used within their role change over time), and promptly de-provisioning them as their departure from the organization may require. This is important not only for meeting various compliance requirements but also because inappropriate insider access is a major source of security breaches and attacks. An automated user provisioning capability within an identity cloud solution can be important not only in its own right but also as part of a hybrid IAM solution whereby IDCS provisioning may provide greater flexibility than an on-premise solution for transitions as a company downsizes, upsizes, merges, or looks to integrate existing systems with IaaS/PaaS/SaaS environments. An IDCS approach can save time and effort in one-off upgrades and ensure appropriate integration among necessary departments, divisions, and systems. The need to scale this technology often sneaks up on corporations, and the ability to deliver a scalable IDCS capability immediately across the enterprise can provide benefits in flexibility, cost, and control.

Generally, an employee is granted additional privileges (i.e., "privilege creep") over the years as her/his job changes. Companies that are lightly regulated generally lack an "attestation" process that requires managers to regularly audit their employees' privileges (e.g., access to networks, servers, applications, and data) to halt or slow the privilege creep that results in over-privileged accounts. Accordingly, one embodiment may provide a regularly conducted (at least once a year) attestation process. Further, with mergers and acquisitions, the need for these tools and services increases exponentially as users are on SaaS systems, on-premise, span different departments, and/or are being de-provisioned or re-allocated. The move to cloud can further confuse this situation, and things can quickly escalate beyond existing, often manually managed, certification methods. Accordingly, one embodiment automates these functions and applies sophisticated analytics to user profiles, access history, provisioning/de-provisioning, and fine-grained entitlements.

One embodiment provides identity analytics. Generally, the ability to integrate identity analytics with the IAM engine for comprehensive certification and attestation can be critical to securing an organization's risk profile. Properly deployed identity analytics can demand total internal policy enforcement. Identity analytics that provide a unified single management view across cloud and on-premise are much needed in a proactive governance, risk, and compliance ("GRC") enterprise environment, and can aid in providing a closed-loop process for reducing risk and meeting compliance regulations. Accordingly, one embodiment provides identity analytics that are easily customizable by the client to accommodate specific industry demands and government regulations for reports and analysis required by managers, executives, and auditors.

One embodiment provides self-service and access request functionality to improve the experience and efficiency of the end user and to reduce costs from help desk calls. Generally, while a number of companies deploy on-premise self-service access request for their employees, many have not extended these systems adequately outside the formal corporate walls. Beyond employee use, a positive digital customer experience increases business credibility and ultimately contributes to revenue increase, and companies not only save on customer help desk calls and costs but also improve customer satisfaction. Accordingly, one embodiment provides an identity cloud service environment that is based on open standards and seamlessly integrates with existing access control software and MFA mechanisms when necessary. The SaaS delivery model saves time and effort formerly devoted to systems upgrades and maintenance, freeing professional IT staff to focus on more core business applications.

One embodiment provides privileged account management ("PAM"). Generally, every organization, whether using SaaS, PaaS, IaaS, or on-premise applications, is vulnerable to unauthorized privileged account abuse by insiders with super-user access credentials such as system administrators, executives, HR officers, contractors, systems integrators, etc. Moreover, outside threats typically first breach a low-level user account to eventually reach and exploit privileged user access controls within the enterprise system. Accordingly, one embodiment provides PAM to prevent such unauthorized insider account use. The main component of a PAM solution is a password vault which may be delivered in various ways, e.g., as software to be installed on an enterprise server, as a virtual appliance also on an enterprise server, as a packaged hardware/software appliance, or as part of a cloud service. PAM functionality is similar to a physical safe used to store passwords kept in an envelope and changed periodically, with a manifest for signing them in and out. One embodiment allows for a password checkout as well as setting time limits, forcing periodic changes, automatically tracking checkout, and reporting on all activities. One embodiment provides a way to connect directly through to a requested resource without the user ever knowing the password. This capability also paves the way for session management and additional functionality.

Generally, most cloud services utilize APIs and administrative interfaces, which provide opportunities for infiltrators to circumvent security. Accordingly, one embodiment accounts for these holes in PAM practices as the move to the cloud presents new challenges for PAM. Many small to medium sized businesses now administer their own SaaS systems (e.g., Office 365), while larger companies increasingly have individual business units spinning up their own SaaS and IaaS services. These customers find themselves with PAM capabilities within the identity cloud service solutions or from their IaaS/PaaS provider but with little experience in handling this responsibility. Moreover, in some cases, many different geographically dispersed business units are trying to segregate administrative responsibilities for the same SaaS applications. Accordingly, one embodiment allows customers in these situations to link existing PAM into the overall identity framework of the identity cloud service and move toward greater security and compliance with the assurance of scaling to cloud load requirements as business needs dictate.

API Platform

Embodiments provide an API platform that exposes a collection of capabilities as services. The APIs are aggregated into microservices and each microservice exposes one or more of the APIs. That is, each microservice may expose different types of APIs. In one embodiment, each microservice communicates only through its APIs. In one embodiment, each API may be a microservice. In one embodiment, multiple APIs are aggregated into a service based on a target capability to be provided by that service (e.g., OAuth, SAML, Admin, etc.). As a result, similar APIs are not exposed as separate runtime processes. The APIs are what is made available to a service consumer to use the services provided by IDCS.

Generally, in the web environment of IDCS, a URL includes three parts: a host, a microservice, and a resource (e.g., host/microservice/resource). In one embodiment, the microservice is characterized by having a specific URL prefix, e.g., "host/oauth/v1" where the actual microservice is "oauth/v1", and under "oauth/v1" there are multiple APIs, e.g., an API to request tokens: "host/oauth/v1/token", an API to authenticate a user: "host/oauth/v1/authorize", etc. That is, the URL implements a microservice, and the resource portion of the URL implements an API. Accordingly, multiple APIs are aggregated under the same microservice. In one embodiment, the host portion of the URL identifies a tenant (e.g., https://tenant3.identity.oraclecloud.com:/oauth/v1/token").

Configuring applications that integrate with external services with the necessary endpoints and keeping that configuration up to date is typically a challenge. To meet this challenge, embodiments expose a public discovery API at a well-known location from where applications can discover the information about IDCS they need in order to consume IDCS APIs. In one embodiment, two discovery documents are supported: IDCS Configuration (which includes IDCS, SAML, SCIM, OAuth, and OpenID Connect configuration, at e.g., <IDCS-URL>/.well-known/idcs-configuration), and Industry-standard OpenID Connect Configuration (at, e.g., <IDCS-URL>/.well-known/openid-configuration). Applications can retrieve discovery documents by being configured with a single IDCS URL.

Figure 6:
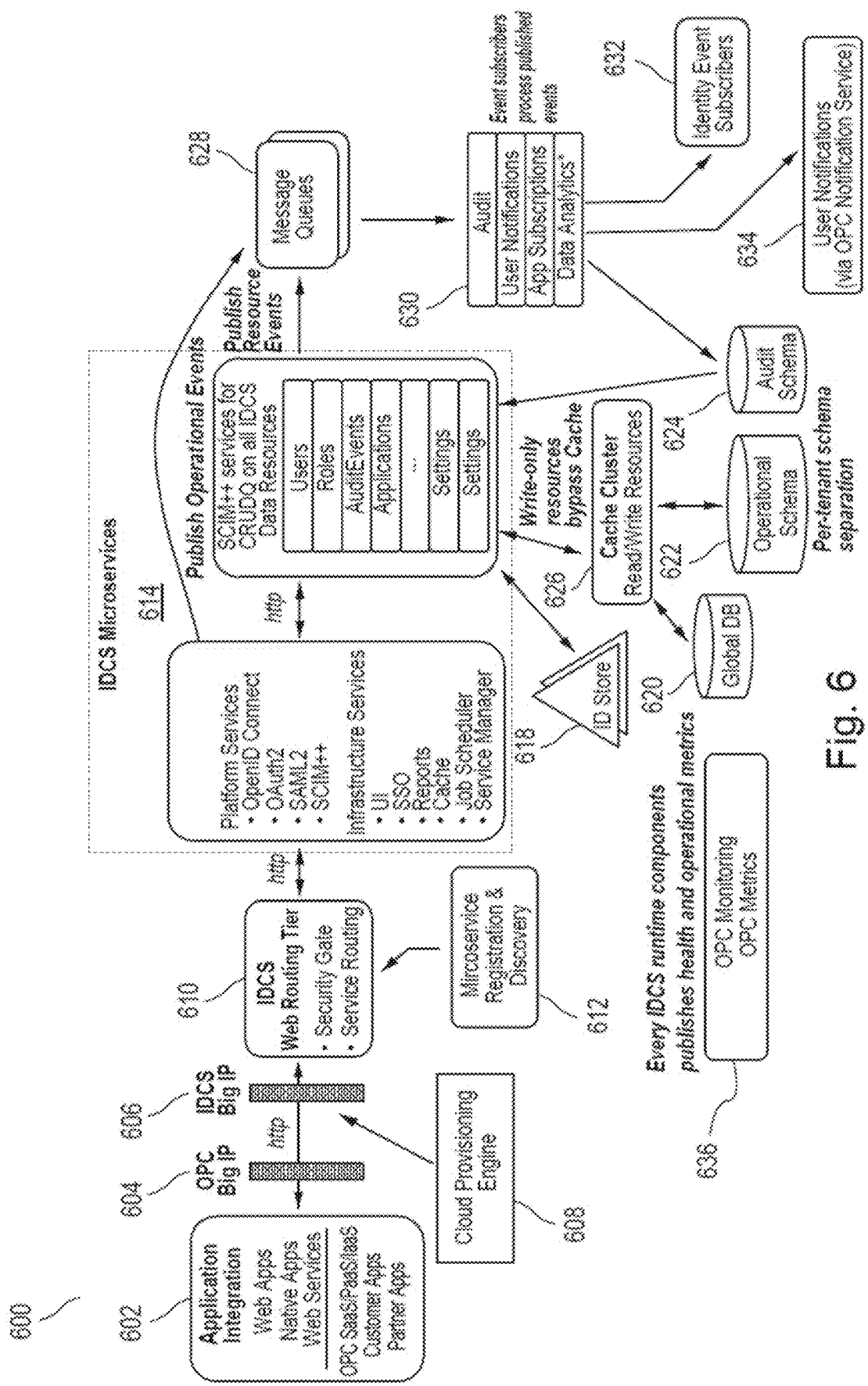
FIG. 6 is a block diagram providing a system view of an embodiment.

FIG. 6 is a block diagram providing a system view 600 of IDCS in one embodiment. In FIG. 6, any one of a variety of applications/services 602 may make HTTP calls to IDCS APIs to use IDCS services. Examples of such applications/services 602 are web applications, native applications (e.g., applications that are built to run on a specific operating system, such as Windows applications, iOS applications, Android applications, etc.), web services, customer applications, partner applications, or any services provided by a public cloud, such as Software as a Service ("SaaS"), PaaS, and Infrastructure as a Service ("IaaS").

In one embodiment, the HTTP requests of applications/services 602 that require IDCS services go through an Oracle Public Cloud BIG-IP appliance 604 and an IDCS BIG-IP appliance 606 (or similar technologies such as a Load Balancer, or a component called a Cloud Load Balancer as a Service ("LBaaS") that implements appropriate security rules to protect the traffic). However, the requests can be received in any manner. At IDCS BIG-IP appliance 606 (or, as applicable, a similar technology such as a Load Balancer or a Cloud LBaaS), a cloud provisioning engine 608 performs tenant and service orchestration. In one embodiment, cloud provisioning engine 608 manages internal security artifacts associated with a new tenant being on-boarded into the cloud or a new service instance purchased by a customer.

The HTTP requests are then received by an IDCS web routing tier 610 that implements a security gate (i.e., Cloud Gate) and provides service routing and microservices registration and discovery 612. Depending on the service requested, the HTTP request is forwarded to an IDCS microservice in the IDCS middle tier 614. IDCS microservices process external and internal HTTP requests. IDCS microservices implement platform services and infrastructure services. IDCS platform services are separately deployed Java-based runtime services implementing the business of IDCS. IDCS infrastructure services are separately deployed runtime services providing infrastructure support for IDCS. IDCS further includes infrastructure libraries that are common code packaged as shared libraries used by IDCS services and shared libraries. Infrastructure services and libraries provide supporting capabilities as required by platform services for implementing their functionality.

Platform Services

In one embodiment, IDCS supports standard authentication protocols, hence IDCS microservices include platform services such as OpenID Connect, OAuth, SAML2, System for Cross-domain Identity Management++("SCIM++"), etc.

The OpenID Connect platform service implements standard OpenID Connect Login/Logout flows. Interactive web-based and native applications leverage standard browser-based OpenID Connect flow to request user authentication, receiving standard identity tokens that are JavaScript Object Notation ("JSON") Web Tokens ("JWTs") conveying the user's authenticated identity. Internally, the runtime authentication model is stateless, maintaining the user's authentication/session state in the form of a host HTTP cookie (including the JWT identity token). The authentication interaction initiated via the OpenID Connect protocol is delegated to a trusted SSO service that implements the user login/logout ceremonies for local and federated logins. Further details of this functionality are disclosed below with reference to FIGS. 10 and 11. In one embodiment, OpenID Connect functionality is implemented according to, for example, OpenID Foundation standards.

The OAuth2 platform service provides token authorization services. It provides a rich API infrastructure for creating and validating access tokens conveying user rights to make API calls. It supports a range of useful token grant types, enabling customers to securely connect clients to their services. It implements standard 2-legged and 3-legged OAuth2 token grant types. Support for OpenID Connect ("OIDC") enables compliant applications (OIDC relaying parties ("RP" s)) to integrate with IDCS as the identity provider (OIDC OpenID provider ("OP")). Similarly, the integration of IDCS as OIDC RP with social OIDC OP (e.g., Facebook, Google, etc.) enables customers to allow social identities policy-based access to applications. In one embodiment, OAuth functionality is implemented according to, for example, Internet Engineering Task Force ("IETF"), Request for Comments ("RFC") 6749.

The SAML2 platform service provides identity federation services. It enables customers to set up federation agreements with their partners based on SAML identity provider ("IDP") and SAML service provider ("SP") relationship models. In one embodiment, the SAML2 platform service implements standard SAML2 Browser POST Login and Logout Profiles. In one embodiment, SAML functionality is implemented according to, for example, IETF, RFC 7522.

SCIM is an open standard for automating the exchange of user identity information between identity domains or information technology ("IT") systems, as provided by, e.g., IETF, RFCs 7642, 7643, 7644. The SCIM++ platform service provides identity administration services and enables customers to access IDP features of IDCS. The administration services expose a set of stateless REST interfaces (i.e., APIs) that cover identity lifecycle, password management, group management, etc., exposing such artifacts as web-accessible resources.

All IDCS configuration artifacts are resources, and the APIs of the administration services allow for managing IDCS resources (e.g., users, roles, password policies, applications, SAML/OIDC identity providers, SAML service providers, keys, certifications, notification templates, etc.). Administration services leverage and extend the SCIM standard to implement schema-based REST APIs for Create, Read, Update, Delete, and Query ("CRUDQ") operations on all IDCS resources. Additionally, all internal resources of IDCS used for administration and configuration of IDCS itself are exposed as SCIM-based REST APIs. Access to the identity store 618 is isolated to the SCIM++ API.

In one embodiment, for example, the SCIM standard is implemented to manage the users and groups resources as defined by the SCIM specifications, while SCIM++ is configured to support additional IDCS internal resources (e.g., password policies, roles, settings, etc.) using the language defined by the SCIM standard.

The Administration service supports the SCIM 2.0 standard endpoints with the standard SCIM 2.0 core schemas and schema extensions where needed. In addition, the Administration service supports several SCIM 2.0 compliant endpoint extensions to manage other IDCS resources, for example, Users, Groups, Applications, Settings, etc. The Administration service also supports a set of remote procedure call-style ("RPC-style") REST interfaces that do not perform CRUDQ operations but instead provide a functional service, for example, "UserPasswordGenerator," "UserPasswordValidator," etc.

IDCS Administration APIs use the OAuth2 protocol for authentication and authorization. IDCS supports common OAuth2 scenarios such as scenarios for web server, mobile, and JavaScript applications. Access to IDCS APIs is protected by access tokens. To access IDCS Administration APIs, an application needs to be registered as an OAuth2 client or an IDCS Application (in which case the OAuth2 client is created automatically) through the IDCS Administration console and be granted desired IDCS Administration Roles. When making IDCS Administration API calls, the application first requests an access token from the IDCS OAuth2 Service. After acquiring the token, the application sends the access token to the IDCS API by including it in the HTTP authorization header. Applications can use IDCS Administration REST APIs directly, or use an IDCS Java Client API Library.

Infrastructure Services

The IDCS infrastructure services support the functionality of IDCS platform services. These runtime services include an event processing service (for asynchronously processing user notifications, application subscriptions, and auditing to database); a job scheduler service (for scheduling and executing jobs, e.g., executing immediately or at a configured time long-running tasks that do not require user intervention); a cache management service; a storage management service (for integrating with a public cloud storage service); a reports service (for generating reports and dashboards); an SSO service (for managing internal user authentication and SSO); a user interface ("UI") service (for hosting different types of UI clients); and a service manager service. Service manager is an internal interface between the Oracle Public Cloud and IDCS. Service manager manages commands issued by the Oracle Public Cloud, where the commands need to be implemented by IDCS. For example, when a customer signs up for an account in a cloud store before they can buy something, the cloud sends a request to IDCS asking to create a tenant. In this case, service manager implements the cloud specific operations that the cloud expects IDCS to support.

An IDCS microservice may call another IDCS microservice through a network interface (i.e., an HTTP request).

In one embodiment, IDCS may also provide a schema service (or a persistence service) that allows for using a database schema. A schema service allows for delegating the responsibility of managing database schemas to IDCS. Accordingly, a user of IDCS does not need to manage a database since there is an IDCS service that provides that functionality. For example, the user may use the database to persist schemas on a per tenant basis, and when there is no more space in the database, the schema service will manage the functionality of obtaining another database and growing the space so that the users do not have to manage the database themselves.

IDCS further includes data stores which are data repositories required/generated by IDCS, including an identity store 618 (storing users, groups, etc.), a global database 620 (storing configuration data used by IDCS to configure itself), an operational schema 622 (providing per tenant schema separation and storing customer data on a per customer basis), an audit schema 624 (storing audit data), a caching cluster 626 (storing cached objects to speed up performance), etc. All internal and external IDCS consumers integrate with the identity services over standards-based protocols. This enables use of a domain name system ("DNS") to resolve where to route requests, and decouples consuming applications from understanding the internal implementation of identity services.

Real-Time and Near-Real-Time Tasks

IDCS separates the tasks of a requested service into synchronous real-time and asynchronous near-real-time tasks, where real-time tasks include only the operations that are needed for the user to proceed. In one embodiment, a real-time task is a task that is performed with minimal delay, and a near-real-time task is a task that is performed in the background without the user having to wait for it. In one embodiment, a real-time task is a task that is performed with substantially no delay or with negligible delay, and appears to a user as being performed almost instantaneously.

The real-time tasks perform the main business functionality of a specific identity service. For example, when requesting a login service, an application sends a message to authenticate a user's credentials and get a session cookie in return. What the user experiences is logging into the system. However, several other tasks may be performed in connection with the user's logging in, such as validating who the user is, auditing, sending notifications, etc. Accordingly, validating the credentials is a task that is performed in real-time so that the user is given an HTTP cookie to start a session, but the tasks related to notifications (e.g., sending an email to notify the creation of an account), audits (e.g., tracking/recording), etc., are near-real-time tasks that can be performed asynchronously so that the user can proceed with least delay.

When an HTTP request for a microservice is received, the corresponding real-time tasks are performed by the microservice in the middle tier, and the remaining near-real-time tasks such as operational logic/events that are not necessarily subject to real-time processing are offloaded to message queues 628 that support a highly scalable asynchronous event management system 630 with guaranteed delivery and processing. Accordingly, certain behaviors are pushed from the front end to the backend to enable IDCS to provide high level service to the customers by reducing latencies in response times. For example, a login process may include validation of credentials, submission of a log report, updating of the last login time, etc., but these tasks can be offloaded to a message queue and performed in near-real-time as opposed to real-time.

In one example, a system may need to register or create a new user. The system calls an IDCS SCIM API to create a user. The end result is that when the user is created in identity store 618, the user gets a notification email including a link to reset their password. When IDCS receives a request to register or create a new user, the corresponding microservice looks at configuration data in the operational database (located in global database 620 in FIG. 6) and determines that the "create user" operation is marked with a "create user" event which is identified in the configuration data as an asynchronous operation. The microservice returns to the client and indicates that the creation of the user is done successfully, but the actual sending of the notification email is postponed and pushed to the backend. In order to do so, the microservice uses a messaging API 616 to queue the message in queue 628 which is a store.

In order to dequeue queue 628, a messaging microservice, which is an infrastructure microservice, continually runs in the background and scans queue 628 looking for events in queue 628. The events in queue 628 are processed by event subscribers 630 such as audit, user notification, application subscriptions, data analytics, etc. Depending on the task indicated by an event, event subscribers 630 may communicate with, for example, audit schema 624, a user notification service 634, an identity event subscriber 632, etc. For example, when the messaging microservice finds the "create user" event in queue 628, it executes the corresponding notification logic and sends the corresponding email to the user.

In one embodiment, queue 628 queues operational events published by microservices 614 as well as resource events published by APIs 616 that manage IDCS resources.

IDCS uses a real-time caching structure to enhance system performance and user experience. The cache itself may also be provided as a microservice. IDCS implements an elastic cache cluster 626 that grows as the number of customers supported by IDCS scales. Cache cluster 626 may be implemented with a distributed data grid which is disclosed in more detail below. In one embodiment, write-only resources bypass cache.

In one embodiment, IDCS runtime components publish health and operational metrics to a public cloud monitoring module 636 that collects such metrics of a public cloud such as Oracle Public Cloud from Oracle Corp.

In one embodiment, IDCS may be used to create a user. For example, a client application 602 may issue a REST API call to create a user. Admin service (a platform service in 614) delegates the call to a user manager (an infrastructure library/service in 614), which in turn creates the user in the tenant-specific ID store stripe in ID store 618. On "User Create Success", the user manager audits the operation to the audit table in audit schema 624, and publishes an "identity.user.create.success" event to message queue 628. Identity subscriber 632 picks up the event and sends a "Welcome" email to the newly created user, including newly created login details.

In one embodiment, IDCS may be used to grant a role to a user, resulting in a user provisioning action. For example, a client application 602 may issue a REST API call to grant a user a role. Admin service (a platform service in 614) delegates the call to a role manager (an infrastructure library/service in 614), who grants the user a role in the tenant-specific ID store stripe in ID store 618. On "Role Grant Success", the role manager audits the operations to the audit table in audit schema 624, and publishes an "identity.user.role.grant.success" event to message queue 628. Identity subscriber 632 picks up the event and evaluates the provisioning grant policy. If there is an active application grant on the role being granted, a provisioning subscriber performs some validation, initiates account creation, calls out the target system, creates an account on the target system, and marks the account creation as successful. Each of these functionalities may result in publishing of corresponding events, such as "prov.account.create.initiate", "prov.target.create.initiate", "prov.target.create.success", or "prov.account.create.success". These events may have their own business metrics aggregating number of accounts created in the target system over the last N days.

In one embodiment, IDCS may be used for a user to log in. For example, a client application 602 may use one of the supported authentication flows to request a login for a user. IDCS authenticates the user, and upon success, audits the operation to the audit table in audit schema 624. Upon failure, IDCS audits the failure in audit schema 624, and publishes "login.user.login.failure" event in message queue 628. A login subscriber picks up the event, updates its metrics for the user, and determines if additional analytics on the user's access history need to be performed.

Accordingly, by implementing "inversion of control" functionality (e.g., changing the flow of execution to schedule the execution of an operation at a later time so that the operation is under the control of another system), embodiments enable additional event queues and subscribers to be added dynamically to test new features on a small user sample before deploying to broader user base, or to process specific events for specific internal or external customers.

Stateless Functionality

IDCS microservices are stateless, meaning the microservices themselves do not maintain state. "State" refers to the data that an application uses in order to perform its capabilities. IDCS provides multi-tenant functionality by persisting all state into tenant specific repositories in the IDCS data tier. The middle tier (i.e., the code that processes the requests) does not have data stored in the same location as the application code. Accordingly, IDCS is highly scalable, both horizontally and vertically.

To scale vertically (or scale up/down) means to add resources to (or remove resources from) a single node in a system, typically involving the addition of CPUs or memory to a single computer. Vertical scalability allows an application to scale up to the limits of its hardware. To scale horizontally (or scale out/in) means to add more nodes to (or remove nodes from) a system, such as adding a new computer to a distributed software application. Horizontal scalability allows an application to scale almost infinitely, bound only by the amount of bandwidth provided by the network.

Stateless-ness of the middle tier of IDCS makes it horizontally scalable just by adding more CPUs, and the IDCS components that perform the work of the application do not need to have a designated physical infrastructure where a particular application is running. Stateless-ness of the IDCS middle tier makes IDCS highly available, even when providing identity services to a very large number of customers/tenants. Each pass through an IDCS application/service is focused on CPU usage only to perform the application transaction itself but not use hardware to store data. Scaling is accomplished by adding more slices when the application is running, while data for the transaction is stored at a persistence layer where more copies can be added when needed.

The IDCS web tier, middle tier, and data tier can each scale independently and separately. The web tier can be scaled to handle more HTTP requests. The middle tier can be scaled to support more service functionality. The data tier can be scaled to support more tenants.

IDCS Functional View

Figure 6A:
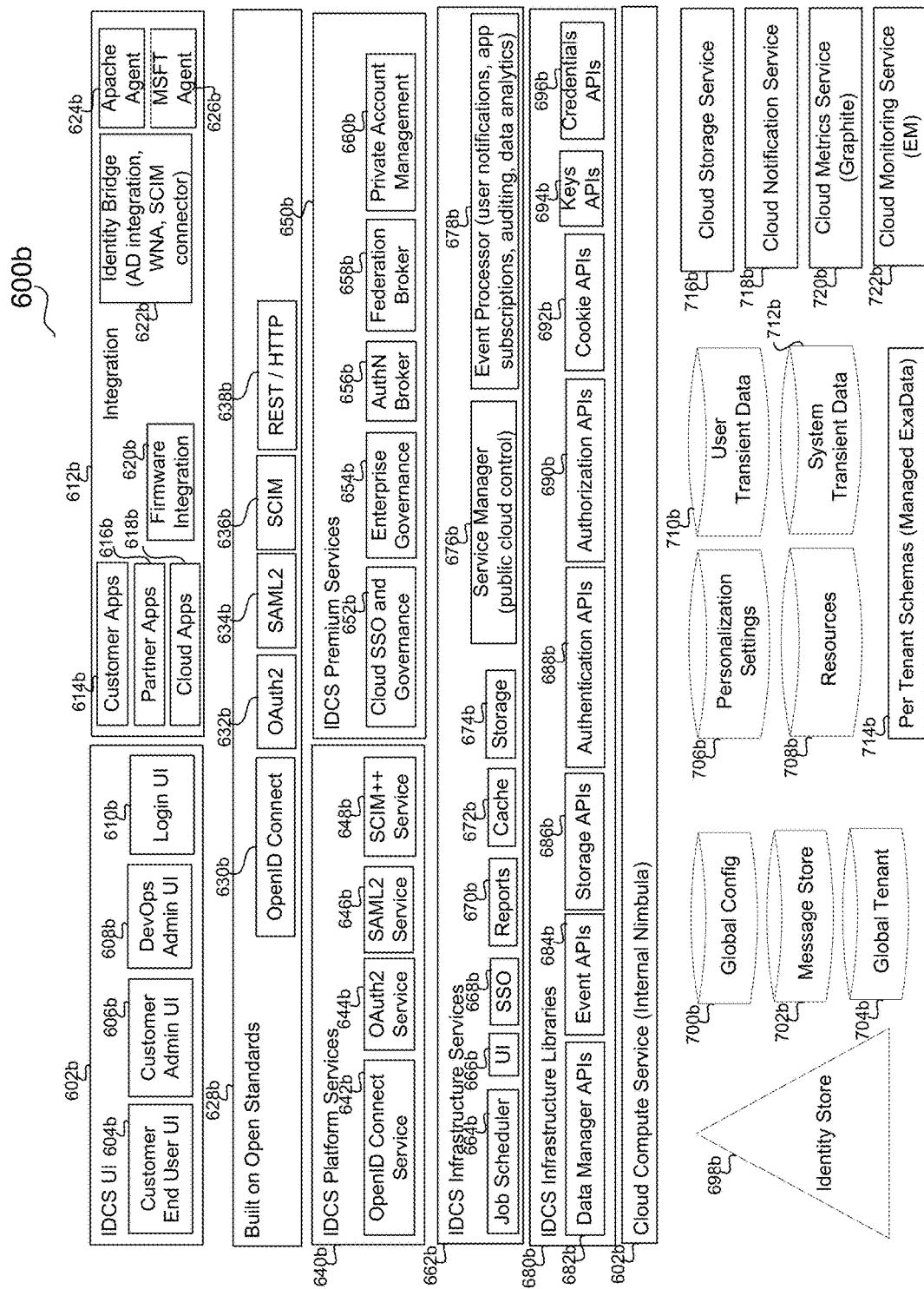
FIG. 6A is a block diagram providing a functional view of an embodiment.

FIG. 6A is an example block diagram 600b of a functional view of IDCS in one embodiment. In block diagram 600b, the IDCS functional stack includes services, shared libraries, and data stores. The services include IDCS platform services 640b, IDCS premium services 650b, and IDCS infrastructure services 662b. In one embodiment, IDCS platform services 640b and IDCS premium services 650b are separately deployed Java-based runtime services implementing the business of IDCS, and IDCS infrastructure services 662b are separately deployed runtime services providing infrastructure support for IDCS. The shared libraries include IDCS infrastructure libraries 680b which are common code packaged as shared libraries used by IDCS services and shared libraries. The data stores are data repositories required/generated by IDCS, including identity store 698b, global configuration 700b, message store 702b, global tenant 704b, personalization settings 706b, resources 708b, user transient data 710b, system transient data 712b, per-tenant schemas (managed ExaData) 714b, operational store (not shown), caching store (not shown), etc.

In one embodiment, IDCS platform services 640b include, for example, OpenID Connect service 642b, OAuth2 service 644b, SAML2 service 646b, and SCIM++ service 648b. In one embodiment, IDCS premium services include, for example, cloud SSO and governance 652b, enterprise governance 654b, AuthN broker 656b, federation broker 658b, and private account management 660b.

IDCS infrastructure services 662b and IDCS infrastructure libraries 680b provide supporting capabilities as required by IDCS platform services 640b to do their work. In one embodiment, IDCS infrastructure services 662b include job scheduler 664b, UI 666b, SSO 668b, reports 670b, cache 672b, storage 674b, service manager 676b (public cloud control), and event processor 678b (user notifications, app subscriptions, auditing, data analytics). In one embodiment, IDCS infrastructure libraries 680b include data manager APIs 682b, event APIs 684b, storage APIs 686b, authentication APIs 688b, authorization APIs 690b, cookie APIs 692b, keys APIs 694b, and credentials APIs 696b. In one embodiment, cloud compute service 602b (internal Nimbula) supports the function of IDCS infrastructure services 662b and IDCS infrastructure libraries 680b.

In one embodiment, IDCS provides various UIs 602b for a consumer of IDCS services, such as customer end user UI 604b, customer admin UI 606b, DevOps admin UI 608b, and login UI 610b. In one embodiment, IDCS allows for integration 612b of applications (e.g., customer apps 614b, partner apps 616b, and cloud apps 618b) and firmware integration 620b. In one embodiment, various environments may integrate with IDCS to support their access control needs. Such integration may be provided by, for example, identity bridge 622b (providing AD integration, WNA, and SCIM connector), Apache agent 624b, or MSFT agent 626b.

In one embodiment, internal and external IDCS consumers integrate with the identity services of IDCS over standards-based protocols 628b, such as OpenID Connect 630b, OAuth2 632b, SAML2 634b, SCIM 636b, and REST/HTTP 638b. This enables use of a domain name system ("DNS") to resolve where to route requests, and decouples the consuming applications from understanding internal implementation of the identity services.

The IDCS functional view in FIG. 6A further includes public cloud infrastructure services that provide common functionality that IDCS depends on for user notifications (cloud notification service 718b), file storage (cloud storage service 716b), and metrics/alerting for DevOps (cloud monitoring service (EM) 722b and cloud metrics service (Graphite) 720b).

Cloud Gate

In one embodiment, IDCS implements a "Cloud Gate" in the web tier. In one embodiment, Cloud Gate is implemented by a web server plugin that enables web applications to externalize user SSO to an identity management system (e.g., IDCS), similar to WebGate or WebAgent technologies that work with enterprise IDM stacks. In one embodiment, Cloud Gate acts as a security gatekeeper that secures access to IDCS APIs. In one embodiment, Cloud Gate is implemented by a web/proxy server plugin that provides a web Policy Enforcement Point ("PEP") for protecting HTTP resources based on OAuth. In one embodiment, Cloud Gate also performs authentication (e.g., OAuth authentication).

In one embodiment, Cloud Gate may be deployed to protect a single-tenant application or a multi-tenant application, and may be deployed in proxy-mode front-ending different types of applications. In one embodiment, Cloud Gate supports single-tenant and multi-tenant applications by using respective default configurations for <Tenant> (represents what tenant owns the Cloud Gate instance) and <Host Identifier> (represents what application is being accessed). In one embodiment, local configurations specify default values for these artifacts, and may be overwritten on a per-request basis via HTTP headers supplied by the routing tier. For example, for a multi-tenant application, <Tenant> defines Cloud Gate's tenancy and is used to construct IDCS service URLs when contacting an IDCS server, and may be overwritten on a per-request basis by an optional X-RE-SOURCE-IDENTITY-DOMAIN-NAME header including <tenant-name> (e.g., "acme"). Further, for a multi-tenant application, <Host Identifier> defines the cookie domain and is used for managing local session cookies, and may be overwritten on a per-request basis by an optional "host" header supplied by the client or the routing tier (e.g., "acme.pcs1.dc4.oraclecloud.com").

In one embodiment, one instance of Cloud Gate is deployed for each tenant. However, in alternative embodiments, there may be multiple instances of Cloud Gate deployed for a tenant, for example, in a high-availability cluster of servers providing replication and failover. In one embodiment, Cloud Gate provides a multi-tenant mode that allows a single Cloud Gate instance to support multiple tenants, for example, when an "infrastructure" Cloud Gate is in front of IDCS itself (rather than in front of a tenant's application) and handles requests from multiple tenants before passing them on to IDCS services.

In one embodiment, Cloud Gate supports multi-tenancy by determining a particular tenant from the header values of the requests that are passed to it. Cloud Gate substitutes the tenancies in various URLs, and uses the URLs to look up application/host specific policies. Cloud Gate applies those policies for the request, and uses that information to pass along the request to the appropriate components of IDCS.

In one embodiment, the tenant indicated in the incoming request is not substituted (i.e., the incoming request is not modified), but used in requests made by Cloud Gate itself to IDCS services (e.g., policy lookups, credential validation, etc.). In one embodiment, Cloud Gate is provisioned with URLs for IDCS services, and these URLs may have placeholders for a tenant (e.g., "http://%tenant %.idcs.oracle.com") or may indicate the Cloud Gate's tenant. In this embodiment, the placeholder or the Cloud Gate's tenant is replaced with the tenant indicated in the incoming request so that a request by Cloud Gate to an IDCS service is made using the tenant specified in the incoming request.

For example, Cloud Gate may be protecting a docketing application in an enterprise cloud. The application may belong to the IDCS service that is being requested (e.g., may be an application developed by IDCS such as tenant-specific or user-specific administrative consoles) or may be developed by a tenant of IDCS. The docketing application may be used by multiple customers corresponding to respective tenants of IDCS. When a customer needs to access the application, it sends a request to IDCS, and the tenancy of the customer is indicated in the header of the request. Cloud Gate infers the tenancy from the request and looks up the particular policy that needs to be applied for that tenancy. Cloud Gate then applies the policy to that request, and if the policy allows the request to go through, then Cloud Gate asserts the tenancy and allows the request to reach the docketing application. In one embodiment, Cloud Gate asserts the tenancy by adding a header to the request with the tenant name, and the request is then forwarded on to the origin server. In one embodiment, Cloud Gate may only assert some of the tenants in this way, and the headers for the other tenants may already be present in the request or may have been added by a previous load-balancing server.

In one embodiment, a policy dictates if access to a particular resource identified through a request endpoint is allowed and what particular method of access is allowed to gain access to the resource. In one embodiment, for example, "/admin/v1/HTTPAuthenticator" is the endpoint for validating user credentials for browser-based HTTP Basic authentication, and the resource in this case is a credential validation service. In one embodiment, for example, a public access policy for a tenant may indicate that anyone in that tenant can access a resource (e.g., "/ui/v1/signin" which is the publicly-visible endpoint for the login page, "/ui/v1/pwdmustchange" and "/ui/v1/resetpwd" for password change and reset pages, etc.). When a public access policy for a tenant indicates that anyone in that tenant can access a resource, Cloud Gate allows any request for accessing that resource from that tenancy to get through. Another policy may require that a user needs to supply a username and password in order to access a resource (e.g., based on Basic Authentication), and the username and password are validated against an identity. A further policy may require token based authentication based on OAuth, in which case the resource requires an OAuth access token to be provided by a user or programmatic application to gain access to the resource in the backend. For example, a user may initiate an OpenID flow to obtain an OAuth access token to gain access to a resource, or a client application may gain programmatic access to the resource by obtaining the token ahead of time and then providing the token along with their credentials to gain access to the resource.

In one embodiment, the policies are specified in a file managed by the Cloud Gate. In one embodiment, the file is stored locally at the Cloud Gate. In an alternative or additional embodiment, the file may be stored on the server side within IDCS (e.g., in a policy store).

Figure 7:
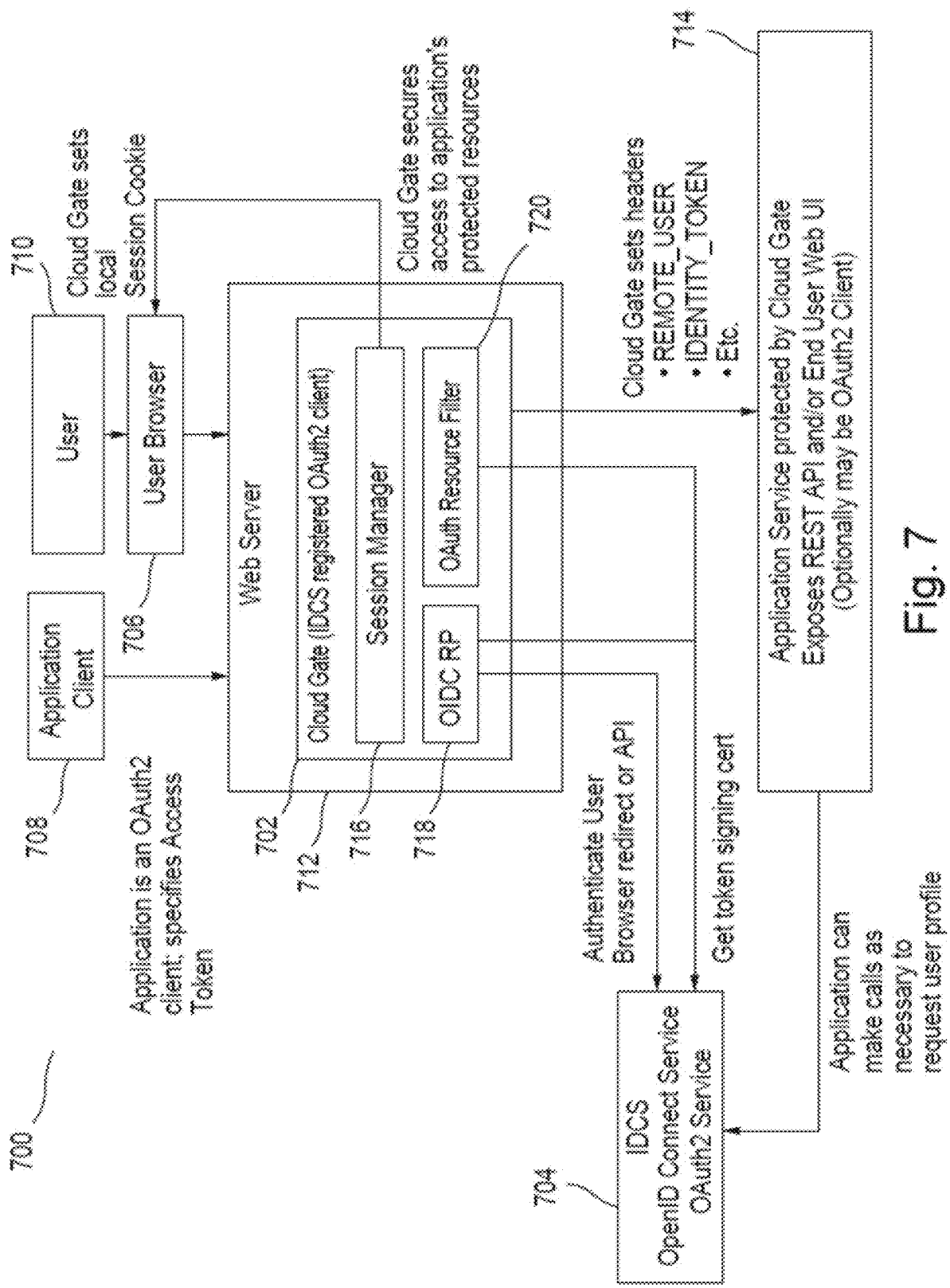
FIG. 7 is a block diagram of an embodiment that implements Cloud Gate.

FIG. 7 is a block diagram 700 of an embodiment that implements a Cloud Gate 702 running in a web server 712 and acting as a Policy Enforcement Point ("PEP") configured to integrate with IDCS Policy Decision Point ("PDP") using open standards (e.g., OAuth2, OpenID Connect, etc.) while securing access to web browser and REST API resources 714 of an application. In some embodiments, the PDP is implemented at OAuth and/or OpenID Connect microservices 704 of IDCS.

In the embodiment of FIG. 7, a program or application client 708 may be attempting to access resources 714 protected by Cloud Gate 702, or an end user 710 may use a web browser 706 on their computer to access resources 714 protected by Cloud Gate 702. In one embodiment, Cloud Gate 702 may implement different functionalities for protecting resources 714, depending on whether resources 714 are being accessed by end user 710 or programmatic application client 708.

In one embodiment, when a user browser 706 sends a request to IDCS for a login of a user 710, a corresponding IDCS PDP validates the credentials and then decides whether the credentials are sufficient (e.g., whether to request for further credentials such as a second password). In the embodiment of FIG. 7, Cloud Gate 702 may act both as the PEP and as the PDP since it has a local session. In one embodiment, Cloud Gate acts as a PEP by handling policy enforcement and determining how (or if) the user has to be authenticated, and the PDP handles the actual authentication. In one embodiment, Cloud Gate can act as a PDP if no authentication is required (e.g., via "public" policy) or if Cloud Gate's session cookie is present and validating the cookie can be done instead of validating credentials.

In one embodiment, for example, in order to access resource 714, user 710 may type in a corresponding URL in browser 706. Browser 706 takes user 710 to web server 712. Cloud Gate 702 then loads the corresponding policy. If the policy indicates that resource 714 is protected, Cloud Gate 702 initiates any required authentication process. In one embodiment, Cloud Gate 702 does not directly challenge the user (i.e., it is not responsible for any UI), but once the user is challenged for authentication, Cloud Gate 702 validates user credentials (e.g., for Basic Auth). For example, when user 710 enters their username and password, Cloud Gate 702 sends the username and password to a corresponding microservice 704 in IDCS (e.g., OAuth2) to authenticate user 710. If the authentication is performed successfully, Cloud Gate 702 allows user 710 to access resource 714.

In one embodiment, Cloud Gate 702 acts as an HTTP Basic Auth authenticator, validating HTTP Basic Auth credentials against IDCS. This behavior is supported in both session-less and session-based (local session cookie) modes. No server-side IDCS session is created in this case. For HTTP Basic Authentication, Cloud Gate 702 returns an HTTP "unauthorized" status code to the browser, which in response displays a dialog prompting for username/password. Those credentials are submitted to Cloud Gate 702, which authenticates them against IDCS.

In one embodiment, for authentication according to OAuth, Cloud Gate 702 returns an HTTP redirect status code, which directs the browser to the OAuth microservice, which, together with the SSO microservice, handles the actual login flow, including displaying the login page in the browser and authenticating the credentials provided by the user. During web browser-based user access, Cloud Gate 702 acts as an OIDC RP 718 initiating a user authentication flow. If user 710 has no valid local user session, Cloud Gate 702 re-directs the user to the SSO microservice and participates in the OIDC "Authorization Code" flow with the SSO microservice. The flow concludes with the delivery of a JWT as an identity token. Cloud Gate 708 validates the JWT (e.g., looks at signature, expiration, destination/audience, etc.) and issues a local session cookie for user 710. It acts as a session manager 716 securing web browser access to protected resources and issuing, updating, and validating the local session cookie. It also provides a logout URL for removal of its local session cookie.

In one embodiment, for example, in order to access resource 714 protected by Cloud Gate 702, a programmatic application client 708 makes a corresponding request to web server 712, and along with that request, application client 708 sends an OAuth token. Cloud Gate 702 receives the token and connects to the OAuth service 704 to validate the OAuth token against OAuth2 service 704. Once the token is validated, Cloud Gate 702 allows application client 708 to access the protected resource 714.

In one embodiment, application client 708 may obtain the token in a pre-registration process (e.g., performed by an administrator). In the pre-registration process, application client 708 registers itself in IDCS as a trusted application that is allowed to access protected resources 714. The token may be generated by the IDCS OAuth microservice.

As part of one-time deployment, Cloud Gate 702 is registered with IDCS as an OAuth2 client, enabling it to request OIDC and OAuth2 operations against IDCS. Thereafter, it maintains configuration information about an application's protected and unprotected resources, subject to request matching rules (how to match URLs, e.g., with wild cards, regular expressions, etc.). Cloud Gate 702 can be deployed to protect different applications having different security policies, and the protected applications can be multi-tenant.

During programmatic access by REST API clients 708, Cloud Gate 702 may act as an OAuth2 resource server/filter 720 for an application's protected REST APIs 714. It checks for the presence of a request with an authorization header and an access token. When client 708 (e.g., mobile, web apps, JavaScript, etc.) presents an access token (issued by IDCS) to use with a protected REST API 714, Cloud Gate 702 validates the access token before allowing access to the API (e.g., signature, expiration, audience, etc.). The original access token is passed along unmodified.

Figure 7A:
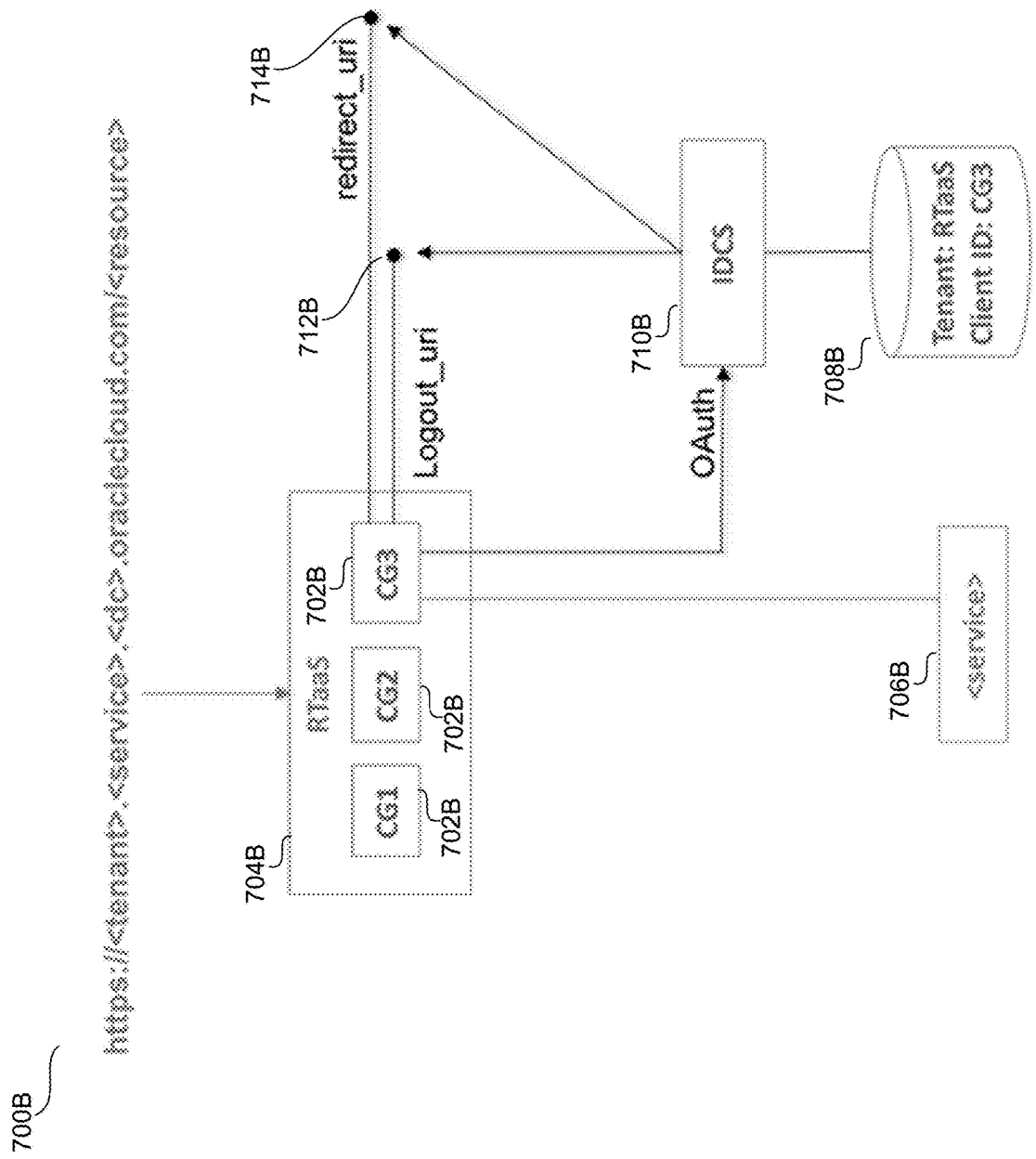
FIG. 7A is a block diagram illustrating host identifier functionality in an embodiment that implements Cloud Gate.

FIG. 7A is an example block diagram 700B illustrating how a Cloud Gate 702B handles host identifiers. Each host identifier represents a logical web domain associated with an application protected by Cloud Gate 702B. In the example embodiment of FIG. 7A, a general format for the URLs received by a Routing Tier as a Service ("RTaaS") 704B is:

https://<tenant>.<service>.<dc>.oraclecloud.com/<resource> identifying the tenancy at the beginning (<tenant>), then a service (<service>), the data center (<dc>), the root domain (<oraclecloud.com>), and a resource API endpoint at the end (<resource>). In one embodiment, at runtime during request processing, Cloud Gate 702B uses the host identifier supplied by the client or the routing tier (i.e., RTaaS 704B) via the "host" header. If no host identifier is available from the routing tier or no match is found, then Cloud Gate 702B constructs the host identifier from its own "<default host identifier>". In one embodiment, more than one host identifiers may be used by the IDCS routing tier for an application, and each request passing through Cloud Gate 702B is processed in the context of the respective host identifier, including scoping of the local session cookie and resolving the access policy file. For example, when Cloud Gate 702B receives a URL, it looks at the corresponding host identifier and determines what policy needs to be applied.

In one embodiment, RTaaS 704B has multiple physical web proxies, each having a physical Cloud Gate 702B defined in the RTaaS IDCS account 708B. Each web proxy and its corresponding Cloud Gate 702B support a number of virtual hosts (e.g., between 1 to 30000 virtual hosts). Each virtual host represents a web tier per service instance 706B as assigned by RTaaS 704B. On each request, RTaaS 704B sets a header with the name of the virtual host (e.g., "coke.docs.dc4.oraclecloud.com", "pepsi.mcs.dc4.oraclecloud.com", "intel.pcs.dc4.oraclecloud.com", etc.). In one embodiment, session cookies at Cloud Gate 702B are scoped to a virtual host, and proper re-entrance functionality is implemented. For example, Cloud Gate 702B may receive AZ code on a "redirect_uri" endpoint 714B to set a cookie, and may receive a request on a "logout_uri" endpoint 712B to clear a cookie.

In one embodiment, each physical Cloud Gate instance exposes a corresponding fixed "redirect_uri" endpoint 714B and a corresponding fixed "logout_uri" endpoint 712B that are defined in the OAuth profile registered for that Cloud Gate instance. The URIs are used in interactions between Cloud Gate 702B and OIDC. In one embodiment, OIDC validates the "redirect_uri" parameter against known redirect URIs for the Cloud Gate from which the request is originating. In one embodiment, a match does not have to be "exact" in terms of comparing string values, but it has to satisfy the condition that it is the same physical instance of the Cloud Gate regardless of the matching algorithm. In one embodiment, the "logout_uri" is saved in IDCS 710B as part of the respective Cloud Gate's registered OAuth profile, and that Cloud Gate does not pass the "logout_uri" to the server in any of its interactions. When fully constructed, the "redirect_uri" and the "logout_uri" are assumed to include a tenant template and are translated prior to use by the respective Cloud Gate 702B and by OIDC.

In one embodiment, the interactions between Cloud Gate 702B and IDCS servers 7106 treat the combination of the physical Cloud Gate 702B and the host identifier as one logical OAuth RP. In the operations initiated by Cloud Gate 702B to IDCS OIDC microservice, and by IDCS OIDC microservice to Cloud Gate 702B, the host identifier is sent via the "X-HOST-IDENTIFIER-NAME" query string parameter. When invoking login/logout requests by Cloud Gate 702B, the host identifier query string parameter is sent by Cloud Gate 702B from the host identifier header it received from the client or the routing tier. When tracking the RP in the request cookie created by IDCS OIDC microservice, the value of the host identifier query string parameter is saved per RP in the request cookie. When invoking the RP's "redirect_uri" and "logout_uri" by IDCS OIDC microservice, the host identifier query string parameter is sent by IDCS OIDC microservice from the host identifier value saved in the request cookie.

Generally, OAuth is used to generate either a client identity propagation token (e.g., indicating who the client is) or a user identity propagation token (e.g., indicating who the user is). In the embodiments, the implementation of OAuth in Cloud Gate is based on a JWT which defines a format for web tokens, as provided by, e.g., IETF, RFC 7519.

When a user logs in, a JWT is issued. The JWT is signed by IDCS and supports multi-tenant functionality in IDCS. Cloud Gate validates the JWT issued by IDCS to allow for multi-tenant functionality in IDCS. Accordingly, IDCS provides multi-tenancy in the physical structure as well as in the logical business process that underpins the security model.

Tenancy Types

IDCS specifies three types of tenancies: customer tenancy, client tenancy, and user tenancy. Customer or resource tenancy specifies who the customer of IDCS is (i.e., for whom is the work being performed). Client tenancy specifies which client application is trying to access data (i.e., what application is doing the work). User tenancy specifies which user is using the application to access data (i.e., by whom is the work being performed). For example, when a professional services company provides system integration functionality for a warehouse club and uses IDCS for providing identity management for the warehouse club systems, user tenancy corresponds to the professional services company, client tenancy is the application that is used to provide system integration functionality, and customer tenancy is the warehouse club.

Separation and identification of these three tenancies enables multi-tenant functionality in a cloud-based service. Generally, for on-premise software that is installed on a physical machine on-premise, there is no need to specify three different tenancies since a user needs to be physically on the machine to log in. However, in a cloud-based service structure, embodiments use tokens to determine who is using what application to access which resources. The three tenancies are codified by tokens, enforced by Cloud Gate, and used by the business services in the middle tier. In one embodiment, an OAuth server generates the tokens. In various embodiments, the tokens may be used in conjunction with any security protocol other than OAuth.

Decoupling user, client, and resource tenancies provides substantial business advantages for the users of the services provided by IDCS. For example, it allows a service provider that understands the needs of a business (e.g., a healthcare business) and their identity management problems to buy services provided by IDCS, develop their own backend application that consumes the services of IDCS, and provide the backend applications to the target businesses. Accordingly, the service provider may extend the services of IDCS to provide their desired capabilities and offer those to certain target businesses. The service provider does not have to build and run software to provide identity services but can instead extend and customize the services of IDCS to suit the needs of the target businesses.

Some known systems only account for a single tenancy which is customer tenancy. However, such systems are inadequate when dealing with access by a combination of users such as customer users, customer's partners, customer's clients, clients themselves, or clients that customer has delegated access to. Defining and enforcing multiple tenancies in the embodiments facilitates the identity management functionality over such variety of users.

In one embodiment, one entity of IDCS does not belong to multiple tenants at the same time; it belongs to only one tenant, and a "tenancy" is where artifacts live. Generally, there are multiple components that implement certain functions, and these components can belong to tenants or they can belong to infrastructure. When infrastructure needs to act on behalf of tenants, it interacts with an entity service on behalf of the tenant. In that case, infrastructure itself has its own tenancy and customer has its own tenancy. When a request is submitted, there can be multiple tenancies involved in the request.

For example, a client that belongs to "tenant 1" may execute a request to get a token for "tenant 2" specifying a user in "tenant 3." As another example, a user living in "tenant 1" may need to perform an action in an application owned by "tenant 2". Thus, the user needs to go to the resource namespace of "tenant 2" and request a token for themselves. Accordingly, delegation of authority is accomplished by identifying "who" can do "what" to "whom." As yet another example, a first user working for a first organization ("tenant 1") may allow a second user working for a second organization ("tenant 2") to have access to a document hosted by a third organization ("tenant 3").

In one example, a client in "tenant 1" may request an access token for a user in "tenant 2" to access an application in "tenant 3". The client may do so by invoking an OAuth request for the token by going to "http://tenant3/oauth/token". The client identifies itself as a client that lives in "tenant 1" by including a "client assertion" in the request. The client assertion includes a client ID (e.g., "client 1") and the client tenancy "tenant 1". As "client 1" in "tenant 1", the client has the right to invoke a request for a token on "tenant 3", and the client wants the token for a user in "tenant 2". Accordingly, a "user assertion" is also passed as part of the same HTTP request to identify "tenant 2" as the tenancy of the user, and a header of the request identifies "tenant 3" as the tenancy of the resource/application. As a result, the request identifies the tenancy of the client, the tenancy of the user, and the tenancy of the resource. The access token that is generated will be issued in the context of the target tenancy which is the application tenancy ("tenant 3") and will include the user tenancy ("tenant 2"). Accordingly, the access token identifies the tenancy of the resource/application and the tenancy of the user.

Figure 8:
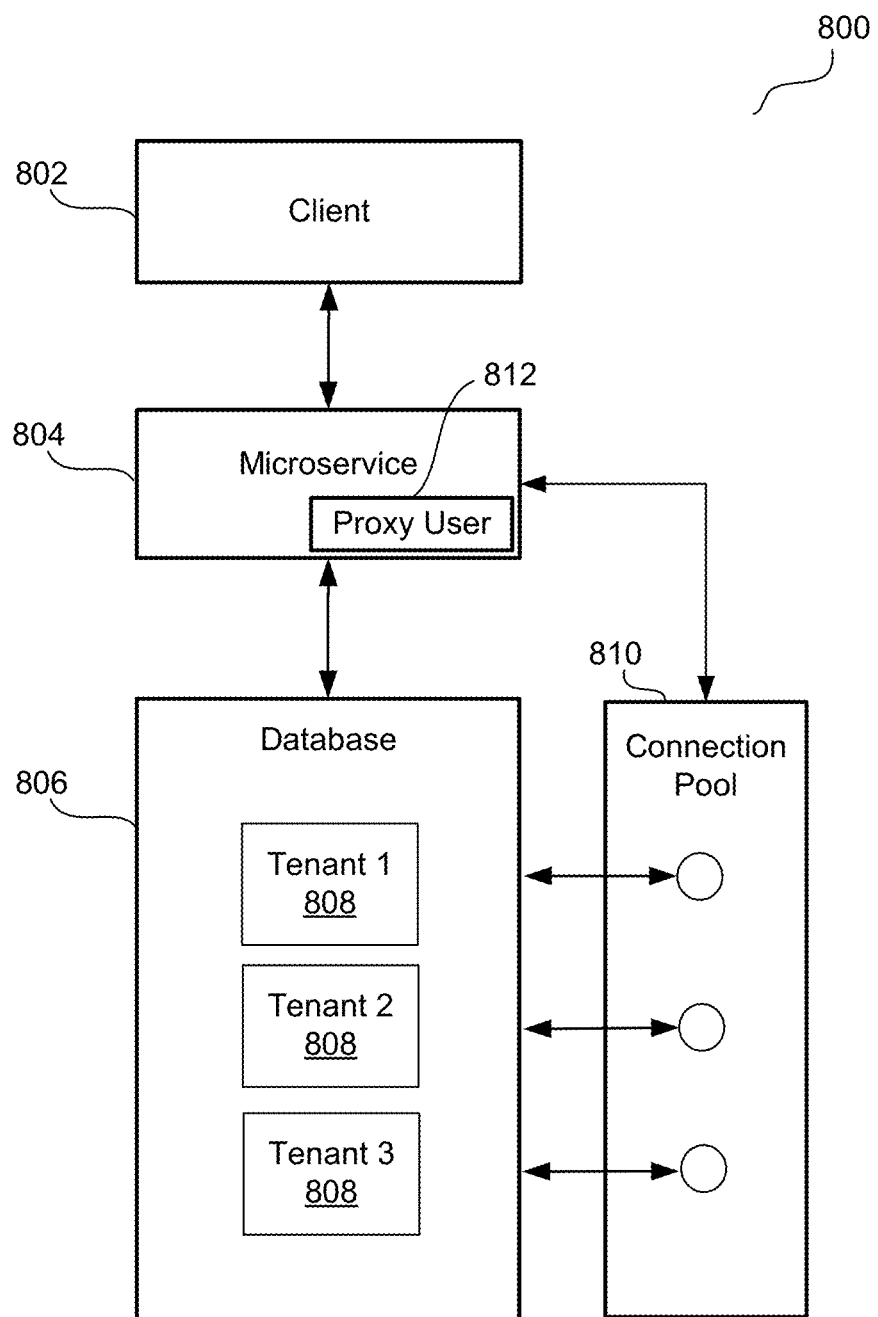
FIG. 8 illustrates an example system that implements multiple tenancies in one embodiment.

In one embodiment, in the data tier, each tenant is implemented as a separate stripe. From a data management perspective, artifacts live in a tenant. From a service perspective, a service knows how to work with different tenants, and the multiple tenancies are different dimensions in the business function of a service. FIG. 8 illustrates an example system 800 implementing multiple tenancies in an embodiment. System 800 includes a client 802 that requests a service provided by a microservice 804 that understands how to work with data in a database 806. Database 806 includes multiple tenants 808 and each tenant includes the artifacts of the corresponding tenancy. In one embodiment, microservice 804 is an OAuth microservice requested through https://tenant3/oauth/token by a client in "tenant 1" for getting a token for a user in "tenant 2" to access an application in "tenant 3", and database 806 stores data of the tenancy of the client ("tenant 1"), the tenancy of the user ("tenant 2"), and the tenancy of the resource/application ("tenant 3"). The function of the OAuth microservice is performed in microservice 804 using data from database 806 to verify that the request of client 802 is legitimate, and if it is legitimate, use the data from different tenancies 808 to construct the token. Accordingly, system 800 is multi-tenant in that it can work in a cross-tenant environment by not only supporting services coming into each tenancy, but also supporting services that can act on behalf of different tenants.

System 800 is advantageous since microservice 804 is physically decoupled from the data in database 806, and by replicating the data across locations that are closer to the client, microservice 804 can be provided as a local service to the clients and system 800 can manage the availability of the service and provide it globally.

In one embodiment, microservice 804 is stateless, meaning that the machine that runs microservice 804 does not maintain any markers pointing the service to any specific tenants. Instead, a tenancy may be marked, for example, on the host portion of a URL of a request that comes in. That tenancy points to one of tenants 808 in database 806. When supporting a large number of tenants (e.g., millions of tenants), microservice 804 cannot have the same number of connections to database 806, but instead uses a connection pool 810 which provides the actual physical connections to database 806 in the context of a database user. Generally, connections are built by supplying an underlying driver or provider with a connection string, which is used to address a specific database or server and to provide instance and user authentication credentials (e.g., "Server=sql_box; Database= Common; User ID=uid; Pwd=password;"). Once a connection has been built, it can be opened and closed, and properties (e.g., the command time-out length, or transaction, if one exists) can be set. The connection string includes a set of key-value pairs, dictated by the data access interface of the data provider. A connection pool is a cache of database connections maintained so that the connections can be reused when future requests to a database are required. In connection pooling, after a connection is created, it is placed in the pool and it is used again so that a new connection does not have to be established. For example, when there needs to be ten connections between microservice 804 and database 808, there will be ten open connections in connection pool 810, all in the context of a database user (e.g., in association with a specific database user, e.g., who is the owner of that connection, whose credentials are being validated, is it a database user, is it a system credential, etc.).

The connections in connection pool 810 are created for a system user that can access anything. Therefore, in order to correctly handle auditing and privileges by microservice 804 processing requests on behalf of a tenant, the database operation is performed in the context of a "proxy user" 812 associated with the schema owner assigned to the specific tenant. This schema owner can access only the tenancy that the schema was created for, and the value of the tenancy is the value of the schema owner. When a request is made for data in database 806, microservice 804 uses the connections in connection pool 810 to provide that data. Accordingly, multi-tenancy is achieved by having stateless, elastic middle tier services process incoming requests in the context of (e.g., in association with) the tenant-specific data store binding established on a per request basis on top of the data connection created in the context of (e.g., in association with) the data store proxy user associated with the resource tenancy, and the database can scale independently of the services.

The following provides an example functionality for implementing proxy user 812:
    dbOperation=<prepare DB command to execute>
    dbConnection=getDBConnectionFromPool( )
    dbConnection.setProxyUser (resourceTenant)
    result=dbConnection.executeOperation (dbOperation)
In this functionality, microservice 804 sets the "Proxy User" setting on the connection pulled from connection pool 810 to the "Tenant," and performs the database operation in the context of the tenant while using the database connection in connection pool 810.

When striping every table to configure different columns in a same database for different tenants, one table may include all tenants' data mixed together. In contrast, one embodiment provides a tenant-driven data tier. The embodiment does not stripe the same database for different tenants, but instead provides a different physical database per tenant. For example, multi-tenancy may be implemented by using a pluggable database (e.g., Oracle Database 12c from Oracle Corp.) where each tenant is allocated a separate partition. At the data tier, a resource manager processes the request and then asks for the data source for the request (separate from metadata). The embodiment performs runtime switch to a respective data source/store per request. By isolating each tenant's data from the other tenants, the embodiment provides improved data security.

In one embodiment, various tokens codify different tenancies. A URL token may identify the tenancy of the application that requests a service. An identity token may codify the identity of a user that is to be authenticated. An access token may identify multiple tenancies. For example, an access token may codify the tenancy that is the target of such access (e.g., an application tenancy) as well as the user tenancy of the user that is given access. A client assertion token may identify a client ID and the client tenancy. A user-assertion token may identify the user and the user tenancy.

In one embodiment, an identity token includes at least a "claim" [as used by one of ordinary skill in the security field] indicating the user tenant name (i.e., where the user lives). A "claim" in connection with authorization tokens is a statement that one subject makes about itself or another subject. The statement can be about a name, identity, key, group, privilege, or capability, for example. Claims are issued by a provider, and they are given one or more values and then packaged in security tokens that are issued by an issuer, commonly known as a security token service ("STS").

In one embodiment, an access token includes at least a claim/statement indicating the resource tenant name at the time the request for the access token was made (e.g., the customer), a claim/statement indicating the user tenant name, a claim/statement indicating the name of the OAuth client making the request, and a claim/statement indicating the client tenant name.

In one embodiment, an access token may be implemented according to the following JSON functionality:

```
{
    ...
    " tok_type " : "AT",
    "user_id" : "testuser",
    "user_tenantname" : "<value-of-identity-tenant>"
    "tenant" : "<value-of-resource-tenant>"
    "client_id" : "testclient",
    "client_tenantname": "<value-of-client-tenant>"
    ...
}
```

In one embodiment, a client assertion token includes at least a claim/statement indicating the client tenant name, and a claim/statement indicating the name of the OAuth client making the request.

The tokens and/or multiple tenancies described herein may be implemented in any multi-tenant cloud-based service other than IDCS. For example, the tokens and/or multiple tenancies described herein may be implemented in SaaS or Enterprise Resource Planning ("ERP") services.

Figure 9:
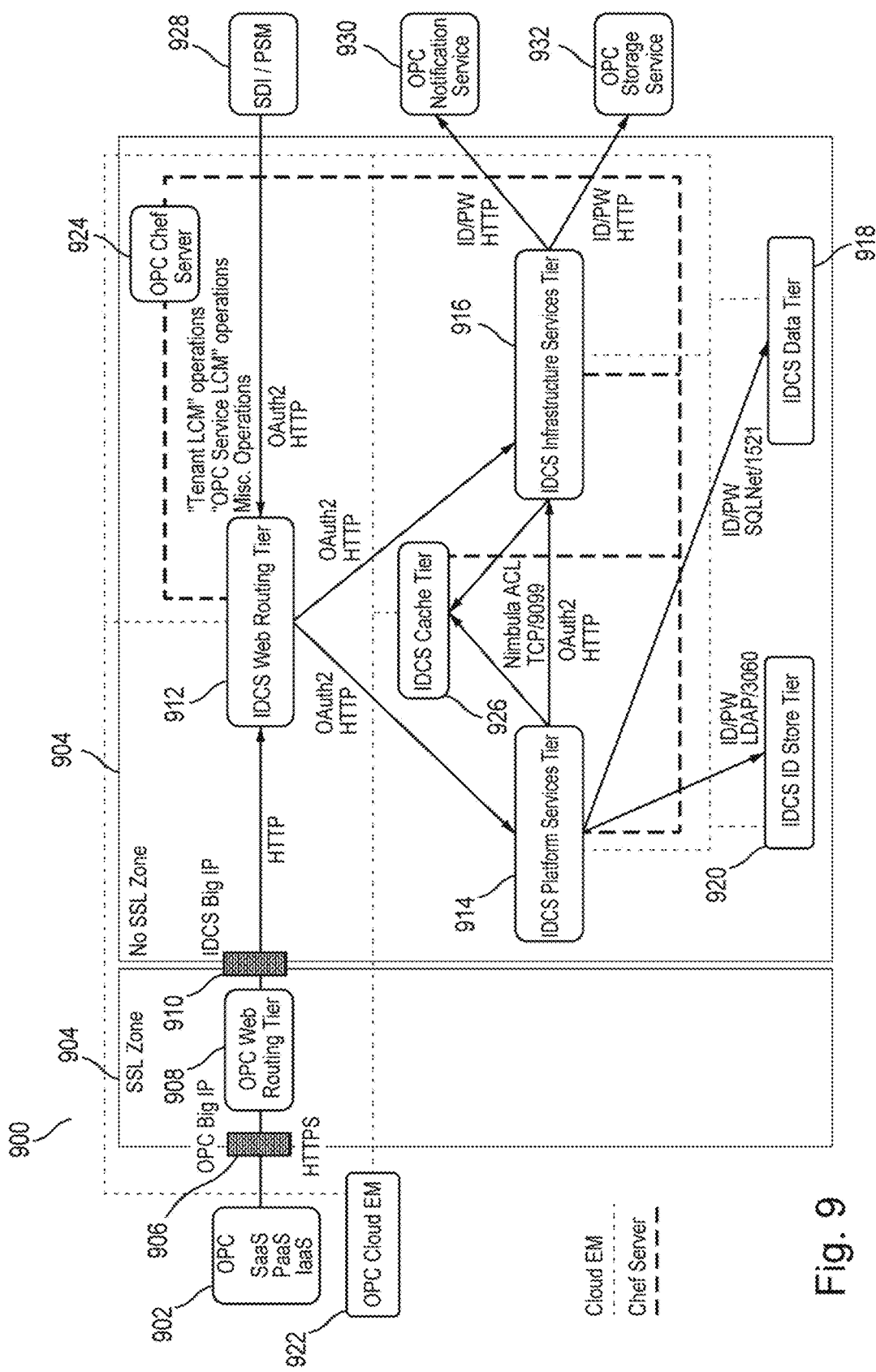
FIG. 9 is a block diagram of a network view of an embodiment.

FIG. 9 is a block diagram of a network view 900 of IDCS in one embodiment. FIG. 9 illustrates network interactions that are performed in one embodiment between application "zones" 904. Applications are broken into zones based on the required level of protection and the implementation of connections to various other systems (e.g., SSL zone, no SSL zone, etc.). Some application zones provide services that require access from the inside of IDCS, while some application zones provide services that require access from the outside of IDCS, and some are open access. Accordingly, a respective level of protection is enforced for each zone.

In the embodiment of FIG. 9, service to service communication is performed using HTTP requests. In one embodiment, IDCS uses the access tokens described herein not only to provide services but also to secure access to and within IDCS itself. In one embodiment, IDCS microservices are exposed through RESTful interfaces and secured by the tokens described herein.

In the embodiment of FIG. 9, any one of a variety of applications/services 902 may make HTTP calls to IDCS APIs to use IDCS services. In one embodiment, the HTTP requests of applications/services 902 go through an Oracle Public Cloud Load Balancing External Virtual IP address ("VIP") 906 (or other similar technologies), a public cloud web routing tier 908, and an IDCS Load Balancing Internal VIP appliance 910 (or other similar technologies), to be received by IDCS web routing tier 912. IDCS web routing tier 912 receives the requests coming in from the outside or from the inside of IDCS and routes them across either an IDCS platform services tier 914 or an IDCS infrastructure services tier 916. IDCS platform services tier 914 includes IDCS microservices that are invoked from the outside of IDCS, such as OpenID Connect, OAuth, SAML, SCIM, etc. IDCS infrastructure services tier 916 includes supporting microservices that are invoked from the inside of IDCS to support the functionality of other IDCS microservices. Examples of IDCS infrastructure microservices are UI, SSO, reports, cache, job scheduler, service manager, functionality for making keys, etc. An IDCS cache tier 926 supports caching functionality for IDCS platform services tier 914 and IDCS infrastructure services tier 916.

By enforcing security both for outside access to IDCS and within IDCS, customers of IDCS can be provided with outstanding security compliance for the applications they run.

In the embodiment of FIG. 9, other than the data tier 918 which communicates based on Structured Query Language ("SQL") and the ID store tier 920 that communicates based on LDAP, OAuth protocol is used to protect the communication among IDCS components (e.g., microservices) within IDCS, and the same tokens that are used for securing access from the outside of IDCS are also used for security within IDCS. That is, web routing tier 912 uses the same tokens and protocols for processing the requests it receives regardless of whether a request is received from the outside of IDCS or from the inside of IDCS. Accordingly, IDCS provides a single consistent security model for protecting the entire system, thereby allowing for outstanding security compliance since the fewer security models implemented in a system, the more secure the system is.

In the IDCS cloud environment, applications communicate by making network calls. The network call may be based on an applicable network protocol such as HTTP, Transmission Control Protocol ("TCP"), User Datagram Protocol ("UDP"), etc. For example, an application X may communicate with an application Y based on HTTP by exposing application Y as an HTTP Uniform Resource Locator ("URL"). In one embodiment, Y is an IDCS microservice that exposes a number of resources each corresponding to a capability. When X (e.g., another IDCS microservice) needs to call Y, it constructs a URL that includes Y and the resource/capability that needs to be invoked (e.g., https:/host/Y/resource), and makes a corresponding REST call which goes through web routing tier 912 and gets directed to Y.

In one embodiment, a caller outside the IDCS may not need to know where Y is, but web routing tier 912 needs to know where application Y is running. In one embodiment, IDCS implements discovery functionality (implemented by an API of OAuth service) to determine where each application is running so that there is no need for the availability of static routing information.

In one embodiment, an enterprise manager ("EM") 922 provides a "single pane of glass" that extends on-premise and cloud-based management to IDCS. In one embodiment, a "Chef" server 924 which is a configuration management tool from Chef Software, Inc., provides configuration management functionality for various IDCS tiers. In one embodiment, a service deployment infrastructure and/or a persistent stored module 928 may send OAuth2 HTTP messages to IDCS web routing tier 912 for tenant lifecycle management operations, public cloud lifecycle management operations, or other operations. In one embodiment, IDCS infrastructure services tier 916 may send ID/password HTTP messages to a public cloud notification service 930 or a public cloud storage service 932.

Cloud Access Control—SSO

One embodiment supports lightweight cloud standards for implementing a cloud scale SSO service. Examples of lightweight cloud standards are HTTP, REST, and any standard that provides access through a browser (since a web browser is lightweight). On the contrary, SOAP is an example of a heavy cloud standard which requires more management, configuration, and tooling to build a client with. The embodiment uses OpenID Connect semantics for applications to request user authentication against IDCS. The embodiment uses lightweight HTTP cookie-based user session tracking to track user's active sessions at IDCS without statefull server-side session support. The embodiment uses JWT-based identity tokens for applications to use in mapping an authenticated identity back to their own local session. The embodiment supports integration with federated identity management systems, and exposes SAML IDP support for enterprise deployments to request user authentication against IDCS.

Figure 10:
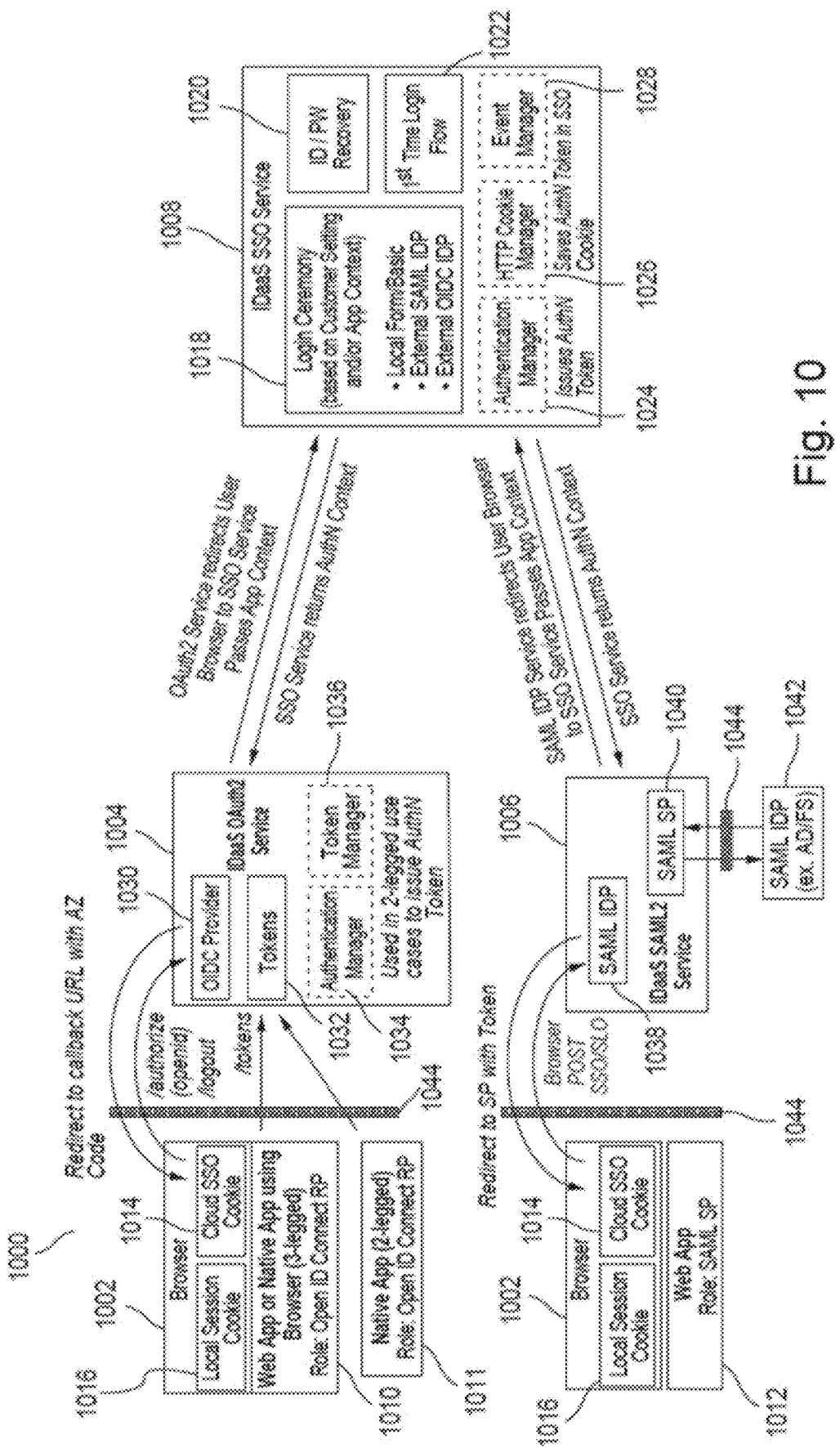
FIG. 10 is a block diagram of a system architecture view of single sign-on ("SSO") functionality in one embodiment.

FIG. 10 is a block diagram 1000 of a system architecture view of SSO functionality in IDCS in one embodiment. The embodiment enables client applications to leverage standards-based web protocols to initiate user authentication flows. Applications requiring SSO integration with a cloud system may be located in enterprise data centers, in remote partner data centers, or even operated by a customer on-premise. In one embodiment, different IDCS platform services implement the business of SSO, such as OpenID Connect for processing login/logout requests from connected native applications (i.e., applications utilizing OpenID Connect to integrate with IDCS); SAML IDP service for processing browser-based login/logout requests from connected applications; SAML SP service for orchestrating user authentication against an external SAML IDP; and an internal IDCS SSO service for orchestrating end user login ceremony including local or federated login flows, and for managing IDCS host session cookie. Generally, HTTP works either with a form or without a form. When it works with a form, the form is seen within a browser. When it works without a form, it functions as a client to server communication. Both OpenID Connect and SAML require the ability to render a form, which may be accomplished by presence of a browser or virtually performed by an application that acts as if there is a browser. In one embodiment, an application client implementing user authentication/SSO through IDCS needs to be registered in IDCS as an OAuth2 client and needs to obtain client identifier and credentials (e.g., ID/password, ID/certificate, etc.).

The example embodiment of FIG. 10 includes three components/microservices that collectively provide login capabilities, including two platform microservices: OAuth2 1004 and SAML2 1006, and one infrastructure microservice: SSO 1008. In the embodiment of FIG. 10, IDCS provides an "Identity Metasystem" in which SSO services 1008 are provided over different types of applications, such as browser-based web or native applications 1010 requiring 3-legged OAuth flow and acting as an OpenID Connect relaying party ("RP," an application that outsources its user authentication function to an IDP), native applications 1011 requiring 2-legged OAuth flow and acting as an OpenID Connect RP, and web applications 1012 acting as a SAML SP.

Generally, an Identity Metasystem is an interoperable architecture for digital identity, allowing for employing a collection of digital identities based on multiple underlying technologies, implementations, and providers. LDAP, SAML, and OAuth are examples of different security standards that provide identity capability and can be the basis for building applications, and an Identity Metasystem may be configured to provide a unified security system over such applications. The LDAP security model specifies a specific mechanism for handling identity, and all passes through the system are to be strictly protected. SAML was developed to allow one set of applications securely exchange information with another set of applications that belong to a different organization in a different security domain. Since there is no trust between the two applications, SAML was developed to allow for one application to authenticate another application that does not belong to the same organization. OAuth provides OpenID Connect that is a lightweight protocol for performing web based authentication.

In the embodiment of FIG. 10, when an OpenID application 1010 connects to an OpenID server in IDCS, its "channels" request SSO service. Similarly, when a SAML application 1012 connects to a SAML server in IDCS, its "channels" also request SSO service. In IDCS, a respective microservice (e.g., an OpenID microservice 1004 and a SAML microservice 1006) will handle each of the applications, and these microservices request SSO capability from SSO microservice 1008. This architecture can be expanded to support any number of other security protocols by adding a microservice for each protocol and then using SSO microservice 1008 for SSO capability. SSO microservice 1008 issues the sessions (i.e., an SSO cookie 1014 is provided) and is the only system in the architecture that has the authority to issue a session. An IDCS session is realized through the use of SSO cookie 1014 by browser 1002. Browser 1002 also uses a local session cookie 1016 to manage its local session.

In one embodiment, for example, within a browser, a user may use a first application based on SAML and get logged in, and later use a second application built with a different protocol such as OAuth. The user is provided with SSO on the second application within the same browser. Accordingly, the browser is the state or user agent and maintains the cookies.

In one embodiment, SSO microservice 1008 provides login ceremony 1018, ID/password recovery 1020, first time login flow 1022, an authentication manager 1024, an HTTP cookie manager 1026, and an event manager 1028. Login ceremony 1018 implements SSO functionality based on customer settings and/or application context, and may be configured according to a local form (i.e., basic Auth), an external SAML IDP, an external OIDC IDP, etc. ID/password recovery 1020 is used to recover a user's ID and/or password. First time login flow 1022 is implemented when a user logs in for the first time (i.e., an SSO session does not yet exist). Authentication manager 1024 issues authentication tokens upon successful authentication. HTTP cookie manager 1026 saves the authentication token in an SSO cookie. Event manager 1028 publishes events related to SSO functionality.

In one embodiment, interactions between OAuth microservice 1004 and SSO microservice 1008 are based on browser redirects so that SSO microservice 1008 challenges the user using an HTML form, validates credentials, and issues a session cookie.

In one embodiment, for example, OAuth microservice 1004 may receive an authorization request from browser 1002 to authenticate a user of an application according to 3-legged OAuth flow. OAuth microservice 1004 then acts as an OIDC provider 1030, redirects browser 1002 to SSO microservice 1008, and passes along application context. Depending on whether the user has a valid SSO session or not, SSO microservice 1008 either validates the existing session or performs a login ceremony. Upon successful authentication or validation, SSO microservice 1008 returns authentication context to OAuth microservice 1004. OAuth microservice 1004 then redirects browser 1002 to a callback URL with an authorization ("AZ") code. Browser 1002 sends the AZ code to OAuth microservice 1004 to request the required tokens 1032. Browser 1002 also includes its client credentials (obtained when registering in IDCS as an OAuth2 client) in the HTTP authorization header. OAuth microservice 1004 in return provides the required tokens 1032 to browser 1002. In one embodiment, tokens 1032 provided to browser 1002 include JW identity and access tokens signed by the IDCS OAuth2 server. Further details of this functionality are disclosed below with reference to FIG. 11.

In one embodiment, for example, OAuth microservice 1004 may receive an authorization request from a native application 1011 to authenticate a user according to a 2-legged OAuth flow. In this case, an authentication manager 1034 in OAuth microservice 1004 performs the corresponding authentication (e.g., based on ID/password received from a client 1011) and a token manager 1036 issues a corresponding access token upon successful authentication.

In one embodiment, for example, SAML microservice 1006 may receive an SSO POST request from a browser to authenticate a user of a web application 1012 that acts as a SAML SP. SAML microservice 1006 then acts as a SAML IDP 1038, redirects browser 1002 to SSO microservice 1008, and passes along application context. Depending on whether the user has a valid SSO session or not, SSO microservice 1008 either validates the existing session or performs a login ceremony. Upon successful authentication or validation, SSO microservice 1008 returns authentication context to SAML microservice 1006. SAML microservice then redirects to the SP with required tokens.

In one embodiment, for example, SAML microservice 1006 may act as a SAML SP 1040 and go to a remote SAML IDP 1042 (e.g., an active directory federation service ("ADFS")). One embodiment implements the standard SAML/AD flows. In one embodiment, interactions between SAML microservice 1006 and SSO microservice 1008 are based on browser redirects so that SSO microservice 1008 challenges the user using an HTML form, validates credentials, and issues a session cookie.

In one embodiment, the interactions between a component within IDCS (e.g., 1004, 1006, 1008) and a component outside IDCS (e.g., 1002, 1011, 1042) are performed through firewalls 1044.

SSO Service

In one embodiment, in the cloud environment of IDCS, when a tenant is provisioned and requires protection for its application, IDCS provides identity functionality such as authentication, authorization, audit, etc. When a user needs to use the application, IDCS provides the complete security of the identity of the user, and a particular type of token is generated and user access is established or secured for the application.

In one embodiment, the SSO service is used to protect different types of clients/applications, where access to each particular application is protected by a standard protocol, such as OAuth or SAML. The protocol dictates the token format, what tokens are required, and what browser semantics are required to generate a particular token. Upon receiving the token, an application may use the token-based claims to give access to a particular user. In one embodiment, the token demands who the user is, who the actor is, what the scope is, and what is the audience that is being accessed. In one embodiment, the token is different for OAuth and SAML, and includes the semantics of the user claim/statement which the user establishes after authentication.

Generally, standard-based protocols such as OAuth and SAML do not dictate or provide any specification that indicates how to generate a token or how users should be authenticated. Instead, they only require users to be authenticated and dictate which token should be obtained. For example, for an OAuth or SAML token, the protocol only dictates the semantics for the token, but does not dictate or specify how the user should be authenticated, logged in, logged out, etc.

In one embodiment, however, the IDCS SSO service defines how a particular user is authenticated (e.g., whether the authentication is one-factor, two-factor, biometric, etc.). In this embodiment, a sign-on policy or access policy indicates how a user is authenticated to access an application. In one embodiment, after performing the authentication, IDCS converts the authentication into an IDCS session or "global session" (e.g., configured as a session cookie or a session token). The global session is a cloud-aware session with specific semantics/format, and is configured for the IDCS multi-tenant environment. Depending on a particular identity task to be performed for an application, IDCS can convert the global session into an applicable token (e.g., an OAuth token, a SAML token, etc.) and provide the token to the application.

In one embodiment, the SSO service is a common controller system that can be used for any protocol (e.g., OAuth, SAML, social token, social service, etc., or any newly developed specification). In one embodiment, when a request is received by the SSO service, the request parameters are normalized. As such, the SSO service can remain common and serve different types of tokens. The SSO service does not need to know specific protocol semantics (e.g., OAuth-specific semantics or SAML-specific semantics).

In one embodiment, the SSO service defines a complete login ceremony as a common logic. The login ceremony dictates how a user is logged in, which factors are used for authentication, how the system performs the factor authentication, how the orchestration happens between the user and the IDCS SSO service, etc. The SSO service also defines a logout ceremony that dictates how to log out of the global session and how to replicate to different protocols. The SSO service provides protocol driven application logout.

In one embodiment, the complete login ceremony happens between the SSO service and UI interactions. The login ceremony depends on the factors that the user is using to log in (e.g., user ID and password, certificate based authentication, mobile factor based authentication, etc.).

One embodiment implements the SSO service as a common controller and also implements an authentication module plug-in as a backend authenticator for each login ceremony. For example, for authentication based on user ID and password, the embodiment implements a plug-in to go to the identity store that includes the user ID and password. The plug-in then authenticates the user credentials to that store. As another example, if the user provides a certificate of user credentials such as an X.509 certificate, the SSO service determines the appropriate authentication module, which in this case is a certificate module. The certificate module goes to a certificate store and validates the provided certificate against the certificate store. In one embodiment, the user may provide a mobile authentication factor such as a short message service ("SMS") or a time-based one-time password ("TOTP").

In some embodiments, the SSO service may determine to go to a multifactor authentication plug-in to authenticate a user. The SSO service orchestrates the requirements for each plug-in. In various embodiments, a plug-in may require one interaction with the user such as one user ID and password, or may require multiple interactions with the user such as multiple pages.

Accordingly, the SSO service orchestrates the entire login ceremony for different types of user authentication. Once the user is authenticated, the SSO service establishes the global session. In one embodiment, the global session is populated with various user information, such as user ID, user preferences, user locale, user time zone, the factors or modules it got authenticated to, the time of the authentication, etc.

In one embodiment, in the cloud architecture of IDCS, the services are configured as stateless and horizontally scalable, and no state is maintained in the server. Accordingly, since the services cannot maintain the session state of a client session, the entire session which is the global session is put in a client cookie. That is, the embodiment configures the global session as a client cookie, and the client session is the cookie in which the entire global session is preserved. In one embodiment, the cookie is part of the request header, and every time the request goes back to the browser with "302", and redirect comes back to another service, the cookie is replayed (i.e., the header is replayed).

In one embodiment, the content of the global session is stored using a protocol buffer to minimize its size so that the global session can be included in the cookie. One embodiment provides semantics for preserving the global session, optimizing its size, and converting the cookie or client session into a particular protocol-based token.

In one embodiment, a first flow is called when a user has already logged into a system (and thus has a global session in the system) and is accessing another application with the same browser session. In this flow, the protocol layers (e.g., 1004 and 1006 in FIG. 10) do not determine whether the user has a valid session because they do not understand the global session. Instead, they request the SSO service to determine whether the user has a valid global session. The SSO service then goes into a mode where there are different flows it orchestrates with a valid session depending on the protocol. It determines the validity of the session based on certain parameters, and if the user has a valid global session, it generates the protocol specific token and gives access.

In one embodiment, a second flow is called when the validity of the session is not sufficient and the user needs to be asserted and there needs to be a local identity.

In one embodiment, a third flow is called for first time logins. When the user is authenticated (with a respective authentication module), and after the orchestration is performed and the SSO service is about to create a session, the embodiment ensures that the user exists in the local IDCS user store. The user needs to have a local identity presence (e.g., maybe not a password if the user has authenticated remotely, but at least some minimum profile information). Similarly, in the flows when there is an existing valid session, the SSO service asserts the user in the local store and ensures that the user exists in the local IDCS identity store.

One embodiment provides a set of flows for a federation system. Federation provides cross-domain SSO and may include an SP, an IDP, or other actors and entities. For example, an SP and an IDP may be on a different domain (e.g., cookie domain, identity domain, etc.), and the session may need to be transferred from one domain to another using a federation protocol such as SAML2. In one domain, the embodiment may create a local session or a global session that cannot be read by another domain. Therefore, before going to the other domain (which also has to be a trusted domain), the embodiment converts the global session into a SAML token, and transfers the SAML token into the other domain where it can be validated and asserted.

In one embodiment, there are different flows orchestrated by the SSO service when behaving as a SAML SP or IDP. Generally, a user is authenticated to a remote IDP when the user does not exist locally. For example, a user may have a cloud account to use a cloud service, but may be an on-premise user or an existing enterprise user that does not want to replicate its user identity into the cloud store. Since the user identity is on-premise, on-premise becomes the remote IDP. In this case, the local IDCS SSO service behaves as an SP and contacts the remote IDP.

When the user comes to the SSO service that acts as a SP, the SSO service uses a federation protocol such as SAML to go to the remote IDP. The authentication is performed at the remote IDP and a SAML token is generated on the remote IDP. The remote IDP sends the SAML token to the SSO service. The IDCS SAML service extracts the SAML token, extracts the required attributes/statements from the SAML token (e.g., authentication statement, authorization statement, name, ID, etc.), normalizes that information in a specific format, and then passes it on to the SSO service. The IDCS SAML service does not perform assertion. The SSO service does not need to orchestrate the user login ceremony since the remote authentication is already performed by the remote IDP on-premise. Instead, the SSO service gets a normalized SAML state in a normalized attribute format, and asserts that state (asserts those attributes) in the local system.

One embodiment provides different options/flags or configurations for federation, for example, whether the user must exist locally even if it is authenticated remotely, whether to ignore the existence of the user in the local system, etc. Based on that, the SSO service either asserts the user locally or just asserts the claim, and then creates the global session. The SSO service then gives the request back to the protocol tier (i.e., the SAML service).

In one embodiment, the global session in the entire IDCS system is the source of truth for any protocol tokens to be generated. The global session is generated by the SSO service based on different types of flows that it orchestrates, such as new authentication, existing session, remote authentication for federation, remote authentication for OAuth or social login, etc. The IDCS system can then generate a token for different protocols and give the token back to the application, and based on the token, a client can access a tenant application.

Normalized State

One embodiment supports the global session by providing normalized parameters for different protocols such as SAML and OAuth, while each one of the OAuth and SAML services receive their respective tokens. For example, the SAML service receives the SAML assertion which is an XML block with a header and a body. The header defines the type of the token or the type of the security mechanism used to generate the authentication, which may be, for example, X.509, user ID/password, etc. In one embodiment, the SAML token is according to SAML2 specifications. The SAML service extracts the SAML token, reads it, and validates each part of it. The body of the token may include the SAML assertion such as name ID, authentication statement (indicating the type of authentication used by the remote IDP), etc.

The token also includes an authorization statement (indicating the attributes used for authorization) and an attribute statement (indicating the remote IDP) after the authentication has transferred some attributes. In one embodiment, the remote IDP has a real identity store for the user and uses that to authenticate the user, and sends back some attributes in the SAML token based on the attribute statement requirements. The attributes that need to be sent are determined based on the SAML configuration established between the IDP and the SP. In one embodiment, before an entity becomes an IDP for an SP or an SP for an IDP, both entities have to be trusted entities, and there is a metadata exchange performed as a prerequisite. They also share their certificates (e.g., the public keys/certificates) to establish the trust and the configuration that each one needs from another. When an SP gets a SAML assertion, the attribute statement is based on the configuration statement that the SP has dictated to the IDP (e.g., what attributes to be sent to the SP after a SAML token is generated).

In one embodiment, the SAML service knows only the SAML semantics. It can open the SAML token, verify the signature, and if it is encrypted, decrypt it based on signing and encryption algorithms. The algorithms are also part of the configuration between the SP and the IDP. In one embodiment, all this is performed at the protocol layer where the SAML service gets the attributes out of the token. In one embodiment, the SAML service normalizes the attributes as key/value pairs (e.g., an attribute name and a value). In this embodiment, the key/value pair configuration is a generic format that is not based on any specific protocol. The normalized state of attributes is received as key/value pairs by the SSO service. In one embodiment, the same normalization is performed on the OAuth tokens at protocol level claims. That is, OAuth claims are also normalized in the same key/value pair format.

In one embodiment, a protocol can give attributes as part of the authentication protocol, demand attributes, and/or after a global session is established, dictate where the SSO service should go back to after authentication/verification is performed (e.g., a protocol-service-based go-back URL on which to call back). For example, for SAML, the attributes are received by the SSO service, while for OAuth, the SSO service provides the attributes since it authenticated the user. In one embodiment, for example, the SAML protocol may receive the attributes from a remote entity (e.g., a remote IDP) or indicate that it needs the attributes back. In case of OAuth, the protocol dictates that after a global session is established, the protocol needs some attributes back to generate OAuth-based claims for an end application. In one embodiment, OAuth or SAML may require the SSO service to go to certain endpoints/URLs. This information comes back to the SSO service as state information from both protocols.

In one embodiment, the communication to/from the protocol layers (e.g., SAML and OAuth services) and the SSO service is by "redirect" (through HTTP 303) and they share the common state in an encrypted cookie. The encrypted cookie stores the protocol information and the normalized format which is configured to be concise and suitable for different browser limitations (e.g., header size, cookie size, etc.).

Request State

In the cloud architecture of the embodiments, the services are stateless. Accordingly, one embodiment provides a common state that flows through for different layers to interact with each other. The embodiment preserves the state at the client (in the form of encrypted host cookies) over the duration of various flows, for example, when the protocol layer contacts (HTTP redirects to) the SSO service for authentication when there is no SSO session, when the protocol layer contacts the SSO service for session validation and user assertion with an existing session, etc.

In one embodiment, the common state includes client sessions and client states. The embodiment provides a "request state" and includes it in a "request cookie" as header. The request cookie is not an SSO cookie or an authenticated session, but a pre-authenticated state that is maintained across different services (e.g., protocol services, SSO service, etc.). It also includes execution context (e.g., states such as auditing, diagnostics, etc.). The normalized state (e.g., the attributes, the go-back URL, what is required for different flows, etc.) is also captured in the request state and placed in the request cookie. In one embodiment, this cookie is encrypted and the encryption key is securely stored and periodically rolled over (e.g., every 12 hours) so that it cannot be hijacked.

In one embodiment, the state information stored in the request state does not include user security data such as passwords. In one embodiment, even during interaction between protocols, only the claims are stored in the request state and the signatures are attached to the claims.

In one embodiment, the request state that is used during the login process (e.g., login ceremonies or different flows) may also be used during the logout process since this state includes information on the different endpoints that the user has visited and needs to go back to or logout for the protocol, the normalized state for each protocol, the claims, the attributes needed to assert the user in the identity system, etc.

In one embodiment, in order to preserve the state at the client (in the form of encrypted host cookies) over the duration of various flows, the below representations are implemented:

"UserRequestData" which is created every time the protocol layer initiates a fresh request to the SSO service for creation/validation of an existing session;

"UserSessionData" which is created by the SSO service on completion of handling the request form the protocol layer (once this is created, "UserRequestData" is deleted and all the relevant data is persisted in it);

"AbstractUserData" which is the parent of "UserRequestData" and "UserSessionData" and includes the common state data structures used by both.

Table 1 provides the functionalities included in "UserRequestData" representation in one embodiment.

TABLE 1

Example functionalities included in "UserRequestData" representation

| | |
|---|---|
| String ssoRequestRemotePartnerID | OAuth client ID or SAML SP ID set by the OAuth/SAML-IDP server to identify the protocol initiating the request |
| String ssoRequestRemotePartnerName | Name of the remote partner corresponding to the partner ID used for global audit |
| String ssoRequestProtectedRequestedURL | The URL accessed by end user/client that triggered the authentication request from protocol layers |
| String ssoRequestReferrer | Set by the protocol layer to the referrer that initiated the request. It is also used to identify special cases such as the "break-glass flow" (e.g., in order to avoid an endless loop when a single remote IDP is used and is down, through the use of an administration console) |
| String ssoRequestCallbackURL | Set by the protocol layer to the URL the SSO server has to revert to after handling the request. It can also be set by SAML-SP server in IDP-initiated SSO flows and point to return URL/relay state sent by IDP |
| String logoutDoneURL | The URL where the SSO service will redirect the user after logout is completed, can be null |

In one embodiment, "UserSessionData" representation includes "byte[ ] authnContext" which is the concise binary representation of user session data, e.g., the attributes defined by an "AuthContext" object. The protocol buffers library is used to effectively represent the data in binary format. It is encrypted using a private key rolled over, e.g., every 12 hours. Table 2 provides the functionalities included in the "AuthContext" representation in one embodiment.

TABLE 2

Example functionalities included in "AuthContext" representation

| | |
|---|---|
| String userId | Logged in user globally unique ID ("GUID") |
| String userEmailId | User's email ID principal |
| String sessionId | Current session ID |
| String userDisplayName | User's display name |
| String tenantName | User's tenancy |
| Map<String, String> claims | Authentication claims of the user (e.g., user attributes from the IDCS (local) IDP or remote IDP) |
| long sessionExpirationTime | Session expiry time |
| long sessionCreationTime | Session creation time |
| String userLoginId | User login attribute value in case of local authentication |
| String userMappingAttr | User login attribute name in case of local authentication |

Table 3 provides example functionalities included in "AbstractUserData" representation in one embodiment.

TABLE 3

Example functionalities included in "AbstractUserData" representation

| | |
|---|---|
| Map<Integer, byte[ ]> componentData | Holds the Abstract Syntax Notation One ("ASN.1") or protocol buffer encoded serialized binary representation of each component's data either scoped to request or session |
| Date generationTime | Request or session cookie setting time at server |
| String tenantName | User tenancy for the session |

In one embodiment, the components corresponding to "Map<Integer, byte[ ]> componentData" may be, for example, SSO, OAuth2, and SAML servers. The data is binary so that it can be encrypted and the private key management can be abstracted out of the component data representation. As part of the "UserSessionData", it holds the tracking data of each client or partner to whom a token/assertion was issued in the duration of the session. This helps in global logout too. As part of the "UserRequestData", it holds the component level request scoped data.

In one embodiment, the SSO Service implements a resource manager and a SSO Runtime. Resource manager is the common data access layer for IDCS. It is metadata driven so it can manage any resource type defined in a SCIM compliant resource type and schema definition. Resource manager handles all common logic for all resource types including schema-based validation of attributes, data types, required values, canonical values, etc. It also handles setting default values, setting "create/update date" values, setting "create/update by" values, protecting sensitive attributes, mapping to target attributes, authorization checks, and event publishing. A resource-type data manager's external interface is HTTP/REST (deployed in the IDCS Admin server and brought up by a "serviceUp" command), and its internal realization is through Java interfaces. In one embodiment, the implementations are injected based on Java Specific Request ("JSR") 330, using Hundred-Kilobyte Kernel ("HK2"). The resource type payload follows the resource model as outlined by SCIM 2.0. For example, "/Applications" and "/Credentials" are specific resource types.

The resource definitions and schema are discoverable through "/ResourceTypes" and "/Schemas." Resource-type data managers manage operational data per tenant (e.g., Users, Groups, Tokens, Resource Types, Schemas, etc.), tenant settings (cross-service tenant-specific settings and service-specific tenant-specific settings), and global configuration (cross-service global configuration and service-specific global configuration).

SSO Runtime

Figure 10A:
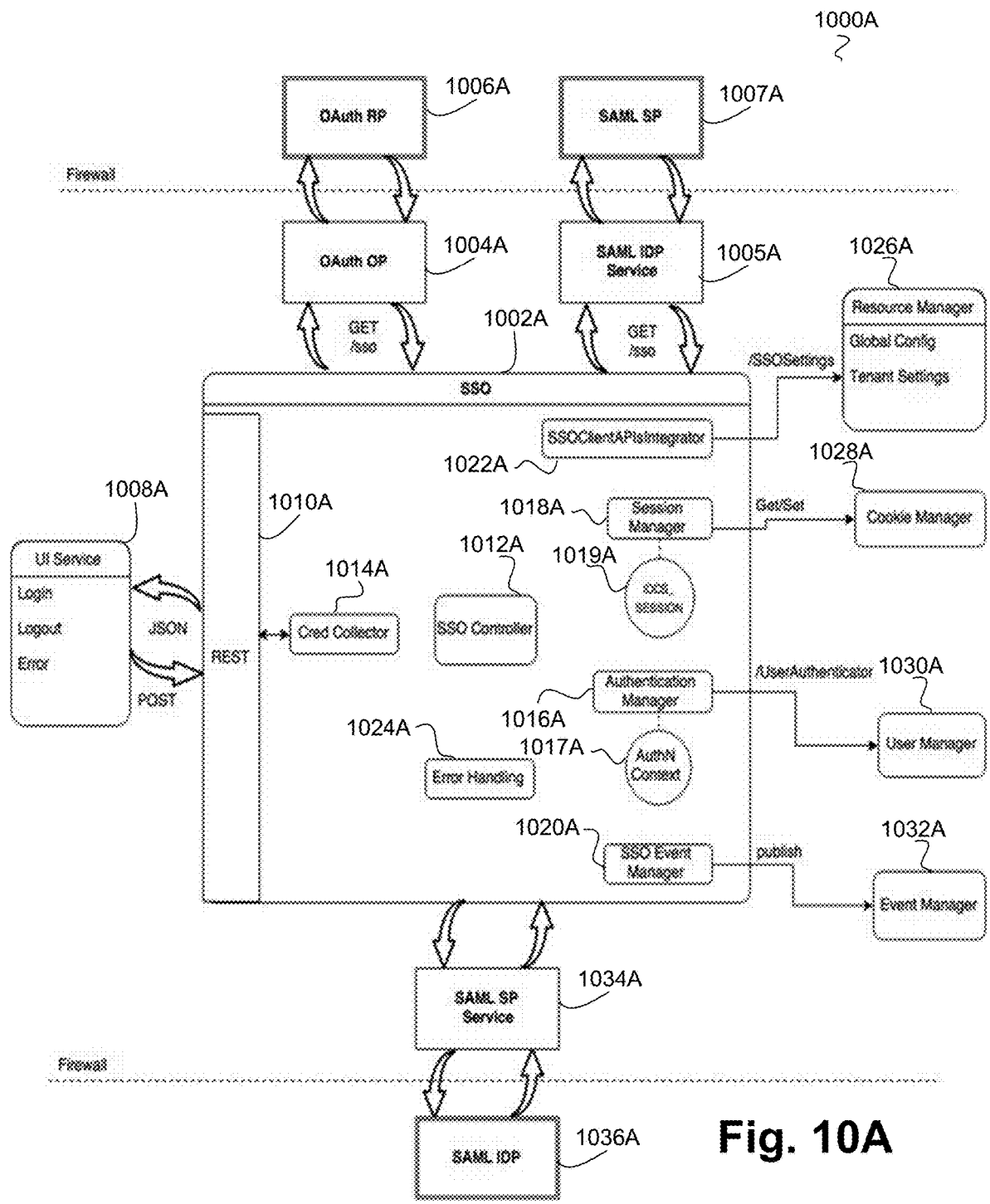
FIG. 10A illustrates an example block diagram of SSO runtime in one embodiment.

FIG. 10A illustrates an example block diagram 1000A of SSO runtime in one embodiment where SSO service 1002A implements the user login/logout ceremonies for local and federated logins. The Cloud SSO integration architecture uses the standard OpenID Connect user authentication flow for browser-based user logins. Since Cloud login is based on OpenID Connect, OpenID Provider ("OP," illustrated as OAuth OP 1004A in FIG. 1000A) is where the login request reaches SSO 1002A. Internally, the runtime authentication model is stateless, maintaining the user's SSO state in the form of a host HTTP cookie.

The user login request flow is as follows: the user accesses a browser-based application or a mobile/native application; connecting application (OAuth RP 1006A or application's Enforcement Point) detects the user has no local application session and requires the user to be authenticated; connecting application (OAuth RP 1006A or application's Enforcement Point) initiates OpenID Connect Login flow against OAuth2 Service (3-legged AZ Grant flow with scopes="openid profile"); and OAuth2 Service (OAuth OP 1004A) constructs the application context and redirects to SSO Service 1002A.

In one embodiment, the service level agreements ("SLAs") between OAuth OP 1004A and SSO 1002A include the following:

IDCS_REQUEST—IDCS_REQUEST HTTP cookie is used to maintain the state between various request/response flows between SSO 1002A and Channel components.

> CallbackURL: This is set by OAuth OP 1004A before redirecting to SSO 1002A. SSO 1002A redirects to this URL after processing.
>
> ErrorCode: This is how SSO 1002A communicates back to OAuth OP 1004A about any error that occurred.
>
> ErrorMessage: Localized SSO error message.

IDCS_SESSION

> If authentication status is "success" then SSO 1002A creates IDCS_SESSION with authentication and redirects the user to/callBackUrl in IDCS_REQUEST.
>
> In case a valid IDCS_SESSION is already present, SSO 1002A asserts the user fetched from the IDCS_SESSION cookie.

One embodiment may also implement a persistent cookie that can store user preferences such as user locale. This cookie may be used to translate the error message to user-specific locale.

In one embodiment, as per the IDCS microservices architecture, a UI service 1008A (Login App/Logout) is implemented as a separate service, and not as part of SSO 1002A. UI service 1008A and SSO service 1002A interact with each other via a REST endpoint implemented in a REST layer 1010A in FIG. 1000A, and state information is passed as JSON payload between SSO service 1002A and REST layer 1010A.

In one embodiment, SSO service 1002A includes REST layer 1010A, a SSO Controller 1012A, a Credential Collector 1014A, an Authentication Manager 1016A (for plugging in different modules and call, authenticate, and validate on each one), a Session Manager 1018A, an SSO Event Manager 1020A, an SSO Client APIs Integrator 1022A, Error Handling 1024A, and an assertor (asserting based on different identity, not shown in FIG. 1000A). In one embodiment, when an authentication request reaches the GET method of SSO 1002A at "/sso", the request includes request and state data submitted to SSO 1002A by OAuth OP 1004A (corresponding to OAuth RP 1006A) or a SAML IDP 1005A (corresponding to a SAML SP 1007A) as an IDCS_REQUEST HTTP cookie. The IDCS_REQUEST cookie is decrypted and parsed, and parameters and other HTTP headers are captured in a Request Context object and passed to SSO Controller 1012A. SSO 1002A collects the user's credentials by redirecting to the login page (implemented by UI Service 1008A), and the login page submits the credentials to the POST method of SSO 1002A. The state information is passed as JSON Payload between them.

In one embodiment, SSO Controller 1012A is a class that determines what action to take depending on the state of the request. There may be various states indicative of Credential Collection, Credential Validation, First Time User, Forgotten Password, Password Reset, etc. SSO Controller 1012A orchestrates the flow to the other components depending on the various conditions.

One embodiment supports two forms of authentication: Basic and Form. The required credentials such as username, password, and tenant name are collected at Credential Collector 1014A and passed for authentication. This class prepares the JSON request to be sent to the Login UI and parses the response received from the Login app.

Authentication Manager 1016A is a class that validates IDCS User ID/password and/or issues Authentication Tokens. There may be various results of Authentication, such as Authentication Success, Invalid Credentials, Disabled User, Password Has Expired, Password Needs To Be Reset, etc. The proper Error code is returned as part of the SSO Response. Authentication Manager 1016A talks to "/UserAuthenticator" REST endpoint of a User/Identity Manager 1030A (Resource Manager in Admin service) to execute the actual validation of the credentials. In one embodiment, Authentication Context 1017A (the global session) and Authentication Claims of the user are created at Authentication Manager 1016A. If Authentication Context 1017A is already present in the request, it is asserted by talking to the same User Authentication Service to assert the token instead of validating the credentials.

In one embodiment, Session Manager 1018A communicates with a Cookie Manager 1028A and manages the SSO cookie, including storage of Authentication Context and metadata on connecting applications. Cookie Manager 1028A is a common layer shared with all the other layers and generates and optimizes the global session state making it as a client session cookie. Upon successful authentication or validation, SSO Service 1002A redirects back to the OAuth Service with the newly created/updated SSO host HTTP cookie that includes the User's Authentication Token. SSO service 1002A removes request-specific data from the cookie. The following is an example functionality for reading cookie data from the HTTP Servlet Request:

```
CookieManager cm=CookieManagerFactory.createInstance(request, response);
    UserSessionData sessionData=cm.getSessionData( );
    String myAuthnToken=sessionData.getAuthnToken( ):
    byte[ ] mySamlData=sessionData.getComponentData(CookieManagerComponents.SAML);
    sessionData.setAuthnToken("4141FB74579EAB131ECF6369 . . . ");
    cm.setSessionData(sessionData);
    cm.commit( );
```

In one embodiment, an example of cookie data in the HTTP request is as follows:

Two cookies:

Entry #1:

Name: "ORA_OCIS_1"

Value: "624790624790578067acbe05a58a589c5595346236e57a-5c373b83e3758ac38"

Entry #2:

Name: "ORA_OCIS_2"

Value: "6246bef44242bf6246bef44242bf6246bef44242bf6246bef44242bf~4~6246bef44242bf"

In one embodiment, SSO Event Manager 1020A communicates with an Event Manager 1032A and publishes events associated with the SSO flow. One embodiment defines SSO events and what their targets are (e.g., Audit, Analytics, Notification, Metrics, etc.). The following are corresponding example functionalities:

```
ssoservice.authentication.success
ssoservice.authentication.failure
ssoservice.server.startup
. . . .
import oracle.idaas.common.event.*;
Event event=new EventImpl.Builder(SystemEventId.SYSTEM_ERROR_RUNTIME)
    .ecid("123-456-7890").rid("relationship id")
    .eventValue("event value").serviceName("service name")
    .actorId("actor id").actorName("actor name")
    .tenantName("test tenant").message("test message")
    .eventData("name3", "value3").build( );
eventManager.publish(event);
```

In one embodiment, SSO Client API Integrator 1022A communicates with Resource Manager 1026A, and tenant specific SSO Settings are stored and available in the Admin Server's Resource Manager 1026A. The SSO settings such as AuthN scheme, session timeout, etc., are read in SSO runtime server via REST requests. Since reading these settings involves a network call, they can be cached per tenant, provided there is a callback mechanism to get notified for any change in these settings. The following is an example of the functionality of Resource Manager 1026A:

String url="http://"+hostName+":"+port;
IdaasClient client=IdaasClient.login(tenantName, username, password);
client.setTargetURI(URI.create(url));
SSOSettingsService service=client.getService(SSOSettingsService.class);
SSOSettings ssoSettings=service.get("SSOSettings", null);
ssoSettings.getCookieSessionTimeout( )
ssoSettings.getMaxLoginAttempts( )

In one embodiment, UI Service 1008A provides the interaction point for end users consuming SSO service 1002A, and provides operations such as:
Credential collection from end users for authentication, password management, and invoking the respective SSO Service endpoint via a JSON-based rest call;
Handling various error scenarios for the JSON rest calls initiated with SSO service 1002A;
Handling various errors raised by SSO service 1002A and encountered during the interaction with protocol layers through a Redirect initiated by SSO Service 1002A.

In one embodiment, SSO Controller 1012A serves UI Service 1008A for the above cases according to the following flows.

In the protocol 3-legged end user flow:
End user accesses application protected by RP 1006A (e.g., protocol-specific gate keeper agent);
RP 1006A triggers protocol interaction and protocol layer redirects to the endpoint "/sso/v1/user/login";
The endpoint returns on SSO service 1002A after setting the context in the IDAAS_REQ cookie;
SSO service 1002A reads the tenant header in the IDAAS_ REQ cookie, and based on tenant configuration, calls either remote IDP 1036A or login UI service 1008A by redirecting to the endpoint "/member/v1/signin";
UI service 1008A collects credentials and submits them via a JSON request to the post method on the endpoint "sso/v1/user/login";
SSO service 1002A validates the credentials. On failure, responds with hierarchical (e.g., 2 level: major and minor) error codes to UI Service 1008A. On password reset, the next operation ("nextOp") and respective error codes are sent to UI Service 1008A. On success, if post login is enabled, respective nextOp is sent to UI service 1008A. On Success, if post login is disabled, the JSON response is returned with the nextOp as "redirect" with the "redirectUrl" in the payload. The "redirectUrl" is the call back URL of the protocol layer obtained from the IDAAS_REQ cookie. In either of the success cases, the IDCS_SSO cookie is created and is set in the user's browser on response;
If post login is enabled and the operation is completed by UI, in case of dissent or consent, the control comes back to SSO Service 1002A through a JSON request;

SSO Service 1002A updates the IDAAS_REQ cookie with Consent/Dissent and sends the response with the nextOp as "redirect" with the "redirectUrl" in the payload;
The protocol layer reads the IDCS_SSO Cookie and generates the protocol specific token to return to RP 1006A;
RP 1006A sets the application-specific cookie reading the token and the user is then granted access and can access the application with the cookie.

In the Basic Auth flow from Cloud Gate:
The end user/client accesses the resource protected by Cloud Gate with the username and password authorization header.
Cloud Gate verifies the resource is protected by Basic Auth and calls the SSO endpoint at "/sso/v1/user/login" with a post HTTP request and credential data in the payload.
The absence of IDCS_REQUEST and presence of attributes: "RPID", "Referrer" are the conditions to branch the SSO Controller flow to a different handler: "BasicAuthHandler.java" to handle Basic Auth.
The "BasicAuthHandler" performs just validation of the credentials in the JSON payload and responds with the success/failure information without setting the IDCS_SSO cookie with the authentication context.
It also handles the SSO events for authentication and propagates the error codes during credential validation with the JSON response.

In the Auto login (on first time use) and password change flow from UI:
The Tenant administrator provisions the user and their Email from the admin UI and an Email including a URL with limited period token is sent to the user.
The user clicks the link to access UI service 1008A with the token. UI service 1008A validates the token with the identity service and collects the credentials.
UI service 1008A posts the credentials to the identity service to update to the backend.
UI service 1008A further posts to the SSO Controller endpoint "/sso/v1/user/login" for auto login with "redirectURL" attribute set in JSON payload with operation/op: "cred_submit and no IDCS_REQ cookie. This is handled by the "CredSubmitHandler".
SSO Controller 1012A gets the redirect URL in the following order of priority:
1) callback URL from the IDCS_REQUEST;
2) "redirectURL" attribute in the JSON payload only if IDCS_REQUEST cookie is not present;
3) If neither "IDCS_REQUEST" cookie or "redirectURL" attribute are present, uses the "my services" URL for redirection on successful authentication.

SSO State and Flow

Figure 10B:
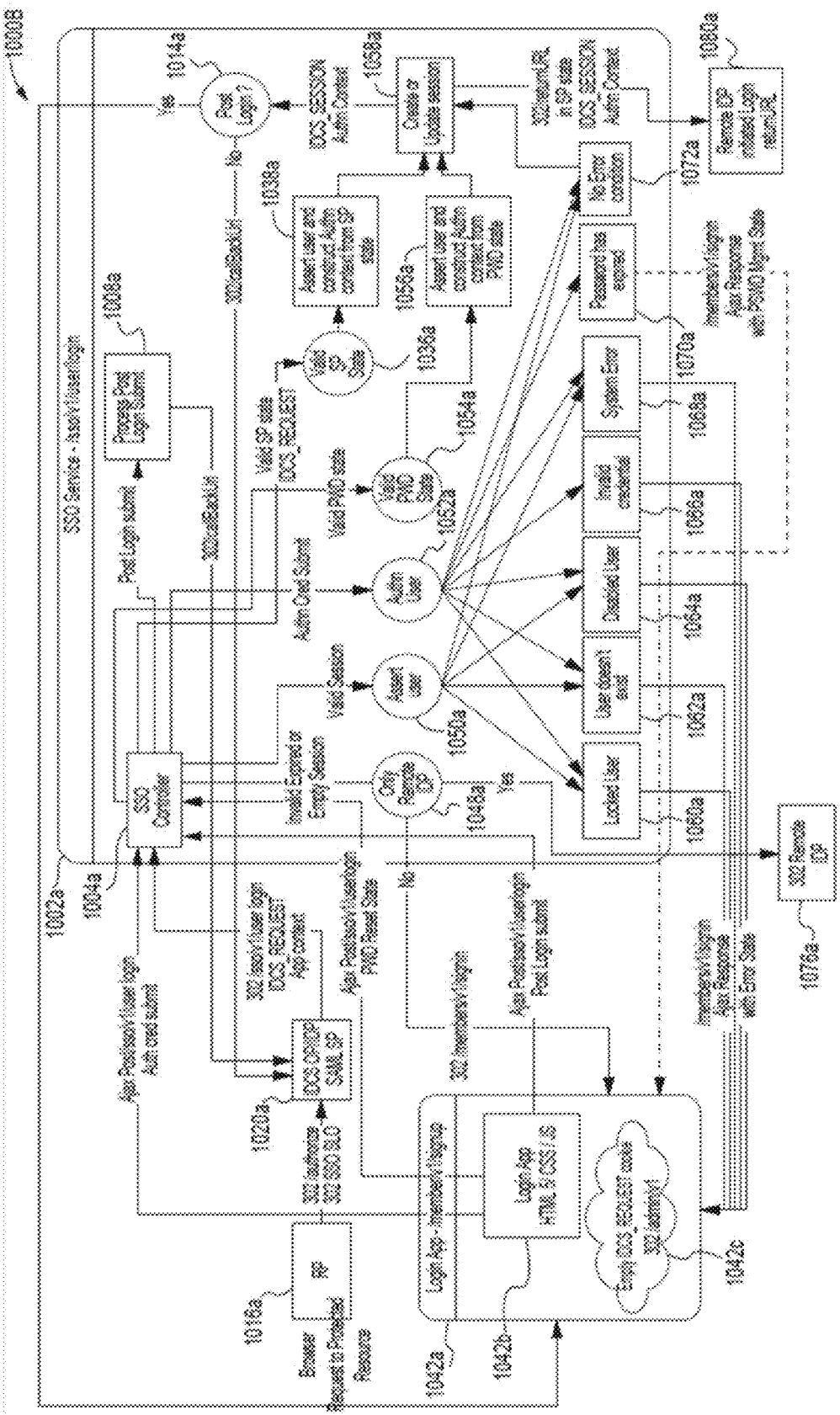
FIG. 10B illustrates an example state and flow diagram of SSO functionality in one embodiment.

FIG. 10B illustrates an example state and flow diagram 1000B of SSO functionality in one embodiment. The embodiment of FIG. 10B provides an example of the SSO controller engine flow diagram for each identity operation such as forgotten password, account log, a request coming from SAML SPs and IDPs, etc. In this embodiment, SSO service 1002a has a modular configuration in which the modules use the global state to interact with each other as well as with the protocol layer (e.g., OpenID connect, SAML, etc.). The embodiment provides a novel mechanism to communicate the state in a secure manner. The size of the state is configured efficiently so that the state occupies a small space and the operations are performed faster. The embodiment is configured in an adaptive way to ensure that it can be enhanced to multifactor authentication, step up authentication, etc. The embodiment provides an adaptive configuration so that additional authentication plug-ins can be readily added and additional step up authentication can be provided. The embodiment can also use the same components/modules to perform other functionality such as policy based authorization check, etc.

In one embodiment, the interactions between the protocol layers (e.g., OAuth, SAML, etc.) and SSO service 1002a are performed through HTTP. They communicate through a certain state difference in the request context (parsed in the cookie) and they always know where to go back to (based on a fixed attribute in that state). For example, when SSO service 1002a gets control and determines where to go based on the protocol it got the request from, the protocol has set an end URL or a return URL into the state, and SSO service 1002a follows that based on what SSO service 1002a finds out after authentication or after success or failure. Similarly, when a protocol gets some information with respect to, for example, a request for a token, it tracks in a designated component in the request cookie.

In one embodiment, the state includes different map objects including component data for each protocol. For example, when OAuth gets an authorized request, it includes tracking information indicating from whom it got the request, etc. In one embodiment, OAuth tracks the information in a specific component data and initializes the request cookie. The key for writing in the request cookie is shared between the components (e.g., OAuth, SAML, SSO, etc.), and there is a common understanding between these components as to, for example, what and where the data should be written, when the data should be written, etc. For example, when the embodiment has to document "n" number of round trips, there is a common understanding on what amount of data should be put in the request cookie and how, so the cookie is available as much as possible to the next component. The state flows through as the encrypted and secure cookie. When there is a security concern in terms of flowing data as an encrypted cookie, one embodiment configures the state as an encrypted payload post instead of a request cookie going in on a "302". The embodiment ports as a HTTP post.

In one embodiment, for example, an RP 1016a may receive a request from a browser for accessing protected resources. RP 1016a sends a 302/authorize or 302 SSO/SLO to an IDCS OP/IDP/SAML SP 1020a, which in turn sends a 302/sso/v1/user login with IDCS_REQUEST application context to SSO Controller 1004a.

IDCS login flow is a sequence of request/response flows between SSO, OP, SAML IDP, SAML SP and Login App (Credential collection and Password Management JS client) to provide Web single sign-on. The IDCS_REQUEST http cookie is used to maintain the state between various request/response flows between SSO and Channel components. The key for the IDCS_REQUEST cookie will be shared between SSO and Channel components. Login App and SSO service will interact with each other via REST endpoint. The state information will be passed as JSON Payload between them.

Request Behavior

IDCS SSO service 1002a processes following different types of requests: (1) Request from IDCS OP/IDP service 1020a; (2) Request from IDCS SP service 1020a; (3) Ajax HTTP POST Request from Login app submitting Authentication credential from Login App 1042b; (4) Ajax HTTP POST Request from Login App 1042b after successful completion of Password management operation; and (5) Ajax HTTP POST Request from Login App 1042b after successful completion of Post Login operation.

The request from OP/IDP service 1020a will have Request+State data submitted by OP/IDP to SSO as an IDCS_REQUEST http cookie. The cookie will be saved as IDCS host cookie, with encrypted data, etc. The key for the cookie will be shared between OP/IDP/SSO. The key will be a well-named Key Resource created at the time of initializing tenant data during Tenant Create operation as follows:

1. RP ID—id of the connected app represented by the RP/SP;
2. Referrer—HTTP referrer at the time of User Browser being redirected to OP/IDP;
3. Callback URL—URL pointing back to OP/IDP login response flow.

For the response behavior for request from OP/IDP:

1. SSO will update the IDCS_REQUEST cookie with Login app state and redirect to Login app to show dynamic login with all configured login options;
2. If federation SSO is the only option, then SSO itself will redirect to IDCS SP service to initiate federated SSO with remote IDP;
3. In case of valid IDCS_SESSION, SSO will assert the user fetched from the IDCS_SESSION cookie.
   a. On failure to assert the user SSO will update IDCS_REQUEST cookie with assert failure detail, remove the IDCS_SESSION cookie and redirect to Login App. Login App will show login page with customized error based on the Login app state.
   b. On successful assertion, SSO will update IDCS_SESSION with channel logout detail if it is not there, Sets the content of the IDCS Request Cookie as the IDCS_REQ query/POST parameter, Removes IDCS request cookie and redirect to IDCS channel/callbackUrl stored in the IDCS_REQUEST cookie.

For the request from SP service, the SP service:

1. Reads and removes the SAML-SP state from the IDCS Request Cookie;
2. Processes the SAML Assertion and maps it to local user;
3. Sets the results of the Federation SSO operation (status, userID . . . ) as the OCIS_REQ_SP query/POST parameter;
4. Redirects to SSO Service with the IDCS_REQ query/POST parameter.

For the response behavior for the request from SP, in case of valid IDCS_REQUEST with SP state, SSO will check the SP state:

1. If SP state status is failure, then SSO will update IDCS_REQUEST cookie with assert failure detail and redirect to Login App. Login App will show login page with customized error based on the Login app state.
2. IF SP state status is success then SSO will create IDCS_SESSION with authentication context check the whether it is IDP Initiated federation and post login is not enabled then:
   a. idcsSSOInitiated: contains whether or not the flow was started by the SSO service (boolean)
   b. If false, then the SSO service will need to check ssoResponseFedSSOReturnURL
      i. If ssoResponseFedSSOReturnURL is null, then SSO service will remove the IDCS Request Cookie and redirect to MyConsole
      ii. Otherwise, SSO service will remove the IDCS Request Cookie and redirect to ssoResponseFedSSOReturnURL c. If true, the SSO service will redirect to the callbackURL, since the Federation SSO flow was started by IDCS_SSO service.
3. If post login is enabled, then SSO will redirect the user to Login App with login App state updated with the flag to indicate it is post login flow.

For the request from login app submitting authentication credential, the login app collects the credentials and posts the credentials to the SSO service REST endpoint. The credentials are sent as JSON payload.

For the response behavior for the request from login app submitting authentication credential, SSO will authenticate the posted authentication credentials and check:
1. If authentication status is success, then SSO will create IDCS_SESSION with authentication and redirect the user to/callBackUrl in IDCS_REQUEST or sends Ajax Response to Login App based on the tenant specific configuration.
2. If authentication status is Failure and reason is 'Password Expired' then SSO send Ajax Response with JSON payload having Password management state to let Login App start the password reset operation. State contains User identity information and a flag to indicate the indented operation is 'Password reset for expired password'.
3. For all other authentication status failure reasons, SSO will send Ajax Response with JSON payload having Login App state. Login App state will be used by Login App to show custom error message.

For the request from login app after successful completion of password management operation, the login app collects the new password and validates the same with configured tenant specific policy rules. On successful completion of password reset Login App checks the availability of IDCS_REQUEST cookie. If IDCS_REQUEST cookie is available, then it sends Ajax POST request to SSO service REST endpoint with JSON payload having Password management state. If IDCS_REQUEST cookie doesn't exist Login App will redirect to IDCS Admin console URL.

For response behavior for request from login app after successful completion of password management operation, SSO will assert the user info in Password Management state:
1. If assertion resulted in a failure, then SSO will send Ajax Response to Login App state with failure detail as JSON payload.
2. If assertion resulted in success, then SSO will create IDCS_SESSION and redirect the user to/callBackUrl in the IDCS_REQUEST if Post login is not required or send Ajax Response with Login App state as JSON payload to Login App to show the post login page.

For the request from login app after successful completion of post login operation, the login app shows the post login pages and process the post login related operations. On successful completion of post login operation Login App sends Ajax POST request with Login App state with flag to indicate successful post login operation as JSON payload. If IDCS_REQUEST cookie doesn't then Login App will redirect to IDCS Admin console URL.

For the response behavior for request from login app after successful completion of Post Login operation, SSO will check Post Login flag is set by Login App in the Login App state. If it is set, then:
1. idcsSSOInitiated: contains whether or not the flow was started by the SSO service (boolean)
   A. If false, then the SSO service will need to check ssoResponseFedSSOReturnURL
      i. If ssoResponseFedSSOReturnURL is null, then SSO service will remove the IDCS Request Cookie and redirect to MyConsole
      ii. Otherwise, SSO service will remove the IDCS Request Cookie and redirect to ssoResponseFedSSOReturnURL
   B. If true, the SSO service will redirect to the callbackURL, since the Federation SSO flow was started by IDCS SSO service.

As disclosed, embodiments provide an SSO service that dictates how a user is authenticated and how the login ceremony is performed. The login may be based on different types of authentication factor configurations (e.g., one factor, two factor, biometric, etc.). The embodiment is modularized (not a monolithic piece of code) and includes a controller layer, and each specific authentication is implemented as a plug-in (e.g., a plug-in module for user ID password which can authenticate to LDAP, a plug-in module for X.509 authentication to authenticate to a certificate store, a plug-in for mobile authentication based on a mobile factor for SMS, a plug-in for registration based on a QR code, etc.). In one embodiment, the SSO system includes a service provider interface ("SPI") layer where authentication modules can be plugged in. The embodiment orchestrates the flows where the UI submits credentials to be validated. The embodiment performs SSO functionality irrespective of the protocol layer, whether it is OpenID connect, SAML, OAuth, etc. The embodiment provides the SSO service as a central controller for the entire IDCS access for login and logout flows, and uses a rich, optimized, and normalized state to make the service agnostic to all protocols. One embodiment provides functionality to assert a user to a different identity stores (e.g., a remote IDP, a local identity store, etc.).

Login/Logout Flow

Figure 11:
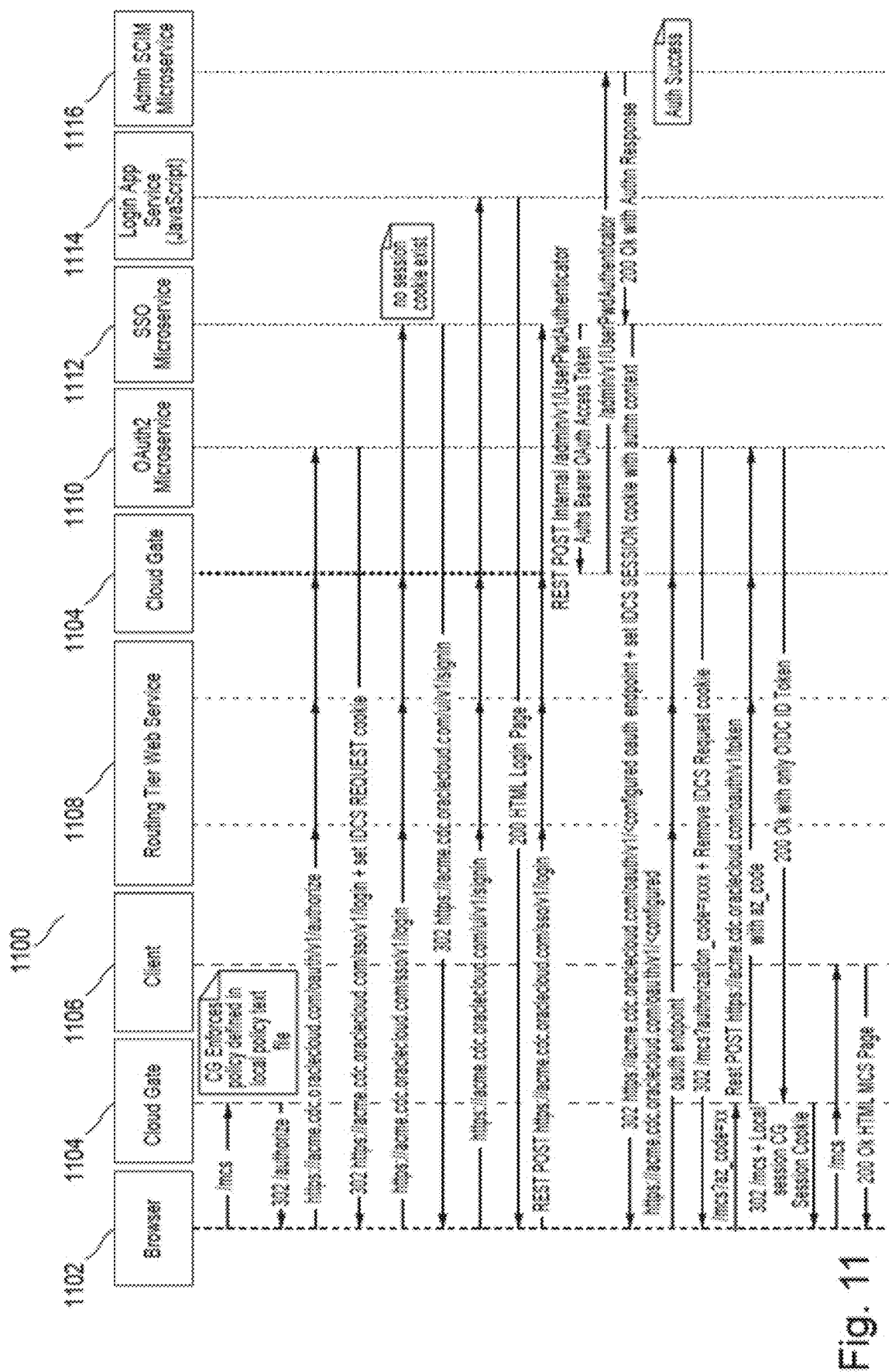
FIG. 11 is a message sequence flow of SSO functionality in one embodiment.

FIG. 11 is a message sequence flow 1100 of SSO functionality provided by IDCS in one embodiment. When a user uses a browser 1102 to access a client 1106 (e.g., a browser-based application or a mobile/native application), Cloud Gate 1104 acts as an application enforcement point and enforces a policy defined in a local policy text file. If Cloud Gate 1104 detects that the user has no local application session, it requires the user to be authenticated. In order to do so, Cloud Gate 1104 redirects browser 1102 to OAuth2 microservice 1110 to initiate OpenID Connect login flow against the OAuth2 microservice 1110 (3-legged AZ Grant flow with scopes="openid profile").

The request of browser 1102 traverses IDCS routing tier web service 1108 and Cloud Gate 1104 and reaches OAuth2 microservice 1110. OAuth2 microservice 1110 constructs the application context (i.e., metadata that describes the application, e.g., identity of the connecting application, client ID, configuration, what the application can do, etc.), and redirects browser 1102 to SSO microservice 1112 to log in.

If the user has a valid SSO session, SSO microservice 1112 validates the existing session without starting a login ceremony. If the user does not have a valid SSO session (i.e., no session cookie exists), the SSO microservice 1112 initiates the user login ceremony in accordance with customer's login preferences (e.g., displaying a branded login page). In order to do so, the SSO microservice 1112 redirects browser 1102 to a login application service 1114 implemented in JavaScript. Login application service 1114 provides a login page in browser 1102. Browser 1102 sends a REST POST to the SSO microservice 1112 including login credentials. The SSO microservice 1112 generates an access token and sends it to Cloud Gate 1104 in a REST POST. Cloud Gate 1104 sends the authentication information to Admin SCIM microservice 1116 to validate the user's password. Admin SCIM microservice 1116 determines successful authentication and sends a corresponding message to SSO microservice 1112.

In one embodiment, during the login ceremony, the login page does not display a consent page, as "login" operation requires no further consent. Instead, a privacy policy is stated on the login page, informing the user about certain profile attributes being exposed to applications. During the login ceremony, the SSO microservice 1112 respects customer's IDP preferences, and if configured, redirects to the IDP for authentication against the configured IDP.

Upon successful authentication or validation, SSO microservice 1112 redirects browser 1102 back to OAuth2 microservice 1110 with the newly created/updated SSO host HTTP cookie (e.g., the cookie that is created in the context of the host indicated by "HOSTURL") containing the user's authentication token. OAuth2 microservice 1110 returns AZ Code (e.g., an OAuth concept) back to browser 1102 and redirects to Cloud Gate 1104. Browser 1102 sends AZ Code to Cloud Gate 1104, and Cloud Gate 1104 sends a REST POST to OAuth2 microservice 1110 to request the access token and the identity token. Both tokens are scoped to OAuth microservice 1110 (indicated by the audience token claim). Cloud Gate 1104 receives the tokens from OAuth2 microservice 1110.

Cloud Gate 1104 uses the identity token to map the user's authenticated identity to its internal account representation, and it may save this mapping in its own HTTP cookie. Cloud Gate 1104 then redirects browser 1102 to client 1106. Browser 1102 then reaches client 1106 and receives a corresponding response from client 1106. From this point on, browser 1102 can access the application (i.e., client 1106) seamlessly for as long as the application's local cookie is valid. Once the local cookie becomes invalid, the authentication process is repeated.

Cloud Gate 1104 further uses the access token received in a request to obtain "userinfo" from OAuth2 microservice 1110 or the SCIM microservice. The access token is sufficient to access the "userinfo" resource for the attributes allowed by the "profile" scope. It is also sufficient to access "/me" resources via the SCIM microservice. In one embodiment, by default, the received access token is only good for user profile attributes that are allowed under the "profile" scope. Access to other profile attributes is authorized based on additional (optional) scopes submitted in the AZ grant login request issued by Cloud Gate 1104.

When the user accesses another OAuth2 integrated connecting application, the same process repeats.

In one embodiment, the SSO integration architecture uses a similar OpenID Connect user authentication flow for browser-based user logouts. In one embodiment, a user with an existing application session accesses Cloud Gate 1104 to initiate a logout. Alternatively, the user may have initiated the logout on the IDCS side. Cloud Gate 1104 terminates the application-specific user session, and initiates OAuth2 OpenID Provider ("OP") logout request against OAuth2 microservice 1110. OAuth2 microservice 1110 redirects to SSO microservice 1112 that kills the user's host SSO cookie. SSO microservice 1112 initiates a set of redirects (OAuth2 OP and SAML IDP) against known logout endpoints as tracked in user's SSO cookie.

In one embodiment, if Cloud Gate 1104 uses SAML protocol to request user authentication (e.g., login), a similar process starts between the SAML microservice and SSO microservice 1112.

Cloud Cache

One embodiment provides a service/capability referred to as Cloud Cache. Cloud Cache is provided in IDCS to support communication with applications that are LDAP based (e.g., email servers, calendar servers, some business applications, etc.) since IDCS does not communicate according to LDAP while such applications are configured to communicate only based on LDAP. Typically, cloud directories are exposed via REST APIs and do not communicate according to the LDAP protocol. Generally, managing LDAP connections across corporate firewalls requires special configurations that are difficult to set up and manage.

To support LDAP based applications, Cloud Cache translates LDAP communications to a protocol suitable for communication with a cloud system. Generally, an LDAP based application uses a database via LDAP. An application may be alternatively configured to use a database via a different protocol such as SQL. However, LDAP provides a hierarchical representation of resources in tree structures, while SQL represents data as tables and fields. Accordingly, LDAP may be more desirable for searching functionality, while SQL may be more desirable for transactional functionality.

In one embodiment, services provided by IDCS may be used in an LDAP based application to, for example, authenticate a user of the applications (i.e., an identity service) or enforce a security policy for the application (i.e., a security service). In one embodiment, the interface with IDCS is through a firewall and based on HTTP (e.g., REST). Typically, corporate firewalls do not allow access to internal LDAP communication even if the communication implements Secure Sockets Layer ("SSL"), and do not allow a TCP port to be exposed through the firewall. However, Cloud Cache translates between LDAP and HTTP to allow LDAP based applications reach services provided by IDCS, and the firewall will be open for HTTP.

Generally, an LDAP directory may be used in a line of business, such as marketing and development, and defines users, groups, works, etc. In one example, a marketing and development business may have different targeted customers, and for each customer, may have their own applications, users, groups, works, etc. Another example of a line of business that may run an LDAP cache directory is a wireless service provider. In this case, each call made by a user of the wireless service provider authenticates the user's device against the LDAP directory, and some of the corresponding information in the LDAP directory may be synchronized with a billing system. In these examples, LDAP provides functionality to physically segregate content that is being searched at runtime.

In one example, a wireless service provider may handle its own identity management services for their core business (e.g., regular calls), while using services provided by IDCS in support of a short term marketing campaign. In this case, Cloud Cache "flattens" LDAP when it has a single set of users and a single set of groups that it runs against the cloud. In one embodiment, any number of Cloud Caches may be implemented in IDCS.

Distributed Data Grid

In one embodiment, the cache cluster in IDCS is implemented based on a distributed data grid, as disclosed, for example, in U.S. Pat. Pub. No. 2016/0092540, the disclosure of which is hereby incorporated by reference. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the Oracle Coherence data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, IDCS implements a distributed data grid such as Coherence so that every microservice can request access to shared cache objects without getting blocked. Coherence is a proprietary Java-based in-memory data grid, designed to have better reliability, scalability, and performance than traditional relational database management systems. Coherence provides a peer to peer (i.e., with no central manager), in-memory, distributed cache.

Figure 12:
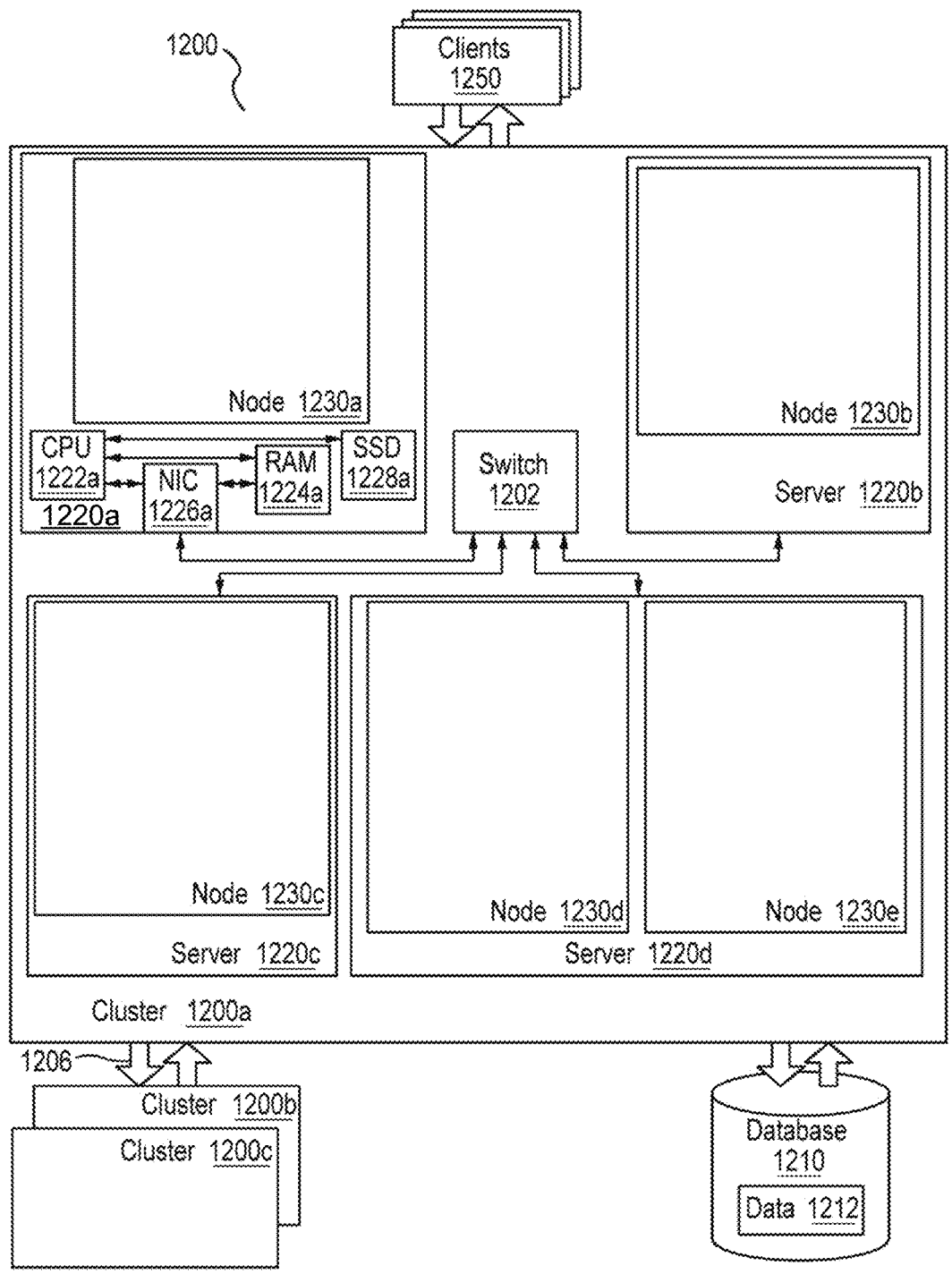
FIG. 12 illustrates an example of a distributed data grid in one embodiment.

FIG. 12 illustrates an example of a distributed data grid 1200 which stores data and provides data access to clients 1250 and implements embodiments of the invention. A "data grid cluster", or "distributed data grid", is a system comprising a plurality of computer servers (e.g., 1220a, 1220b, 1220c, and 1220d) which work together in one or more clusters (e.g., 1200a, 1200b, 1200c) to store and manage information and related operations, such as computations, within a distributed or clustered environment. While distributed data grid 1200 is illustrated as comprising four servers 1220a, 1220b, 1220c, 1220d, with five data nodes 1230a, 1230b, 1230c, 1230d, and 1230e in a cluster 1200a, the distributed data grid 1200 may comprise any number of clusters and any number of servers and/or nodes in each cluster. In an embodiment, distributed data grid 1200 implements the present invention.

As illustrated in FIG. 12, a distributed data grid provides data storage and management capabilities by distributing data over a number of servers (e.g., 1220a, 1220b, 1220c, and 1220d) working together. Each server of the data grid cluster may be a conventional computer system such as, for example, a "commodity x86" server hardware platform with one to two processor sockets and two to four CPU cores per processor socket. Each server (e.g., 1220a, 1220b, 1220c, and 1220d) is configured with one or more CPUs, Network Interface Cards ("NIC"), and memory including, for example, a minimum of 4 GB of RAM up to 64 GB of RAM or more. Server 1220a is illustrated as having CPU 1222a, Memory 1224a, and NIC 1226a (these elements are also present but not shown in the other Servers 1220b, 1220c, 1220d). Optionally, each server may also be provided with flash memory (e.g., SSD 1228a) to provide spillover storage capacity. When provided, the SSD capacity is preferably ten times the size of the RAM. The servers (e.g., 1220a, 1220b, 1220c, 1220d) in a data grid cluster 1200a are connected using high bandwidth NICs (e.g., PCI-X or PCIe) to a high-performance network switch 1220 (for example, gigabit Ethernet or better).

A cluster 1200a preferably contains a minimum of four physical servers to avoid the possibility of data loss during a failure, but a typical installation has many more servers. Failover and failback are more efficient the more servers that are present in each cluster and the impact of a server failure on a cluster is lessened. To minimize communication time between servers, each data grid cluster is ideally confined to a single switch 1202 which provides single hop communication between servers. A cluster may thus be limited by the number of ports on the switch 1202. A typical cluster will therefore include between 4 and 96 physical servers.

In most Wide Area Network ("WAN") configurations of a distributed data grid 1200, each data center in the WAN has independent, but interconnected, data grid clusters (e.g., 1200a, 1200b, and 1200c). A WAN may, for example, include many more clusters than shown in FIG. 12. Additionally, by using interconnected but independent clusters (e.g., 1200a, 1200b, 1200c) and/or locating interconnected, but independent, clusters in data centers that are remote from one another, the distributed data grid can secure data and service to clients 1250 against simultaneous loss of all servers in one cluster caused by a natural disaster, fire, flooding, extended power loss, and the like.

One or more nodes (e.g., 1230a, 1230b, 1230c, 1230d and 1230e) operate on each server (e.g., 1220a, 1220b, 1220c, 1220d) of a cluster 1200a. In a distributed data grid, the nodes may be, for example, software applications, virtual machines, or the like, and the servers may comprise an operating system, hypervisor, or the like (not shown) on which the node operates. In an Oracle Coherence data grid, each node is a Java virtual machine ("JVM"). A number of JVMs/nodes may be provided on each server depending on the CPU processing power and memory available on the server. JVMs/nodes may be added, started, stopped, and deleted as required by the distributed data grid. JVMs that run Oracle Coherence automatically join and cluster when started. JVMs/nodes that join a cluster are called cluster members or cluster nodes.

Each client or server includes a bus or other communication mechanism for communicating information, and a processor coupled to bus for processing information. The processor may be any type of general or specific purpose processor. Each client or server may further include a memory for storing information and instructions to be executed by processor. The memory can be comprised of any combination of random access memory ("RAM"), read only memory ("ROM"), static storage such as a magnetic or optical disk, or any other type of computer readable media. Each client or server may further include a communication device, such as a network interface card, to provide access to a network. Therefore, a user may interface with each client or server directly, or remotely through a network, or any other method.

Computer readable media may be any available media that can be accessed by processor and includes both volatile and non-volatile media, removable and non-removable media, and communication media. Communication media may include computer readable instructions, data structures, program modules, or other data in a modulated data signal such as a carrier wave or other transport mechanism, and includes any information delivery media.

The processor may further be coupled via bus to a display, such as a Liquid Crystal Display ("LCD"). A keyboard and a cursor control device, such as a computer mouse, may be further coupled to bus to enable a user to interface with each client or server.

In one embodiment, the memory stores software modules that provide functionality when executed by the processor. The modules include an operating system that provides operating system functionality each client or server. The modules may further include a cloud identity management module for providing cloud identity management functionality, and all other functionality disclosed herein.

The clients may access a web service such as a cloud service. The web service may be implemented on a WebLogic Server from Oracle Corp. in one embodiment. In other embodiments, other implementations of a web service can be used. The web service accesses a database which stores cloud data.

As disclosed, embodiments implement a microservices based architecture to provide cloud-based multi-tenant IAM services. In one embodiment, each requested identity management service is broken into real-time tasks that are handled by a microservice in the middle tier, and near-real-time tasks that are offloaded to a message queue. Accordingly, embodiments provide a cloud-scale IAM platform.

Figure 13:
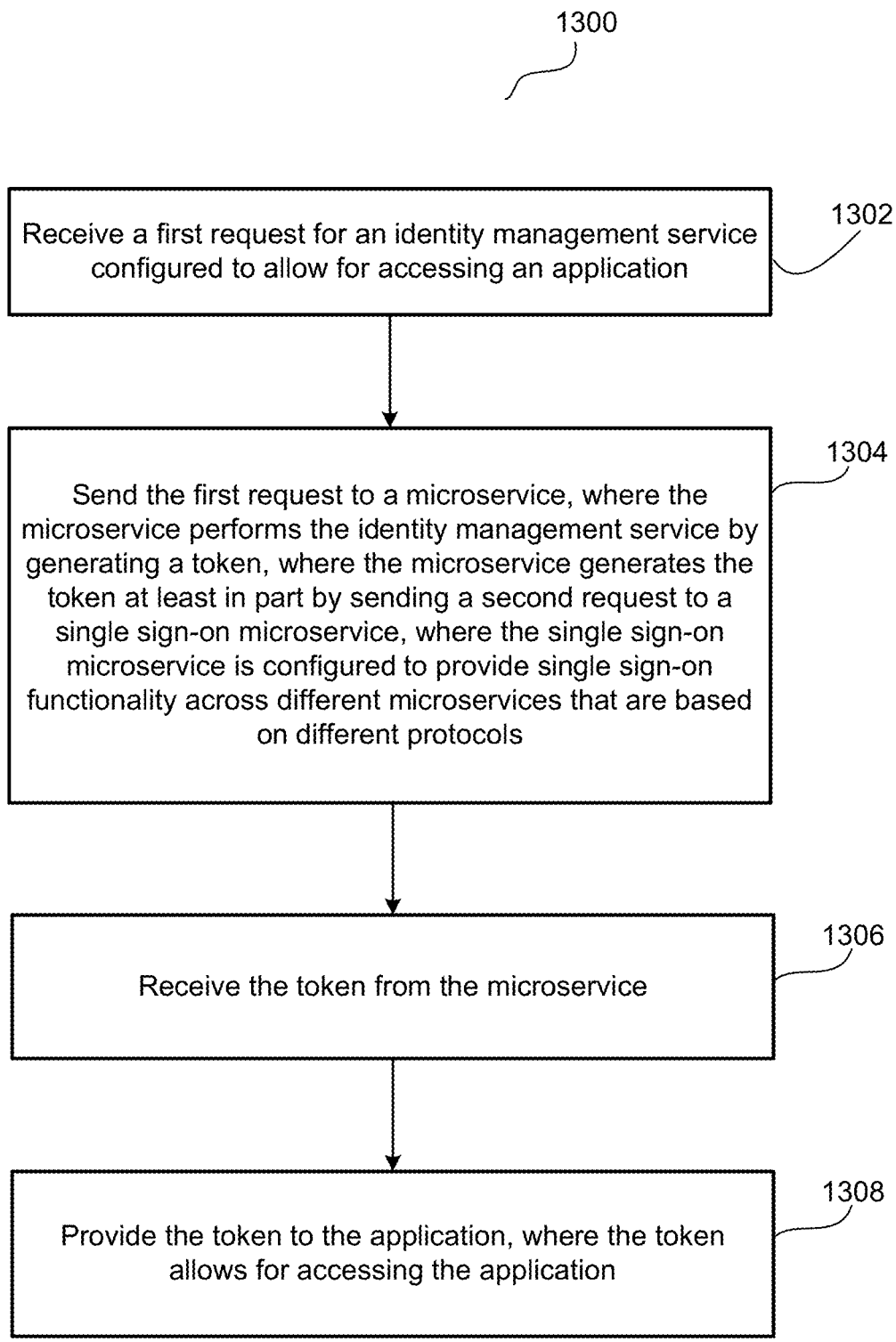
FIG. 13 is a flow diagram of identity and access management functionality in accordance with an embodiment.

FIG. 13 is a flow diagram 1300 of cloud-based IAM functionality in accordance with an embodiment. In one embodiment, the functionality of the flow diagram of FIG. 13 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1302 a first request is received for an identity management service configured to allow for accessing an application. In one embodiment, for example, the first request is received by a security gate such as Cloud Gate as described herein, for example, with reference to web routing tier 610 in FIG. 6 and/or cloud gate 702 in FIG. 7. In one embodiment, the first request includes a call to an API that identifies the identity management service and a microservice configured to perform the identity management service. In one embodiment, the microservice is a self-contained module that can communicate with other modules/microservices, and each microservice has an unnamed universal port that can be contacted by others. For example, in one embodiment, a variety of applications/services 602 may make HTTP calls to IDCS APIs to use IDCS microservices 614 as illustrated in FIG. 6. In one embodiment, a microservice is a runtime component/process.

At 1304 the first request is sent to a microservice, where the microservice performs the identity management service by generating a token, where the microservice generates the token at least in part by sending a second request to a single sign-on microservice, and where the single sign-on microservice is configured to provide single sign-on functionality across different microservices that are based on different protocols.

At 1306 the token is received from the microservice, and at 1308 the token is provided to the application, where the token allows for accessing the application.

In one embodiment, the microservice is configured to provide an authentication functionality based on a protocol. In one embodiment, the protocol is OAuth or SAML, and the single sign-on microservice is configured to provide single sign-on functionality across both OAuth and SAML. In one embodiment, the single sign-on microservice generates a global session configured as a session cookie and provides the global session to the microservice. In one embodiment, the microservice converts the global session into the token. In one embodiment, the single-sign on microservice normalizes request parameters of the second request.

In one embodiment, the application is configured to be used by multiple tenancies including the tenancy. In one embodiment, the microservice is stateless and retrieves data from a database to perform the identity management service.

In one embodiment, the database and the microservice are configured to scale independently of one another. In one embodiment, the database includes a distributed data grid.

As disclosed, embodiments provide a multi-tenant, cloud-scale, IAM that provides SSO functionality across various protocols by implementing a global session and converting the global session to appropriate protocol tokens.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to provide cloud-based identity and access management, the providing comprising:
    receiving a first request for an identity management service configured to allow for accessing an application;
    sending the first request to a first microservice that performs the identity management service by generating a token, wherein
        when the first request does not include global session state data, the first microservice generates the token at least in part by sending a second request to a single sign-on (SSO) microservice and receiving a global session generated by the SSO microservice that is configured as a session cookie with global session state data in response to the second request, the global session state data from the session cookie being converted into the generated token which comprises a token specific to an authentication protocol;
        when the first request includes global session state data, the global session state data from the first request is converted into the generated token which comprises a token specific to the authentication protocol,
        the global session state data comprises normalized attribute information that is used to generate the token specific to the authentication protocol, and
        the SSO microservice is configured to provide single sign-on functionality across different microservices that are secured using different authentication protocols;
    receiving the token from the first microservice; and
    providing the token to the application, wherein the token allows for accessing the application.

2. The computer readable medium of claim 1, wherein the first microservice is configured to provide an authentication functionality based on the authentication protocol.

3. The computer readable medium of claim 2, wherein the authentication protocol is OAuth or Security Assertion Markup Language (SAML), wherein the SSO microservice is configured to provide SSO functionality across microservices that are secured using both OAuth and SAML.

4. The computer readable medium of claim 1, wherein the application is configured to be used by multiple tenants.

5. The computer readable medium of claim 1, wherein the first microservice is stateless and retrieves data from a database to perform the identity management service.

6. The computer readable medium of claim 5, wherein the database and the first microservice are configured to scale independently of one another, and the database comprises a distributed data grid.

7. A method of providing cloud-based identity and access management, the method comprising:
receiving a first request for an identity management service configured to allow for accessing an application;
sending the first request to a first microservice that performs the identity management service by generating a token, wherein
when the first request does not include global session state data, the first microservice generates the token at least in part by sending a second request to a single sign-on (SSO) microservice and receiving a global session generated by the SSO microservice that is configured as a session cookie with global session state data in response to the second request, the global session state data from the session cookie being converted into the generated token which comprises a token specific to an authentication,
when the first request includes global session state data, the global session state data from the first request is converted into the generated token which comprises a token specific to the authentication protocol,
the global session state data comprises normalized attribute information that is used to generate the token specific to the authentication protocol, and
the SSO microservice is configured to provide single sign-on functionality across different microservices that are secured using different authentication protocols;
receiving the token from the first microservice; and
providing the token to the application, wherein the token allows for accessing the application.

8. The method of claim 7, wherein the first microservice is configured to provide an authentication functionality based on the authentication protocol.

9. The method of claim 8, wherein the authentication protocol is OAuth or Security Assertion Markup Language (SAML), wherein the SSO microservice is configured to provide single-sign-on functionality across microservices that are secured using both OAuth and SAML.

10. The method of claim 7, wherein the SSO microservice normalizes request parameters of the second request.

11. A system for providing cloud based identity and access management, comprising:
a plurality of tenants;
a plurality of microservices; and
one or more processors that:
receive a first request for an identity management service configured to allow for accessing an application;
send the first request to a first microservice of the plurality of microservices that performs the identity management service by generating a token, wherein
when the first request does not include global session state data, the first microservice generates the token at least in part by sending a second request to a single sign-on (SSO) microservice and receiving a global session generated by the SSO microservice that is configured as a session cookie with global session state data in response to the second request, the global session state data from the session cookie being converted into the generated token which comprises a token specific to an authentication protocol,
when the first request includes global session state data, the global session state data from the first request is converted into the generated token which comprises a token specific to the authentication protocol,
the global session state data comprises normalized attribute information that is used to generate the token specific to the authentication protocol, and
the SSO microservice is configured to provide single sign-on functionality across different microservices that are secured using different authentication protocols;
receives the token from the first microservice; and
provides the token to the application, wherein the token allows for accessing the application.

12. The system of claim 11, wherein the first microservice is configured to provide an authentication functionality based on the authentication protocol.

13. The system of claim 12, wherein the authentication protocol is OAuth or Security Assertion Markup Language (SAML), wherein the SSO microservice is configured to provide single-sign-on functionality across microservices that are secured using both OAuth and SAML.

14. The computer readable medium of claim 1, wherein the global session configured as the session cookie provides a common session state shared by stateless microservices implemented by a cloud based identity management service.

15. The computer readable medium of claim 14, wherein the global session configured as the session cookie is used as a source of truth for the common session state shared by the cloud based identity management service.

16. The method of claim 7, wherein the global session configured as the session cookie provides a common session state shared by stateless microservices implemented by a cloud based identity management service.

17. The computer readable medium of claim 14, wherein, when the first request does not include global session state data, the global session is generated by receiving a token at the SSO microservice from a remote identity provider (IDP) that hosts an identity store comprising a user associated with the first request, the token from the remote IDP comprising one or more authentication statements or authorization statements for the global session state data of the generated global session.

18. The computer readable medium of claim 17, wherein, when the SSO microservice generates the global session, a user identified by the global session state data is asserted in a local identity store.

19. The method of claim 16, wherein, when the first request does not include global session state data, the global session is generated by receiving a token at the SSO microservice from a remote identity provider (IDP) that hosts an identity store comprising a user associated with the first request, the token from the remote IDP comprising one or more authentication statements or authorization statements for the global session state data of the global session.

20. The method of claim 19, wherein, when the SSO microservice generates the global session, a user identified by the global session state data is asserted in a local identity store.

* * * * *

UNITED STATES PATENT AND TRADEMARK OFFICE
CERTIFICATE OF CORRECTION

PATENT NO. : 10,846,390 B2  
APPLICATION NO. : 15/704169  
DATED : November 24, 2020  
INVENTOR(S) : Subramanian et al.

Page 1 of 2

It is certified that error appears in the above-identified patent and that said Letters Patent is hereby corrected as shown below:

On the Title Page

On page 4, Column 2, item (56) under Other Publications, Line 25, delete ".glutt." and insert -- .gluu. --, therefor.

On page 5, Column 1, item (56) under Other Publications, Line 7, delete ".ieff." and insert -- .ietf. --, therefor.

On page 5, Column 1, item (56) under Other Publications, Line 25, delete "4ccess" and insert -- Access --, therefor.

In the Specification

In Column 13, Line 32, delete "("RP" s))" and insert -- ("RP"s)) --, therefor.

In Column 19, Line 56, delete ""http://%tenant %.idcs." and insert -- http://%tenant%.idcs. --, therefor.

In Column 23, Line 25, delete "7106" and insert -- 710B --, therefor.

In Column 38, Line 50, delete "FIG. 1000A)" and insert -- FIG. 10A) --, therefor.

In Column 39, Line 29, delete "FIG. 1000A," and insert -- FIG. 10A, --, therefor.

In Column 39, Line 39, delete "FIG. 1000A)." and insert -- FIG. 10A). --, therefor.

In Column 45, Line 3, delete "IDCS_SSO" and insert -- IDCS SSO --, therefor.

Signed and Sealed this  
First Day of June, 2021

Drew Hirshfeld  
*Performing the Functions and Duties of the  
Under Secretary of Commerce for Intellectual Property and  
Director of the United States Patent and Trademark Office*

CERTIFICATE OF CORRECTION (continued)
U.S. Pat. No. 10,846,390 B2

In the Claims

In Column 52, Lines 35-36, in Claim 1, delete "protocol;" and insert -- protocol, --, therefor.

In Column 53, Line 18, in Claim 7, delete "authentication," and insert -- authentication protocol, --, therefor.

In Column 53, Line 39, in Claim 9, delete "single-sign-on" and insert -- single sign-on --, therefor.

In Column 54, Line 23, in Claim 13, delete "single-sign-on" and insert -- single sign-on --, therefor.